US012466775B2

(12) United States Patent
Wang

(10) Patent No.: US 12,466,775 B2
(45) Date of Patent: Nov. 11, 2025

(54) VISIBLE-LIGHT MEDIATED ORGANOPHOTOREDOX CATALYTIC DEUTERATION OF AROMATIC AND ALIPHATIC ALDEHYDES

(71) Applicant: ARIZONA BOARD OF REGENTS ON BEHALF OF THE UNIVERSITY OF ARIZONA, Tucson, AZ (US)

(72) Inventor: Wei Wang, Tucson, AZ (US)

(73) Assignee: ARIZONA BOARD OF REGENTS ON BEHALF OF THE UNIVERSITY OF ARIZONA, Tucson, AZ (US)

(*) Notice: Subject to any disclaimer, the term of this patent is extended or adjusted under 35 U.S.C. 154(b) by 799 days.

(21) Appl. No.: 17/784,537

(22) PCT Filed: Dec. 1, 2020

(86) PCT No.: PCT/US2020/062710
§ 371 (c)(1),
(2) Date: Jun. 10, 2022

(87) PCT Pub. No.: WO2021/118827
PCT Pub. Date: Jun. 17, 2021

(65) Prior Publication Data
US 2023/0016922 A1  Jan. 19, 2023

Related U.S. Application Data

(60) Provisional application No. 62/946,838, filed on Dec. 11, 2019.

(51) Int. Cl.
| | | |
|---|---|---|
| C07B 59/00 | (2006.01) |
| C07C 45/61 | (2006.01) |
| C07C 47/228 | (2006.01) |
| C07C 47/453 | (2006.01) |
| C07C 47/542 | (2006.01) |
| C07C 47/546 | (2006.01) |
| C07C 49/86 | (2006.01) |
| C07C 59/74 | (2006.01) |
| C07C 255/50 | (2006.01) |
| C07D 207/16 | (2006.01) |
| C07D 209/42 | (2006.01) |
| C07D 213/54 | (2006.01) |
| C07D 239/52 | (2006.01) |
| C07D 295/155 | (2006.01) |
| C07D 295/185 | (2006.01) |
| C07D 307/54 | (2006.01) |
| C07D 307/83 | (2006.01) |
| C07D 333/24 | (2006.01) |
| C07D 333/68 | (2006.01) |
| C07D 493/04 | (2006.01) |
| C07F 7/18 | (2006.01) |
| C07J 9/00 | (2006.01) |
| C07K 5/065 | (2006.01) |

(52) U.S. Cl.
CPC .............. *C07B 59/00* (2013.01); *C07C 45/61* (2013.01); *C07C 47/228* (2013.01); *C07C 47/453* (2013.01); *C07C 47/542* (2013.01); *C07C 47/546* (2013.01); *C07C 49/86* (2013.01); *C07C 59/74* (2013.01); *C07C 255/50* (2013.01); *C07D 207/16* (2013.01); *C07D 209/42* (2013.01); *C07D 213/54* (2013.01); *C07D 239/52* (2013.01); *C07D 295/155* (2013.01); *C07D 295/185* (2013.01); *C07D 307/54* (2013.01); *C07D 307/83* (2013.01); *C07D 333/24* (2013.01); *C07D 333/68* (2013.01); *C07D 493/04* (2013.01); *C07F 7/1804* (2013.01); *C07F 7/1892* (2013.01); *C07J 9/00* (2013.01); *C07K 5/06078* (2013.01); *C07B 2200/05* (2013.01)

(58) Field of Classification Search
CPC ...................... C07C 45/61; C07B 59/00–001
See application file for complete search history.

(56) References Cited

FOREIGN PATENT DOCUMENTS

| CN | 109293484 A | 2/2019 |
|---|---|---|
| WO | WO2018099271 A1 | 6/2018 |

OTHER PUBLICATIONS

Dong, J. et al. "Formyl-selective deuteration of aldehydes with D2O via synergistic organic and photoredox catalysis" Supporting information attached herein; Published Dec. 4, 2019 (Year: 2019).*
Adcock et al., "Divergent C¢H Insertion-Cyclization Cascades of N-Allyl Ynamides", Angew. Chem. Int. Ed. 2015, vol. 54, pp. 15525-15529.
Atzrodt et al., "CH Functionalisation for Hydrogen Isotope Exchange", Angew. Chem. Int. Ed. 2018, vol. 57, pp. 3022-3047.
Atzrodt et al., "Deuterium- and Tritium-Labelled Compounds: Applications in the Life Sciences", Angew. Chem. Int. Ed. 2018, vol. 57, pp. 1758-1784.
Bergin, "Photoredox Catalysis Deoxygenative deuteration", Nat. Catal., 2018, vol. 1, pp. 898-898.
Bugaut et al., "Organocatalytic umpolung: N-heterocyclic carbenes and beyond", Chem. Soc. Rev. 2012, vol. 41, pp. 3511-3522.
Capretz Agy et al., "Palladium-Mediated Oxidative Annulation of δ-Indolyl-α,β-Unsaturated Compounds toward the Synthesis of Cyclopenta[b]indoles and Heterogeneous Hydrogenation To Access Fused Indolines", J. Org. Chem., 2019, vol. 84, pp. 5564.
Colbon et al., "Double Arylation of Allyl Alcohol via a One-Pot Heck Arylation Isomerization Acylation Cascade", J. Org. Lett., 2011, vol. 13, pp. 5456-5459.

(Continued)

*Primary Examiner* — Medhanit W Bahta
(74) *Attorney, Agent, or Firm* — Michael Best & Friedrich LLP

(57) ABSTRACT

Described are methods for preparing a deuterated aldehyde using with a photocatalyst and a hydrogen atom transfer agent in a H$_2$O free solvent comprising D$_2$O and an organic solvent under an inert gas. The methods may be used to convert a wide variety of aldehydes (e.g., aryl, alkyl, or alkenyl aldehydes) to C-1 deuterated aldehydes under mild reaction conditions.

15 Claims, 2 Drawing Sheets

(56) References Cited

OTHER PUBLICATIONS

Dong et al., "Formyl-selective deuteration of aldehydes with D2O via synergistic organic and photoredoxcatalysis", Royal Society of Chemistry, 2019, vol. 11, pp. 1026-1031.
Enders et al., "Organocatalysis by N-Heterocyclic Carbenes", Chem. Rev. 2007, vol. 107, pp. 5606-5655.
Erkkila et al., "Iminium Catalysis", Chem. Rev., 2007, vol. 107, pp. 5416-5470.
Ezzili et al., "Reversible Competitive r-Ketoheterocycle Inhibitors of Fatty Acid Amide Hydrolase Containing Additional Conformational Constraints in the Acyl Side Chain: Orally Active, Long-Acting Analgesics", J. Med. Chem., 2011, vol. 54, pp. 2805-2822.
Flanigan et al., "Organocatalytic Reactions Enabled by N-Heterocyclic Carbenes", Chem. Rev., 2015, vol. 115, pp. 9307-9387.
Frost et al., "Tandem Molybdenum Catalyzed Hydrosilylations: An Expedient Synthesis of beta-Aryl Aldehydes", Org. Lett. 2007, vol. 9, No. 21, pp. 4259-4261.
Gant, "Using Deuterium in Drug Discovery: Leaving the Label in the Drug", J. Med. Chem., 2014, vol. 57, pp. 3595-3611.
Geng et al., "Practical synthesis of C1 deuterated aldehydes enabled by NHC catalysis", Nature Catalysis, 2019, vol. 2, pp. 1071-1077.
Hale et al., "Stereoretentive Deuteration of a-Chiral Amines with D2O", J. Am. Chem. Soc., 2016, vol. 138, pp. 13489-13492.
Hilpert et al., "Palladium- and Rhodium-Catalyzed Dynamic Kinetic Resolution of Racemic Internal Allenes Towards Chiral Pyrazoles", Angew. Chem. Int. Ed., 2019, vol. 58, pp. 3378-3381.
Huang et al., "Chemo- and Regioselective Organo-Photoredox Catalyzed Hydroformylation of Styrenes via a Radical Pathway", J. Am. Chem. Soc., 2017, vol. 139, pp. 9799-9802.
Ibrahim et al., "Palladium/Rhodium Cooperative Catalysis for the Production of Aryl Aldehydes and Their Deuterated Analogues Using the Water-Gas Shift Reaction", Angew. Chem. Int. Ed., 2018, vol. 57, pp. 10362-10367.
International Preliminary Report on Patentability for Application No. PCT/US20/62710 dated May 17, 2022 (6 pages).
International Search Report and Written Opinion for Application No. PCT/US20/62710 dated Apr. 5, 2021 (12 pages).
Isbrandt et al., "Catalytic Deuteration of Aldehydes with D2O", Synlett, 2017, 28, pp. 2851-2854.
Ji et al., "Visible-Light-Mediated, Chemo- and Stereoselective Radical Process for the Synthesis of C-Glycoamino Acids", Org. Lett., 2019, vol. 21, pp. 3086-3092.
Kerr et al., "Iridium-Catalyzed Formyl-Selective Deuteration of Aldehydes", Angew. Chem. Int. Ed., 2017, vol. 56, pp. 7808-7812.
Kitajima et al., "Asymmetric Total Synthesis of Novel Pentacyclic Indole Alkaloid, Kopsiyunnanine E, Isolated from Kopsia arborea", Org. Lett., 2014, vol. 16, pp. 5000-5003.
Koniarczyk et al., J. Am. Chem. Soc., 2018, vol. 140, pp. 1990-1993.
Li et al., "One-Pot Synthesis of Deuterated Aldehydes from Arylmethyl Halides", Org. Lett., 2018, vol. 20, pp. 1712-1715.
Liang et al., "Efficient Bronsted-Acid-Catalyzed Deuteration of Arenes and Their Transformation to Functionalized Deuterated Products", Asian J. Org. Chem., 2017, vol. 6, pp. 1063-1071.
Loh et al., "Photoredox-catalyzed deuteration and tritiation of pharmaceutical compounds", Science, 2017, vol. 358, pp. 1182-1187.
Mukherjee et al., "Asymmetric Enamine Catalysis", Chem. Rev., 2007, vol. 107, pp. 5471-5569.
Mukherjee et al., "Cooperative Catalysis: A Strategy To Synthesize Trifluoromethyl-thioesters from Aldehydes", ACS Catal., 2018, vol. 8, pp. 5842-5846.
Mullard, "Deuterated drugs draw heavier backing", Nat. Rev. Drug Discovery, 2016, vol. 15, pp. 219-221.
Muthukrishnan et al., "Intramolecular H-Atom Abstraction in γ-Azido-Butyrophenones: Formation of 1,5 Ketyl Iminyl Radicals", Org. Lett., 2009, vol. 11, No. 11, pp. 2345-2348.
Olsen et al., "Experimental and Theoretical Mechanistic Investigation of the Iridium-Catalyzed Dehydrogenative Decarbonylation of Primary Alcohols", J. Am. Chem. Soc., 2015, vol. 137, pp. 834-842.
Phillips et al., "Discovering New Reactions with N-Heterocyclic Carbene Catalysis", Aldrichimica Acta, 2009, 42, pp. 55-64.
Pirali et al., "Applications of Deuterium in Medicinal Chemistry", J. Med. Chem., 2019, vol. 62, pp. 5276-5297.
Puleo et al., "Catalytic α-Selective Deuteration of Styrene Derivatives", J. Am. Chem. Soc., 2019, vol. 141, pp. 1467-1472.
Sattler, "Hydrogen/Deuterium (H/D) Exchange Catalysis in Alkanes", ACS Catal., 2018, vol. 8, pp. 2296-2312.
Schmidt, "First deuterated drug approved", Nat. Biotechnol., 2017, vol. 35, pp. 493-494.
Shang et al., "Dehydrogenative desaturation-relay via formation of multicenter-stabilized radical intermediates", Nature Communications, 2017, vol. 8, 2273, pp. 1-8.
Simmons et al., "On the Interpretation of Deuterium Kinetic Isotope Effects in CH Bond Functionalizations by Transition-Metal Complexes", Angew. Chem. Int. Ed., 2012, vol. 51, pp. 3066-3072.
Spletstoser et al., "Mild and Selective Hydrozirconation of Amides to Aldehydes Using Cp2Zr(H)Cl: Scope and Mechanistic Insight", J. Am. Chem. Soc., 2007, vol. 129, pp. 3408-3419.
Spletstoser et al., "One-step facile synthesis of deuterium labeled aldehydes from tertiary amides using Cp2Zr(D)Cl", Tetrahedron Lett., 2004, vol. 45, pp. 2787-2789.
Valero et al., Angew. Chem. Int. Ed., 2018, vol. 57, pp. 8159-8163.
Wang et al., "General and Practical Potassium Methoxide/Disilane-Mediated Dehalogenative Deuteration of (Hetero)Arylhalides", J. Am. Chem. Soc., 2018, vol. 140, pp. 10970-10974.
Xiao et al., "Hexahydropyrrolo[2,3-b]indoles: A New Class of Structurally Rigid Tricyclic Skeleton for Oxazaborolidine-Catalyzed Asymmetric Borane Reduction", Adv. Synth. Catal., 2010, vol. 352, pp. 1107-1112.
Yang, Deuterium: Discovery and Applications in Organic Chemistry, Elsevier, Amsterdam, 2016, pp. 1-130.
Yu et al., "Iron-catalysed tritiation of pharmaceuticals", Nature, 2016, vol. 529, pp. 195-199.
Zhang et al., "Deoxygenative Deuteration of Carboxylic Acids with D2O", Angew. Chem. Int. Ed., 2019, vol. 58, pp. 312-316.
Zhang et al., "Deuteration of Formyl Groups via a Catalytic Radical H/D Exchange Approach", ACS Catalysis, 2020, vol. 10, pp. 2226-2230.
Zhang et al., "Organocatalytic Transformation of Aldehydes to Thioesters with Visible Light", Chem. - Eur. J. 2019, vol. 25, pp. 8225-8228.
Zhou et al., "Visible-light-mediated deuteration of silanes with deuterium oxide", Chem. Sci., 2019, vol. 10, pp. 7340-7344.

* cited by examiner

Methods for transforming to deuterated arylaldehydes

Transition metal-catalyzed H-D exchange only working with arylaldehydes

} ionic approach

NHC-catalyzed H-D exchange

H-D exchange using a neutral radical approach (This work)

- distinct organocatalytic radical process
- working with both aryl and aliphatic aldehydes
- mild reaction condions for achiving high chemoselectivity and late-stage complex structure modificaiton

VISIBLE-LIGHT MEDIATED ORGANOPHOTOREDOX CATALYTIC DEUTERATION OF AROMATIC AND ALIPHATIC ALDEHYDES

CROSS-REFERENCE TO RELATED APPLICATION(S)

This application is a U.S. national stage entry of International Patent Application No. PCT/US2020/062710, filed on Dec. 1, 2020, which claims the benefit of and priority to U.S. Provisional Patent Application No. 62/946,838, filed on Dec. 11, 2019, the entire contents of each of which are hereby incorporated by reference.

STATEMENT OF GOVERNMENT INTEREST

This invention was made with government support under Grant No. GM125920, awarded by National Institutes of Health. The government has certain rights in the invention.

BACKGROUND

Among isotopes, deuterium perhaps has the broadest impact on almost every sub-discipline in the life, and chemical, material and nuclear sciences and beyond. The recent surge in applications of deuterated pharmaceutical agents has been witnessed by the FDA approval of the first deuterated drug, austedo (deutetrabenazine), in 2017 and the large number of emerging deuterated drug candidates. This has created an urgent demand for synthetic methods that enable to efficiently generate deuterated building blocks.

Given the broad availability and synthetic versatility of aldehydes, C-1 deuterated aldehydes can provide the quick access to a wide range of highly valued and structurally diverse deuterated building blocks and to pharmaceutically relevant structures. Several methodologies have been reported for their synthesis (FIG. 1A). Conventional methods rely on the reduction and/or then oxidation sequence but using expensive deuterated reducing agents, such as LiAlD$_4$ and Cp$_2$ZrDCl. Recently, more cost-effective approaches using cheap, safe and readily handled D$_2$O as the deuterium source have been elegantly realized from aryl iodides, carboxylic acids, or benzyl halides (FIG. 1A). Direct hydrogen-deuterium exchange (HDE) processes with aldehydes without requiring additional functional group transformation represent an even more synthetically efficient strategy. Ir and Ru catalyzed HDE reactions was reported (FIG. 1B). More recently, more efficient NHC carbenes promoted HDE processes were reported (FIG. 1C). Mechanistically, all these HDE transformations rely on the ionic reaction pathway. Despite these impressive studies, it was recognized that significant synthetic challenges are associated with the difficulty of controlling chemoselectivity of non-selective deuteration of aromatic rings and the unsatisfied deuteration level (14-84%). Furthermore, the reported protocols (FIGS. 1A and 1B) mainly work for aromatic aldehydes. There remains a need for synthesis methods capable of tolerating both aromatic and aliphatic aldehydes and achieving useful levels of deuterium incorporation (>90%), which may significantly broaden the utility of synthetically versatile C-1 deuterated aldehydes.

SUMMARY OF THE INVENTION

In one aspect, the present disclosure provides a method for preparing a deuterated aldehyde of formula $R^Z$—C(O)-D wherein $R^Z$ is alkyl, alkenyl, cycloalkyl, cycloalkenyl, aryl, heteroaryl, or heterocyclyl; wherein the alkyl, alkenyl, cycloalkyl, cycloalkenyl, aryl, heteroaryl, and heterocyclyl are each optionally substituted with one or more $R^a$, and $R^Z$ is optionally deuterated;

$R^a$ at each occurrence is independently halogen, —CN, —OH, nitro, —O-benzyl, —NH(t-butoxycarbonyl), —NH(benzyloxycarbonyl), or —X—$R^X$, wherein X is bond, O, NH, C(O), OC(O), or C(O)NH; and $R^X$ is alkyl, alkenyl, alkynyl, alkoxy, cycloalkyl, aryl, heteroaryl, or heterocyclyl, wherein the $R^X$ is optionally substituted, the method comprising:

(i) mixing an aldehyde of formula $R^{Z'}$—C(O)—H 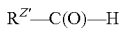

with a photocatalyst and a hydrogen atom transfer agent in a H$_2$O free solvent comprising D$_2$O and an organic solvent under an inert gas to form a mixture;

wherein $R^{Z'}$ is alkyl, alkenyl, cycloalkyl, cycloalkenyl, aryl, heteroaryl, or heterocyclyl; wherein the alkyl, alkenyl, cycloalkyl, cycloalkenyl, aryl, heteroaryl, and heterocyclyl are each optionally substituted with one or more $R^b$;

$R^b$ at each occurrence is independently halogen, —CN, —OH, nitro, —O-benzyl, —NH(t-butoxycarbonyl), —NH(benzyloxycarbonyl), or —Y—$R^Y$, wherein Y is bond, O, NH, C(O), OC(O), or C(O)NH; and $R^Y$ is alkyl, alkenyl, alkynyl, alkoxy, cycloalkyl, aryl, heteroaryl, or heterocyclyl, wherein the $R^Y$ is optionally substituted, and (ii) exposing the mixture of (i) to light, thereby producing the deuterated aldehyde.

BRIEF DESCRIPTION OF THE DRAWINGS

FIG. 1A shows methods for transforming to deuterated arylaldehydes. FIG. 1B shows a transition metal-catalyzed H-D exchange. FIG. 1C shows an NHC carbene promoted HDE process. FIG. 1D shows a representative process of organocatalytic H-D exchange of aldehydes.

DETAILED DESCRIPTION

Figure 1A:
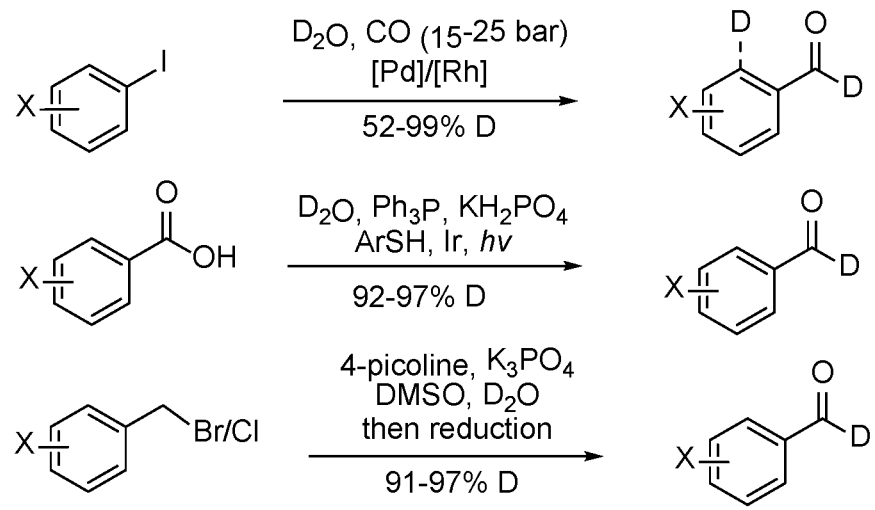
FIGS. 1A-1D show different methods for the synthesis of deuterated aldehydes.
Figure 1B:
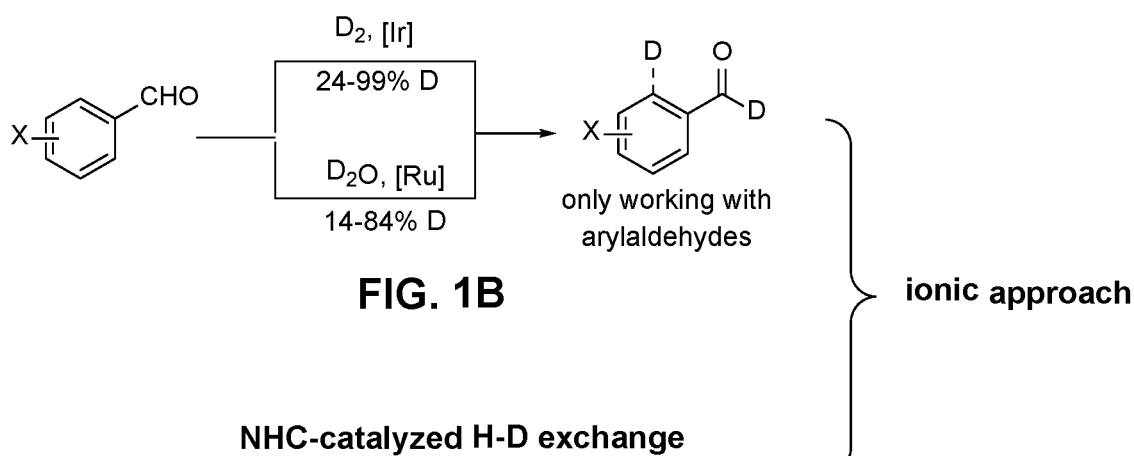
Figure 1C:
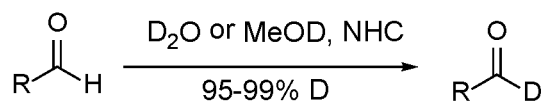

The present disclosure relates to organocatalytic strategy that enables directly converting readily accessible aldehydes to their 1-deutero counterparts using D$_2$O as the deuterium pool. The approach, distinct from the reported transition metal catalyzed ionic hydrogen-deuterium exchange (HDE) processes, employs a photoredox radical activation mode. The methods described herein may be useful for not only aromatic aldehydes, but also aliphatic substrates, which have been difficult for HDE. The present methods also may be useful for selective late-stage deuterium incorporation into complex structures with uniformly high deuteration level (>90%).

1. Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

Definitions of specific functional groups and chemical terms are described in more detail below. For purposes of this disclosure, the chemical elements are identified in accordance with the Periodic Table of the Elements, CAS version, Handbook of Chemistry and Physics, 75$^{th}$ Ed., inside cover, and specific functional groups are generally defined as described therein. Additionally, general principles of organic chemistry, as well as specific functional moieties and reactivity, are described in Organic Chemistry, Thomas Sorrell, University Science Books, Sausalito, 1999; Smith and March *March's Advanced Organic Chemistry*, 5$^{th}$ Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, 3$^{rd}$ Edition, Cambridge University Press, Cambridge, 1987; the entire contents of each of which are incorporated herein by reference.

The term "alkoxy" as used herein, refers to an alkyl group, as defined herein, appended to the parent molecular moiety through an oxygen atom. Representative examples of alkoxy include, but are not limited to, methoxy, ethoxy, propoxy, 2-propoxy, butoxy and tert-butoxy.

The term "alkyl" as used herein, means a straight or branched, saturated hydrocarbon chain containing from 1 to 20 carbon atoms. The term "lower alkyl" or "$C_{1-6}$alkyl" means a straight or branched chain hydrocarbon containing from 1 to 6 carbon atoms. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, and n-decyl.

The term "alkenyl" as used herein, means an unsaturated hydrocarbon chain containing from 2 to 20 carbon atoms and at least one carbon-carbon double bond.

The term "alkynyl" as used herein, means an unsaturated hydrocarbon chain containing from 2 to 20 carbon atoms and at least one carbon-carbon triple bond.

The term "alkylene", as used herein, refers to a divalent group derived from a straight or branched chain hydrocarbon of 1 to 10 carbon atoms, for example, of 2 to 5 carbon atoms. Representative examples of alkylene include, but are not limited to, —CH$_2$CH$_2$—, —CH$_2$CH$_2$CH$_2$—, —CH$_2$CH$_2$CH$_2$CH$_2$—, and —CH$_2$CH$_2$CH$_2$CH$_2$CH$_2$—.

The term "aryl" as used herein, refers to a phenyl group, or a bicyclic fused ring system. Bicyclic fused ring systems are exemplified by a phenyl group appended to the parent molecular moiety and fused to a cycloalkyl group, as defined herein, a phenyl group, a heteroaryl group, as defined herein, or a heterocycle, as defined herein. Representative examples of aryl include, but are not limited to, indolyl, naphthyl, phenyl, quinolinyl and tetrahydroquinolinyl.

The term "haloalkyl" as used herein, means an alkyl group, as defined herein, in which one, two, three, four, five, six, seven or eight hydrogen atoms are replaced by a halogen. Representative examples of haloalkyl include, but are not limited to, 2-fluoroethyl, 2,2,2-trifluoroethyl, trifluoromethyl, difluoromethyl, pentafluoroethyl, and trifluoropropyl such as 3,3,3-trifluoropropyl.

The term "cycloalkyl" as used herein, means a monovalent group derived from an all-carbon ring system containing zero heteroatoms as ring atoms, and zero double bonds. The all-carbon ring system can be a monocyclic, bicylic, or tricyclic ring system, and can be a fused ring system, a bridged ring system, or a spiro ring system, or combinations thereof. Examples of cycloalkyls include, but are not limited to, cyclopropyl, cyclobutyl, cyclopentyl, cyclohexyl, cycloheptyl, cyclooctyl, and

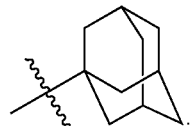 [SMILES: *C12CC3CC(CC(C3)C1)C2]

The cycloalkyl groups described herein can be appended to the parent molecular moiety through any substitutable carbon atom.

The term "cycloalkenyl" as used herein, means anonaromatic monocyclic or multicyclic ring system containing at least one carbon-carbon double bond and preferably having from 5-10 carbon atoms per ring. Exemplary monocyclic cycloalkenyl rings include cyclopentenyl, cyclohexenyl or cycloheptenyl.

The term "halogen" as used herein, means Cl, Br, I, or F.

The term "heteroaryl" as used herein, refers to an aromatic monocyclic ring or an aromatic bicyclic ring system or an aromatic tricyclic ring system. The aromatic monocyclic rings are five or six membered rings containing at least one heteroatom independently selected from the group consisting of N, O, and S (e.g. 1, 2, 3, or 4 heteroatoms independently selected from O, S, and N). The five membered aromatic monocyclic rings have two double bonds and the six membered six membered aromatic monocyclic rings have three double bonds. The bicyclic heteroaryl groups are exemplified by a monocyclic heteroaryl ring appended to the parent molecular moiety and fused to a monocyclic cycloalkyl group, as defined herein, a monocyclic aryl group, as defined herein, a monocyclic heteroaryl group, as defined herein, or a monocyclic heterocycle, as defined herein. The tricyclic heteroaryl groups are exemplified by a monocyclic heteroaryl ring appended to the parent molecular moiety and fused to two of a monocyclic cycloalkyl group, as defined herein, a monocyclic aryl group, as defined herein, a monocyclic heteroaryl group, as defined herein, or a monocyclic heterocycle, as defined herein. Representative examples of monocyclic heteroaryl include, but are not limited to, pyridinyl (including pyridin-2-yl, pyridin-3-yl, pyridin-4-yl), pyrimidinyl, pyrazinyl, thienyl, furyl, thiazolyl, thiadiazolyl, isoxazolyl, pyrazolyl, and 2-oxo-1,2-dihydropyridinyl. Representative examples of bicyclic heteroaryl include, but are not limited to, chromenyl, benzothienyl, benzodioxolyl, benzotriazolyl, quinolinyl, thienopyrrolyl, thienothienyl, imidazothiazolyl, benzothiazolyl, benzofuranyl, indolyl, quinolinyl, imidazopyridine, benzooxadiazolyl, and benzopyrazolyl. Representative examples of tricyclic heteroaryl include, but are not limited to, dibenzofuranyl and dibenzothienyl. The monocyclic, bicyclic, and tricyclic heteroaryls are connected to the parent molecular moiety through any carbon atom or any nitrogen atom contained within the rings.

The term "heterocycle" or "heterocyclic" as used herein, means a monocyclic heterocycle, a bicyclic heterocycle, or a tricyclic heterocycle. The monocyclic heterocycle is a three-, four-, five-, six-, seven-, or eight-membered ring containing at least one heteroatom independently selected from the group consisting of O, N, and S. The three- or four-membered ring contains zero or one double bond, and one heteroatom selected from the group consisting of O, N, and S. The five-membered ring contains zero or one double bond and one, two or three heteroatoms selected from the group consisting of O, N and S. The six-membered ring contains zero, one or two double bonds and one, two, or three heteroatoms selected from the group consisting of O, N, and S. The seven- and eight-membered rings contains zero, one, two, or three double bonds and one, two, or three heteroatoms selected from the group consisting of O, N, and S. Representative examples of monocyclic heterocycles include, but are not limited to, azetidinyl, azepanyl, aziridinyl, diazepanyl, 1,3-dioxanyl, 1,3-dioxolanyl, 1,3-dithiolanyl, 1,3-dithianyl, 1,3-dimethylpyrimidine-2,4(1H,3H)-dione, imidazolinyl, imidazolidinyl, isothiazolinyl, isothiazolidinyl, isoxazolinyl, isoxazolidinyl, morpholinyl, oxadiazolinyl, oxadiazolidinyl, oxazolinyl, oxazolidinyl, oxetanyl, piperazinyl, piperidinyl, pyranyl, pyrazolinyl, pyrazolidinyl, pyrrolinyl, pyrrolidinyl, tetrahydrofuranyl, tetrahydropyranyl, tetrahydropyridinyl, tetrahydrothienyl, thiadiazolinyl, thiadiazolidinyl, 1,2-thiazinanyl, 1,3-thiazinanyl, thiazolinyl, thiazolidinyl, thiomorpholinyl, 1,1-dioxidothiomorpholinyl (thiomorpholine sulfone), thiopyranyl, and trithianyl. The bicyclic heterocycle is a monocyclic heterocycle fused to a phenyl group, or a monocyclic heterocycle fused to a monocyclic cycloalkyl, or a monocyclic heterocycle fused to a monocyclic cycloalkenyl, or a monocyclic heterocycle fused to a monocyclic heterocycle, or a spiro heterocycle group, or a bridged monocyclic heterocycle ring system in which two non-adjacent atoms of the ring are linked by an alkylene bridge of 1, 2, 3, or 4 carbon atoms, or an alkenylene bridge of two, three, or four carbon atoms. Representative examples of bicyclic heterocycles include, but are not limited to, benzopyranyl, benzothiopyranyl, chromanyl, 2,3-dihydrobenzofuranyl, 2,3-dihydrobenzothienyl, 2,3-dihydroisoquinoline, 2-azaspiro[3.3] heptan-2-yl, azabicyclo[2.2.1]heptyl (including 2-azabicyclo[2.2.1]hept-2-yl), 2,3-dihydro-1H-indolyl, isoindolinyl, octahydrocyclopenta[c]pyrrolyl, octahydropyrrolopyridinyl, and tetrahydroisoquinolinyl. Tricyclic heterocycles are exemplified by a bicyclic heterocycle fused to a phenyl group, or a bicyclic heterocycle fused to a monocyclic cycloalkyl, or a bicyclic heterocycle fused to a monocyclic cycloalkenyl, or a bicyclic heterocycle fused to a monocyclic heterocycle, or a bicyclic heterocycle in which two non-adjacent atoms of the bicyclic ring are linked by an alkylene bridge of 1, 2, 3, or 4 carbon atoms, or an alkenylene bridge of two, three, or four carbon atoms. Examples of tricyclic heterocycles include, but are not limited to, octahydro-2,5-epoxypentalene, hexahydro-2H-2,5-methanocyclopenta[b]furan, hexahydro-1H-1,4-methanocyclopenta[c]furan, aza-adamantane (1-azatricyclo[3.3.1.1$^{3,7}$]decane), and oxa-adamantane (2-oxatricyclo[3.3.1.1$^{3,7}$]decane). The monocyclic, bicyclic, and tricyclic heterocycles are connected to the parent molecular moiety through any carbon atom or any nitrogen atom contained within the rings.

In some instances, the number of carbon atoms in a hydrocarbyl substituent (e.g., alkyl or cycloalkyl) is indicated by the prefix "$C_{x-y}$" or "$C_x$-$C_y$-", wherein x is the minimum and y is the maximum number of carbon atoms in the substituent. Thus, for example, "$C_{1-4}$ alkyl" or "$C_1$-$C_4$-alkyl" refers to an alkyl substituent containing from 1 to 4 carbon atoms.

The molecules and substituent groups as described herein are not deuterated, unless explicitly indicated otherwise. The term "deuterated" as used herein refers to a molecule or substituent group in which 1, 2, 3, 4, 5, 6, 7, or 8 hydrogen atoms are replaced by deuterium.

The term "level of deuterium incorporation" as used herein refers to the extent of deuterium labeling as determined by $^1$H NMR spectroscopy, and is measured by percentage deuteration as shown in Equation 1.

$$\% \text{ Deuteration} = 100 - \left| \left( \frac{\text{residual integral}}{\text{number of labelling sites}} \right) \times 100 \right| \qquad \text{Equation 1}$$

For compounds described herein, groups and substituents thereof may be selected in accordance with permitted valence of the atoms and the substituents, such that the selections and substitutions result in a stable compound, e.g., which does not spontaneously undergo transformation such as by rearrangement, cyclization, elimination, etc.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

2. Method

Figure 1D:
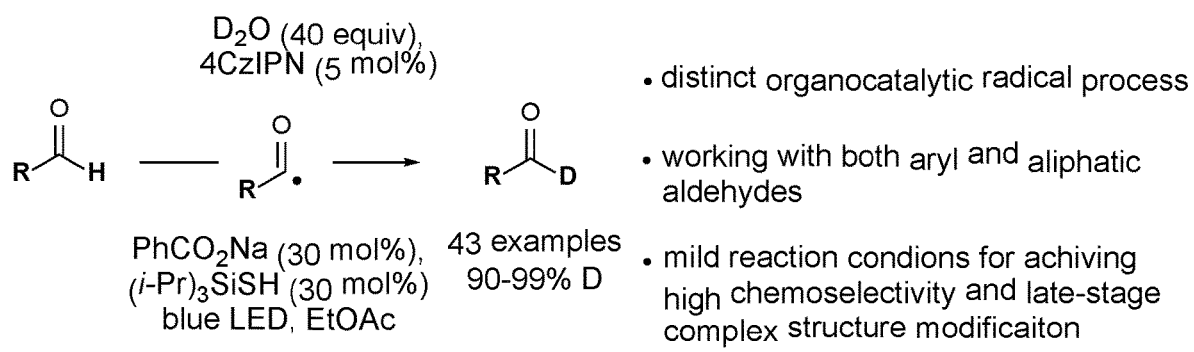

The present disclosure provides a general, visible light mediated, organocatalyzed hydrogen-deuterium exchange (HDE) process for directly converting readily accessible aldehydes to their 1-deutero counterparts using $D_2O$ as the deuterium pool (a representative procee is shown in FIG. 1D). Distinct from the above reported transition metal catalyzed ionic HDE processes, an organophotoredox catalytic radical strategy may be implemented. The hydrogen atom transfer (HAT) pathway may drive the reversible HDE process to form a 1-D-aldehyde when an excess of $D_2O$ is employed. Notably, this mild HDE method may be applied to the selective incorporation of deuterium into the C-1 position of aldehyde without deuteration on aromatic ring. The present method also may work effectively for aliphatic aldehydes, which have been an unmet synthetic problem in this area. The present method may be used to facilitate late-stage deuterium incorporation into complex structures. In particular embodiments, high level of deuterium incorporation (>90%) is achieved.

In one aspect, the present disclosure provides a method for preparing a deuterated aldehyde of formula

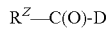

wherein $R^Z$ is alkyl, alkenyl, cycloalkyl, cycloalkenyl, aryl, heteroaryl, or heterocyclyl; wherein the alkyl, alkenyl, cycloalkyl, cycloalkenyl, aryl, heteroaryl, and heterocyclyl are each optionally substituted with one or more $R^a$, and $R^Z$ is optionally deuterated;

$R^a$ at each occurrence is independently halogen, —CN, —OH, nitro, —O-benzyl, —NH(t-butoxycarbonyl), —NH(benzyloxycarbonyl), or —X—$R^X$, wherein X is bond, O, NH, C(O), OC(O), or C(O)NH; and $R^X$ is alkyl, alkenyl, alkynyl, alkoxy, cycloalkyl, aryl, heteroaryl, or heterocyclyl, wherein the $R^X$ is optionally substituted, the method comprising:

(i) mixing an aldehyde of formula

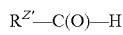

with a photocatalyst and a hydrogen atom transfer agent in a $H_2O$ free solvent comprising $D_2O$ and an organic solvent under an inert gas to form a mixture;

wherein $R^{Z'}$ is alkyl, alkenyl, cycloalkyl, cycloalkenyl, aryl, heteroaryl, or heterocyclyl; wherein the alkyl, alkenyl, cycloalkyl, cycloalkenyl, aryl, heteroaryl, and heterocyclyl are each optionally substituted with one or more $R^b$;

$R^b$ at each occurrence is independently halogen, —CN, —OH, nitro, —O-benzyl, —NH(t-butoxycarbonyl), —NH(benzyloxycarbonyl), or —Y—$R^Y$, wherein Y is bond, O, NH, C(O), OC(O), or C(O)NH; and $R^Y$ is alkyl, alkenyl, alkynyl, alkoxy, cycloalkyl, aryl, heteroaryl, or heterocyclyl, wherein the $R^Y$ is optionally substituted, and (ii) exposing the mixture of (i) to light, thereby producing the deuterated aldehyde.

In some embodiments, $R^Z$ is an optionally substituted aryl or an optionally substituted heteroaryl. For example, $R^Z$ may be

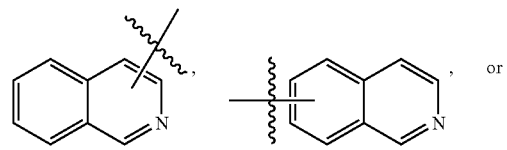

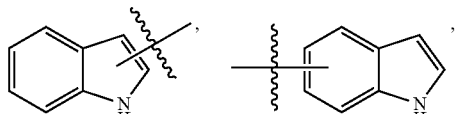

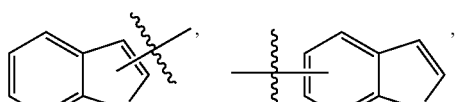

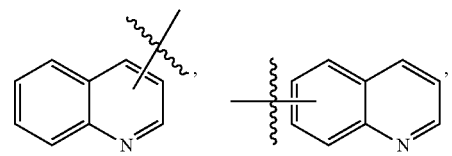

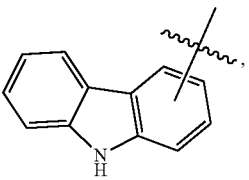

each of which is optionally substituted. In some embodiments, $R^Z$ is a phenyl, a naphthyl, a pyridinyl, an indolyl, a benzo[b]thiophene, each of which is optionally substituted.

In some embodiments, $R^Z$ is an optionally substituted $C_{2-20}$ alkyl, such as an optionally substituted $C_{2-10}$ alkyl or an optionally substituted $C_{2-6}$ alkyl.

In some embodiments, $R^{Z'}$ has a structure that is the same as the structure of $R^Z$. In some embodiments, $R^Z$ is a deuterated group, and $R^{Z'}$ has a structure that is different from the structure of $R^Z$ only in that the positions corresponding to the deuterium atoms in $R^Z$ are occupied by hydrogen in $R^{Z'}$. In other words, $R^{Z'}$ may be a non-deuterated equivalent of a deuterated $R^Z$ group. In some embodiments, the method as disclosed herein may produce $R^Z$—C(O)-D, in which $R^Z$ is deuterated, from a starting material $R^{Z'}$—C(O)—H, in which $R^{Z'}$ is not deuterated.

The photocatalyst may any suitable agent that produces an excited state upon irradiate (e.g. by visible light), which in turn catalyzes the formation of a radical from another molecule. Suitable photocatalysts include organic photoredox catalysts and photosensitizers known in the art. For example, the photocatalyst may include carbazole compounds, such as 2,4,5,6-tetra(9H-carbazol-9-yl)isophthalonitrile (4CzIPN), or derivatives thereof. In some embodiments, the photocatalyst is 4CzIPN, having a structure of

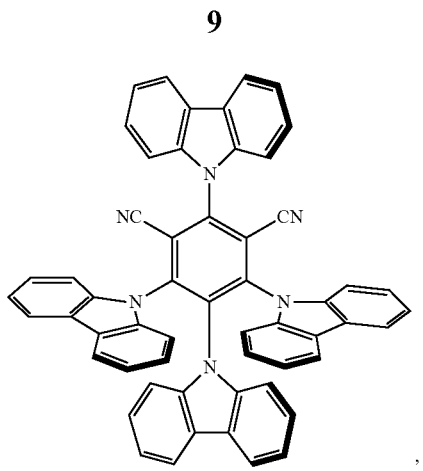

or a salt thereof.

In some embodiments, the hydrogen atom transfer agent is a $R^A$—SH, $R^B$—C(O)OM, or a combination thereof, wherein $R^A$ is —$C_{1-4}$alkylene-C(O)O$C_{1-4}$akyl or —Si($C_{1-4}$alkyl)$_3$;
$R^B$ is an aryl optionally substituted with 1, 2, 3, or 4 substituents independently selected from the group consisting of halogen, —CN, —OH, nitro, and $C_{1-4}$alkyl; and
M is a counterion other than $H^+$ In some embodiments, the the hydrogen atom transfer agent is

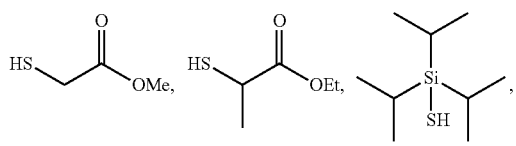

PhC(O)ONa, or a combination thereof. In some embodiments, the hydrogen atom transfer agent is a combination of

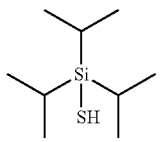

and PhC(O)ONa.

In some embodiments, the organic solvent is ethyl acetate (EtOAc).

In some embodiments, the inert gas comprises nitrogen ($N_2$).

In some embodiments, steps (i) and (ii) are carried out in an air-tight process, i.e., in the absence of air.

In some embodiments, deuterated aldehyde is selected from the group consisting of:

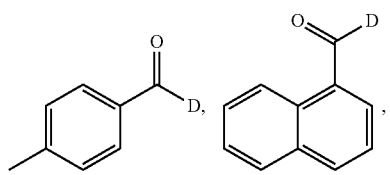

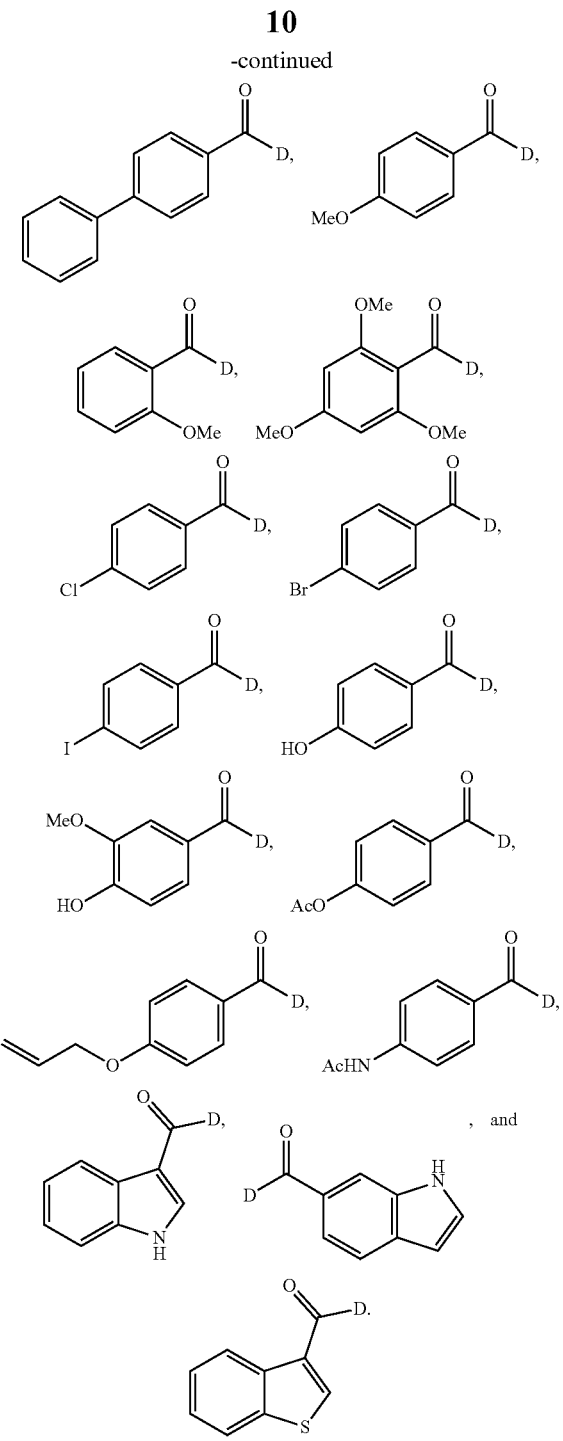

In some embodiments, the deuterated aldehyde is

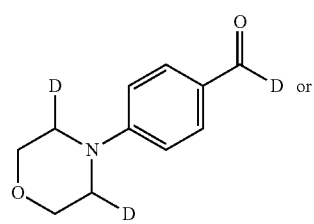

In some embodiments, the aldehyde of formula
$R^{Z'}-C(O)-H$
is selected from the group consisting of:
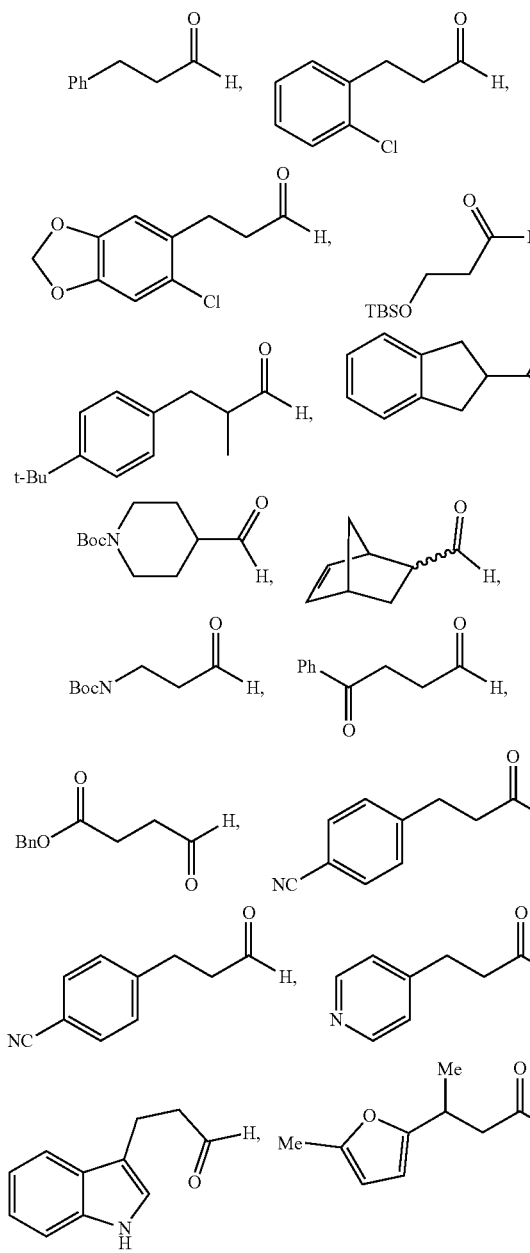
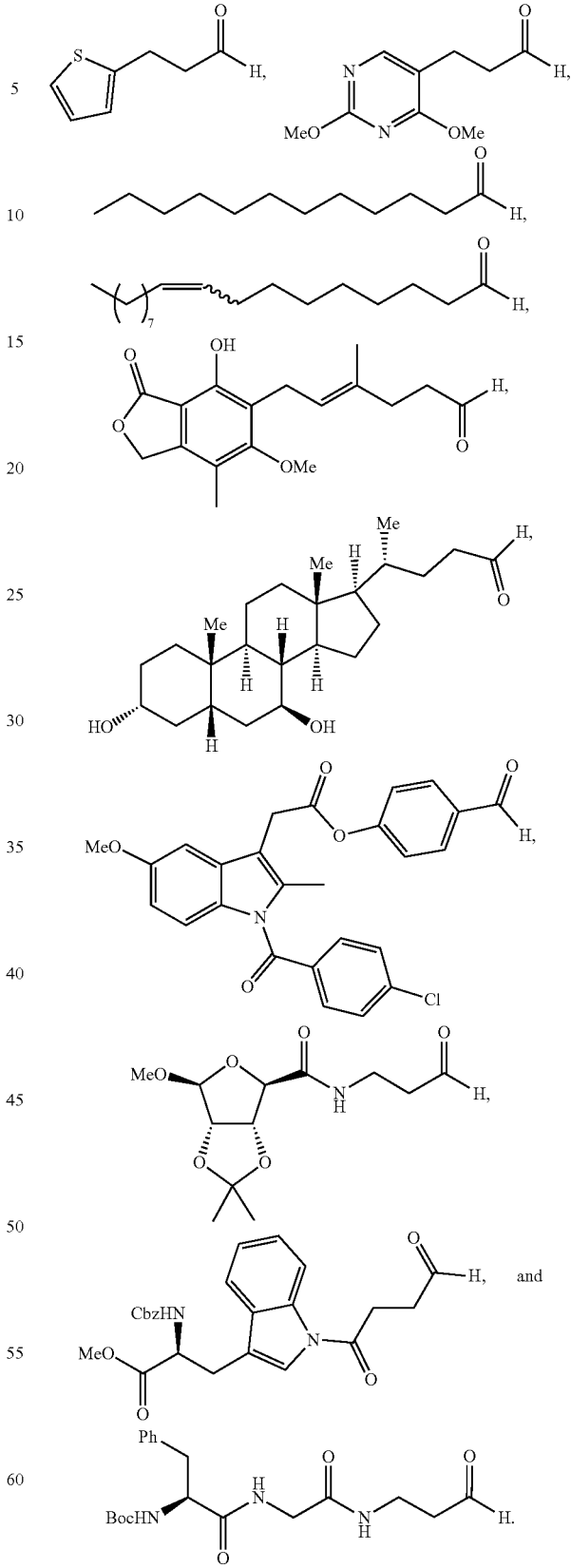
In some embodiments, the method disclosed herein further includes isolating the produced deuterated aldehyde.

Suitable method for isolating the deuterated aldehyde product may include those known in the art, such as chromatographic procedures.

In some embodiments, the method disclosed herein produces a level of deuterium incorporation of the —C(O)-D moiety of at least 90%. The level of deuterium incorporation of the —C(O)-D moiety may be at least 91%, at least 92%, at least 93%, at least 94%, at least 95%, at least 96%, at least 97%, at least 98%, at least 99%, or even at least 99.5%. The level of deuterium incorporation of the —C(O)-D moiety may be about 90% to 99.9%, about 92% to 99.9%, about 95% to 99.9%, about 97% to 99.9%, or even about 99% to 99.9%. In particular embodiments, the level of deuterium incorporation of the —C(O)-D moiety is at least 95%.

In another aspect, the present disclosure provides a deuterated aldehyde produced by the method disclosed herein.

In another aspect, the present disclosure provides an isolated deuterated aldehyde produced by the method disclosed herein.

The deuterated aldehyde or isolated deuterated aldehyde products as disclosed herein may be used as starting materials for the preparation of other compounds, including, for example, deuterated alcohols and deuterated pharmaceutical compounds.

Compound names are assigned by using Struct=Name naming algorithm as part of CHEMDRAW® ULTRA v. 12.0.

The compound may exist as a stereoisomer wherein asymmetric or chiral centers are present. The stereoisomer is "R" or "S" depending on the configuration of substituents around the chiral carbon atom. The terms "R" and "S" used herein are configurations as defined in IUPAC 1974 Recommendations for Section E, Fundamental Stereochemistry, in Pure Appl. Chem., 1976, 45: 13-30. The disclosure contemplates various stereoisomers and mixtures thereof and these are specifically included within the scope of this invention. Stereoisomers include enantiomers and diastereomers, and mixtures of enantiomers or diastereomers. Individual stereoisomers of the compounds may be prepared synthetically from commercially available starting materials, which contain asymmetric or chiral centers or by preparation of racemic mixtures followed by methods of resolution well-known to those of ordinary skill in the art. These methods of resolution are exemplified by (1) attachment of a mixture of enantiomers to a chiral auxiliary, separation of the resulting mixture of diastereomers by recrystallization or chromatography and optional liberation of the optically pure product from the auxiliary as described in Furniss, Hannaford, Smith, and Tatchell, "Vogel's Textbook of Practical Organic Chemistry", 5th edition (1989), Longman Scientific & Technical, Essex CM20 2JE, England, or (2) direct separation of the mixture of optical enantiomers on chiral chromatographic columns or (3) fractional recrystallization methods.

It should be understood that the compound may possess tautomeric forms, as well as geometric isomers, and that these also constitute an aspect of the invention.

3. EXAMPLES

General Information. Commercially available reagents were purchased from Sigma Aldrich, Matrix Chemical, AKSci, Alfa Aesar, Acros, AmBeed or TCI, and used as received unless otherwise noted. Merck 60 silica gel was used for chromatography, and Whatman silica gel plates with a fluorescence F254 indicator were used for thin-layer chromatography (TLC) analysis. $^1$H and $^{13}$C NMR spectra were recorded on Bruker Avance 500 MHz or Varian 400 MHz. Chemical shifts in $^1$H NMR spectra are reported in parts per million (ppm) relative to residual chloroform (7.26 ppm) or dimethyl sulfoxide (2.50 ppm) as internal standards.

1H NMR data are reported as follows: chemical shift, multiplicity (s=singlet, d=doublet, quint=quintet, sext=sextet, m=multiplet, br=broad), coupling constant in Hertz (Hz) and hydrogen numbers based on integration intensities. $^{13}$C NMR chemical shifts are reported in ppm relative to the central peak of CDCl$_3$ (77.16 ppm) or (CD$_3$)$_2$SO (39.52 ppm) as internal standards. Low-resolution mass spectrometry was performed in Analytical and Biological Mass Spectrometry Center. Commercial products of blue LED strip and 34 W Kessil Blue LEDs were used.

Example 1. Model Deuteration Reaction

A model deuteration reaction of p-tolualdehyde with D$_2$O in the presence of a photocatalyst and a HAT catalyst was studied (Scheme 1 and Table 1). In general, to an oven-dried 10 mL-Schlenk tube equipped with a stir bar, was added aldehyde (0.2 mmol, 1.0 equiv), photocatalyst 4CzIPN (8 mg, 5 mol %), indicated reagents and 1 mL of anhydrous solvents. The mixture was degassed by freeze-pump-thaw method, then sealed with parafilm. The solution was then stirred at room temperature under the irradiation of a blue LED strip for indicated time. After completion of the reaction, the mixture was concentrated. The yield and deuteration ratio were determined by $^1$H NMR.

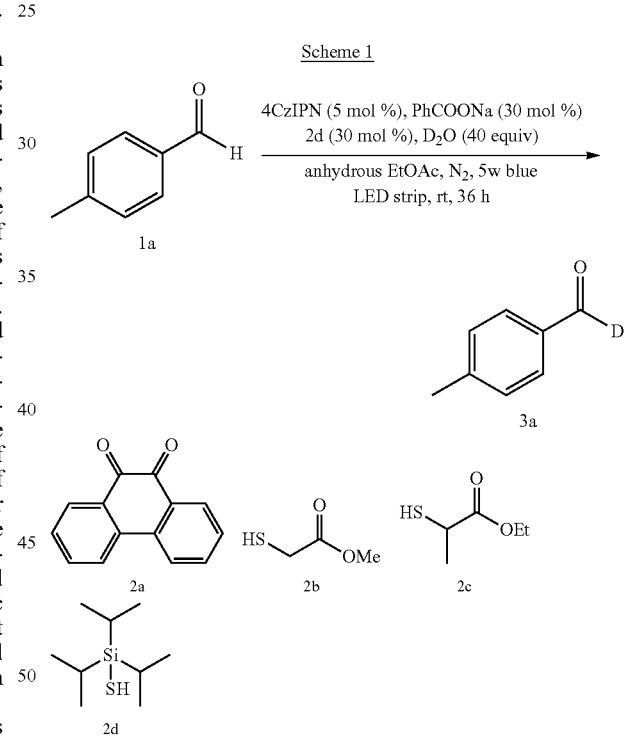

Scheme 1

TABLE 1

Results of reactions under Scheme 1

| Entry | Variation of standard conditions | Y (%)[b] | D (%)[d] |
|---|---|---|---|
| 1[a] | none | 95 (91[c]) | 97 |
| 2 | 2a instead of 4CzIPN and PhCO$_2$Na | 89 | 23 |
| 3 | 2b instead of 2d | 87 | 95 |
| 4 | 2c instead of 2d | 91 | 82 |
| 5 | dry MeCN instead of EtOAc | 93 | 16 |
| 6 | dry DMF instead of EtOAc | 94 | <5 |
| 7 | without PhCO$_2$Na | 93 | 46 |
| 8 | without 2d | 93 | <5 |

TABLE 1-continued

Results of reactions under Scheme 1

| Entry | Variation of standard conditions | Y (%)[b] | D (%)[d] |
|---|---|---|---|
| 9 | no light or no photocatalyst | 95 | <5 |
| 10 | open to air | <5 | N.D. |

[a]Standard reaction conditions: A mixture of 1a (0.2 mmol), 4CzIPN (5 mol %), sodium benzoate (30 mol %), 2d (30 mol %), D$_2$O (40 equiv) in anhydrous EtOAc (0.2M) was irradiated by 5 W blue LED strip under N$_2$ atmosphere for 36 h. Isotope exchanged 2 d of 1M anhydrous EtOAc solution was prepared by following procedure: dissolve 2 d (1 mmol) in 1 mL of anhydrous EtOAc followed by adding D$_2$O (10 mmol); after 1 h stirring, the top EtOAc layer was separated and used in reaction.
[b]$^1$H NMR yield.
[c]Isolated yield.
[d]D (deuteration) % determined by $^1$H NMR.
Y: isolated yield;
D: deuteration ratio;
N.D.: not detected.

The reaction using 4CzIPN, PhCOONa, and 2d in anhydrous EtOAc provided high yield (95%) and high level of deuterium incorporation (97%) (Table 1, entry 1). A level of 95% D-incorporation and 87% yield were obtained using 2b (entry 3). Without PhCO$_2$Na, moderate deuterated product was detected (entry 7). Screening of thiol HAT catalysts revealed triisopropylsilanethiol to be optimal one (entry 1 vs entries 3 and 4), and ethyl acetate yielded better results under these conditions than MeCN and DMF (entry 1 vs 5 and 6). Results of control studies show that light and photocatalyst are necessary for the deuteration process (entry 9). When the reaction was open to air, p-tolualdehyde was oxidized to benzoic acid (entry 10). These results demonstrate effective reaction conditions as follows: 4CzIPN (5 mol %) as photo-redox promoter, PhCO$_2$Na (30 mol %) and triisopropylsilanethiol (30 mol %) as HAT and D$_2$O (40 equiv) in anhydrous EtOAc (0.2 M) by 5 W blue LED strip under N$_2$ at rt. To reduce the introduction of extra protium in reaction as much as possible, isotope exchanging of 2d was performed by stirring 2d solution of anhydrous EtOAc with 10 equiv D$_2$O for 1 h.

Other tests for the reactions conditions were conducted (Scheme 2 and Table 2). Notably, a previously reported HAT photocatalyst, 9,10-phenanthrenequinone (2a), gave low or almost no deuterium incorporated product 3a (Table 1, entry 2 and Table 2, entry 1). Switching to the photoredox catalytic system of 4CzIPN as photosensitizer (PS) and methyl 2-mercaptoacetate 2b as HAT gave moderate deuterium incorporation (40%, Table 2, entry 7), but the results were not reproducible. In these studies, it was accidently found that the impurity of sodium dodecyl sulfate (SDS) from the detergent contaminated reaction flask could generate reproducible results (40% D incorporation, Table 2, entry 21). It was hypothesized that sodium dodecyl sulfate (SDS) might serve as more effective HAT. It was reported that benzoyloxy radical PhCOO·, produced from PhCO$_2$Na in the presence of a PS, could selectively and efficiently abstract the hydrogen atom from the formyl group. Here, the effect of PhCO$_2$Na was also studied (Table 2, entry 22).

Scheme 2

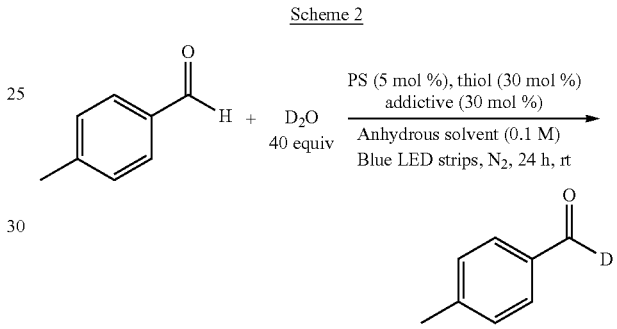

TABLE 2

Results of reactions under Scheme 2

| Entry | PS | Thiol (30 mol %) | Addictive (30 mol %) | Solvent | Y (%) | D (%) |
|---|---|---|---|---|---|---|
| 1 | 2a | BnSH | — | MeCN | 94 | <5 |
| 2 | 4CzIPN | BnSH | — | MeCN | 92 | 30 |
| 3 | 4CzIPN | Benzenethiol | — | MeCN | 95 | <5 |
| 4 | 4CzIPN | 4-Nitro-benzenethiol | — | MeCN | 94 | <5 |
| 5 | 4CzIPN | BnSSBn | — | MeCN | 93 | 25 |
| 6 | 4CzIPN | BnSH | Na$_2$CO$_3$ | MeCN | 90 | <5 |
| 7 | 4CzIPN | 2b | — | MeCN | 90 | 40 |
| 8 | 4CzIPN | 2c | — | MeCN | 90 | 33 |
| 9 | Eosin Y | 2b | — | MeCN | 93 | <5 |
| 10 | Rhodamine B | 2b | — | MeCN | 95 | <5 |
| 11 | Phenylglyoxylic acid | 2b | — | MeCN | 92 | <5 |
| 12 | 9,10-Phenanthrenequinone | 2b | — | MeCN | 94 | <5 |
| 13 | Methylene Blue | 2b | — | MeCN | 93 | 30 |
| 14 | 4CzIPN | 2b | 2,6-Lutidine | MeCN | 89 | 33 |
| 15 | 4CzIPN | 2b | quinuclidine | MeCN | 92 | 36 |
| 16 | 4CzIPN | 2b | 3-hydroxyquinuclidine | MeCN | 91 | 19 |

TABLE 2-continued

Results of reactions under Scheme 2

| Entry | PS | Thiol (30 mol %) | Addictive (30 mol %) | Solvent | Y (%) | D (%) |
|---|---|---|---|---|---|---|
| 17 | 4CzIPN | 2b | ![quinuclidine-OAc structure] | MeCN | 92 | 15 |
| 18 | 4CzIPN | 2b | Pyridine | MeCN | 90 | 26 |
| 19 | 4CzIPN | 2b | DMAP | MeCN | 91 | 12 |
| 20 | 4CzIPN | 2b | Quinoline | MeCN | 88 | 14 |
| 21 | 4CzIPN | 2b | Sodium dodecyl sulfate | MeCN | 88 | 40 |
| 22 | 4CzIPN | 2b | $PhCO_2Na$ | MeCN | 93 | 53 |
| 23 | 4CzIPN | 2b | $PhCO_2Na$ | DMF | 93 | <5 |
| 24 | 4CzIPN | 2b | $PhCO_2Na$ | $PhCF_3$ | 96 | <5 |
| 25 | 4CzIPN | 2b | $PhCO_2Na$ | Acetone | 97 | 40 |
| 26 | 4CzIPN | 2b | $PhCO_2Na$ | THF | 94 | <5 |
| 27 | 4CzIPN | 2b | $PhCO_2Na$ | EtOAc | 94 | 65 |
| 28[a] | 4CzIPN | 2b | $PhCO_2Na$ | EtOAc | 92 | 79 |
| 29[b] | 4CzIPN | 2b | $PhCO_2Na$ | EtOAc | 96 | 85 |
| 30[c] | 4CzIPN | 2b | $PhCO_2Na$ | EtOAc | 95 | 95 |
| 31[d] | 4CzIPN | 2b | $PhCO_2Na$ | EtOAc | 95 (91[e]) | 97 |

[a]Reaction time: 40 h;
[b]Reaction time 48 h;
[c]Reaction time 72 h;
[d]HSSi(i-Pr)$_3$ as HAT catalyst;
[e]Isolated yield.
Y: yield;
D: deuteration ratio.

Based on these results, a possible reaction mechanism is proposed (Scheme 3). Irradiation of photocatalyst 4CzIPN by visible light generates the excited state 4CzIPN*, which oxidizes sodium benzoate 5 to give benzoyloxy radical 7 for a subsequent HAT. The key acyl radical 4 is formed by abstraction of a hydrogen from aldehyde precursor 1. Then the second HAT process between resulting acyl radical 4 and deuterated thiol 10, delivers deuterated aldehyde product 3 and concurrent generation of thiyl radical 8. Finally, the thiyl radical is reduced by the 4CzIPN·⁻ to give the thiolate 9 and 4CzIPN to complete the redox cycle. The more basic thiolate anion 9 serve as an internal base to deprotonate the benzoic acid (pKa=10) to regenerate HAT catalysts 5 and 2d. The latter HAT catalyst can be transformed to deuterated thiol 10 by H-D exchanging (HDE) with $D_2O$. It is also possible that 9 can be directly protonated to give 10.

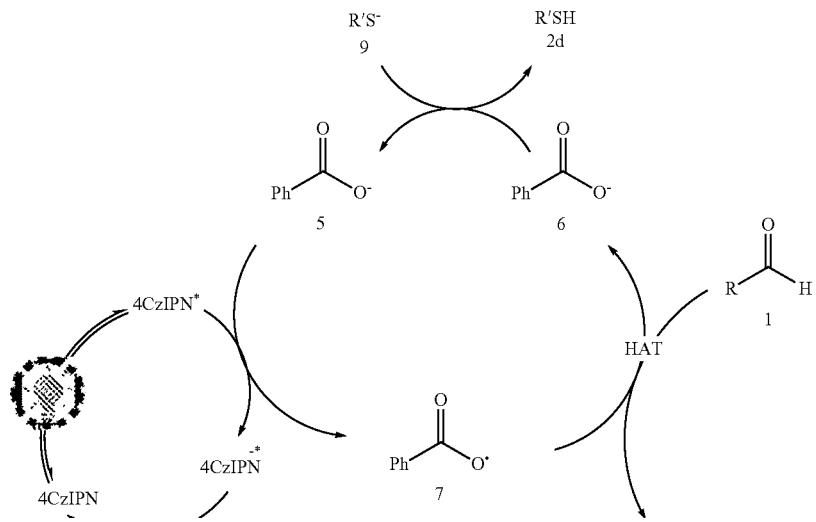

Scheme 3

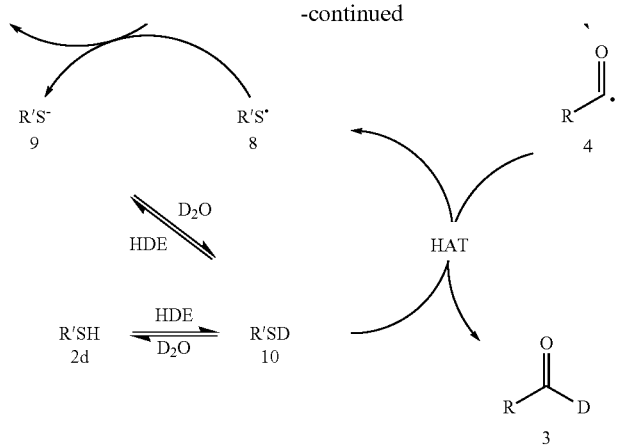

HAT: hydrogen atom transfer
HDE: hydorgen deuterium exchange

Example 2. Preparation of Deuterated Aromatic Aldehydes

The scope of deuteration process was probed. The methodology serves as a mild, general approach for the synthesis of a wide array of deuterated aromatic aldehydes in good yields (up to 99%) and with uniformly high levels (90-98%) of deuterium incorporation (Scheme 4). In general, the substrates of aromatic ring containing electron donating groups (MeO, AcO, AcHN, morpholine) gave slightly better results. It is believed that their enhancement in the nucleophilicity of acyl radical provides higher reactivity in the electrophilic HAT process. Notably, various functional groups, such as free hydroxy (3j and 3k), halogen substituents (3j, 3 h, 3i), ester (3l, 3s), and allylic (3m) can be tolerated by the deuteration protocol. Moreover, heteroaromatic aldehydes underwent deuteration smoothly to afford desired products (3p, 3q, 3r).

Scheme 4

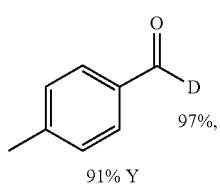
3a

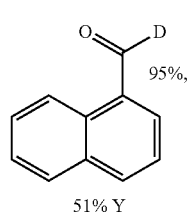
3b

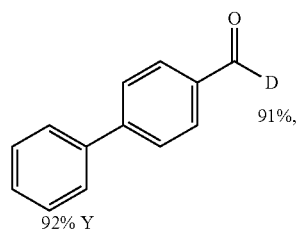
3c

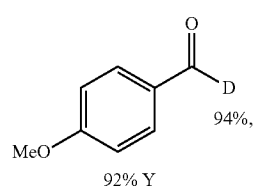
3d

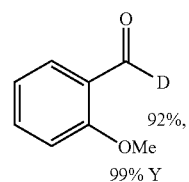
3e

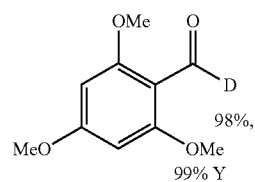
3f

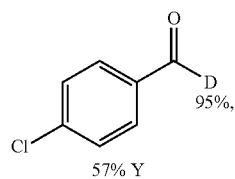
3g

-continued

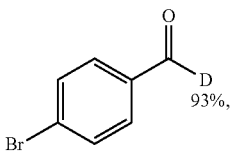
93%,
47% Y
3h

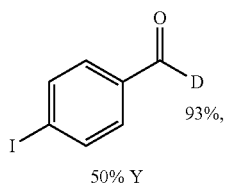
93%,
50% Y
3i

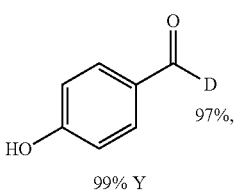
97%,
99% Y
3j

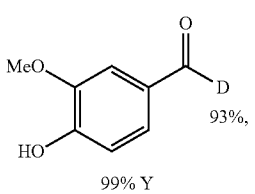
93%,
99% Y
3k

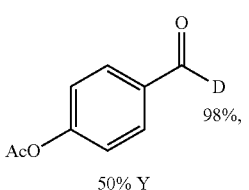
98%,
50% Y
3l

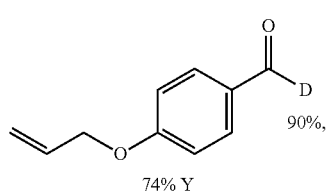
90%,
74% Y
3m

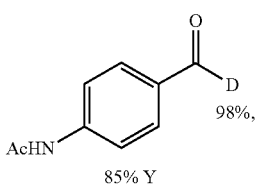
98%,
85% Y
3n

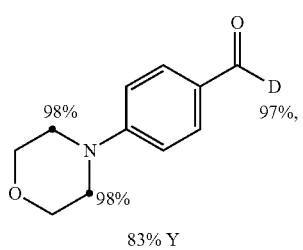
97%,
83% Y
3o

-continued

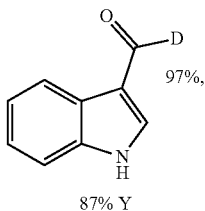
97%,
87% Y
3p

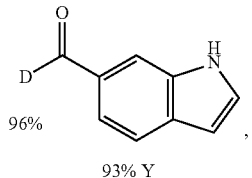
96%
93% Y
3q

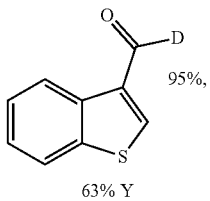
95%,
63% Y
3r

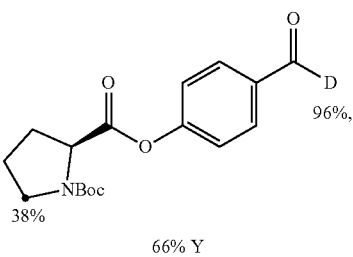
96%,
66% Y
3s

Y: isolated yields. D % is determined by $^1$H NMR spectroscopy.
Boc: *tert*-butoxycarbonyl.

Example 3. Preparation of Deuterated Aliphatic Aldehydes

Aliphatic aldehyde remain an unsolved synthetic challenge for their C-1 deuteration. Remarkably, the present method was also effective for deuteration of aliphatic aldehydes, affording the corresponding C-1 deuterated products (3t-3aa) in 52-99% yields and with uniformly high level of D-incorporation (93-98%) under the optimized mild reaction condition (Scheme 5). It is noteworthy that under the mild reaction conditions, the formation of decarbonylated side products is minimized. Nonetheless, in many cases, D-incorporation into other acidic C—H positions, in particular enolizable α-position is observed. Again, a wide array of functional groups such as radical sensitive C═C (3aa, 3am), amide (3ab), ketone (3ac), ester (3ad), and cyanide (3ae and 3af) are tolerated. Moreover, the reaction can be applied to generate aliphatic deuterated aldehydes, which contain synthetically and biologically relevant heterocycles, including pyridine (3ag), indole (3ah), furan (3ai), thiophene (3aj) and pyrimidine (3ak). Furthermore, aliphatic aldehydes bearing long chain also work smoothly (3al and 3am). Isomerization of the cis C═C double bond in 3am was observed.

Scheme 5
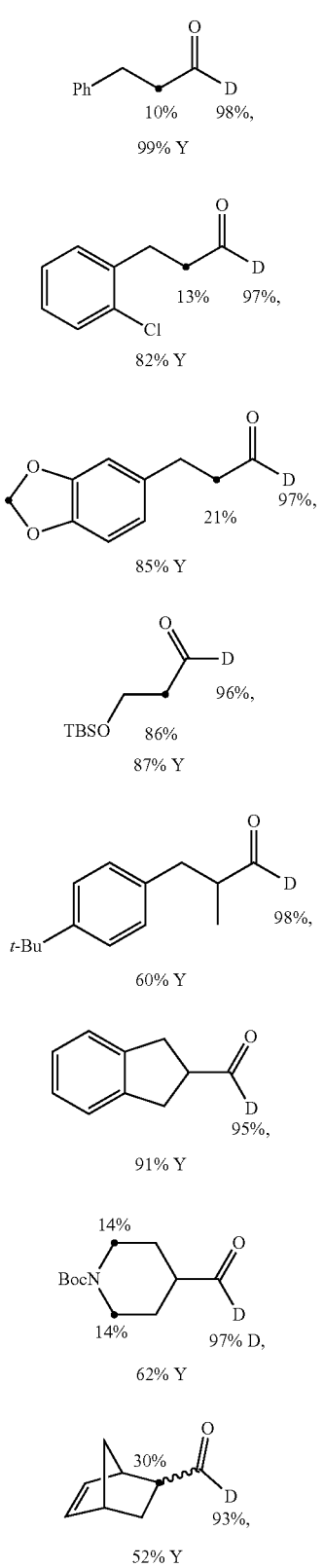
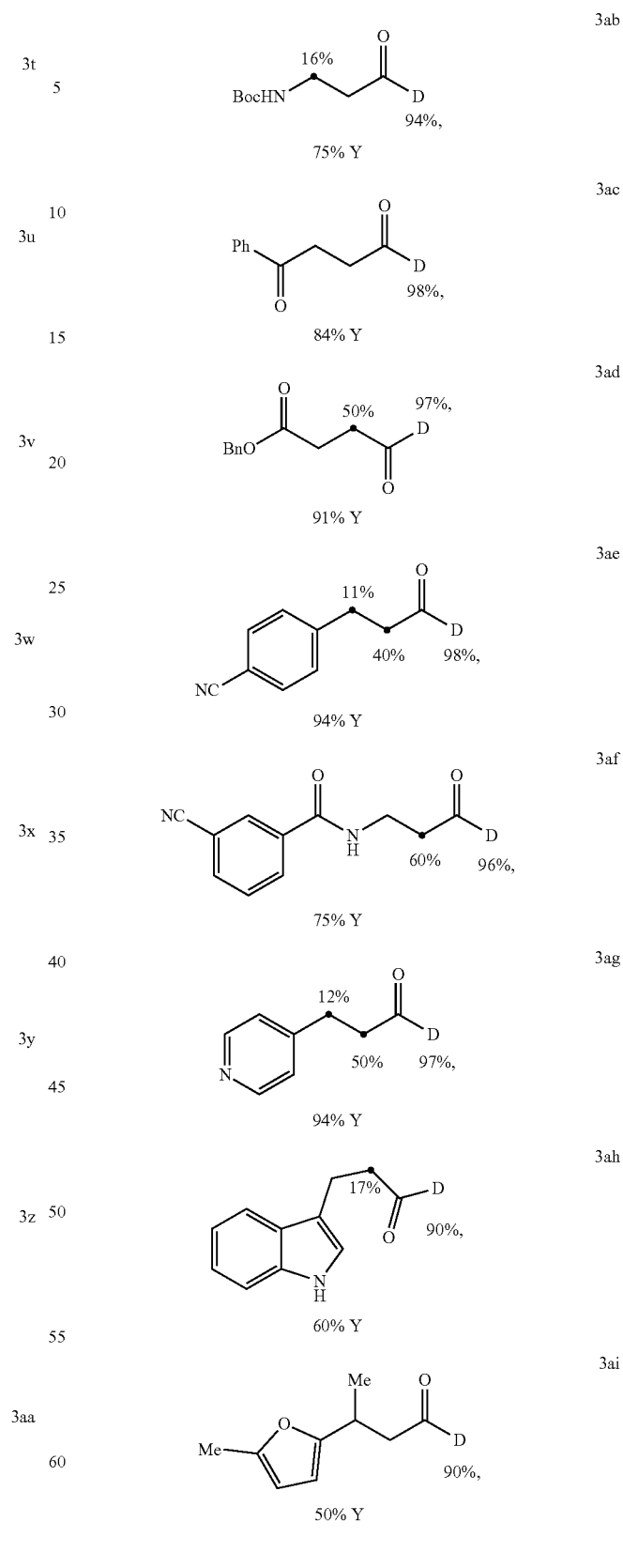

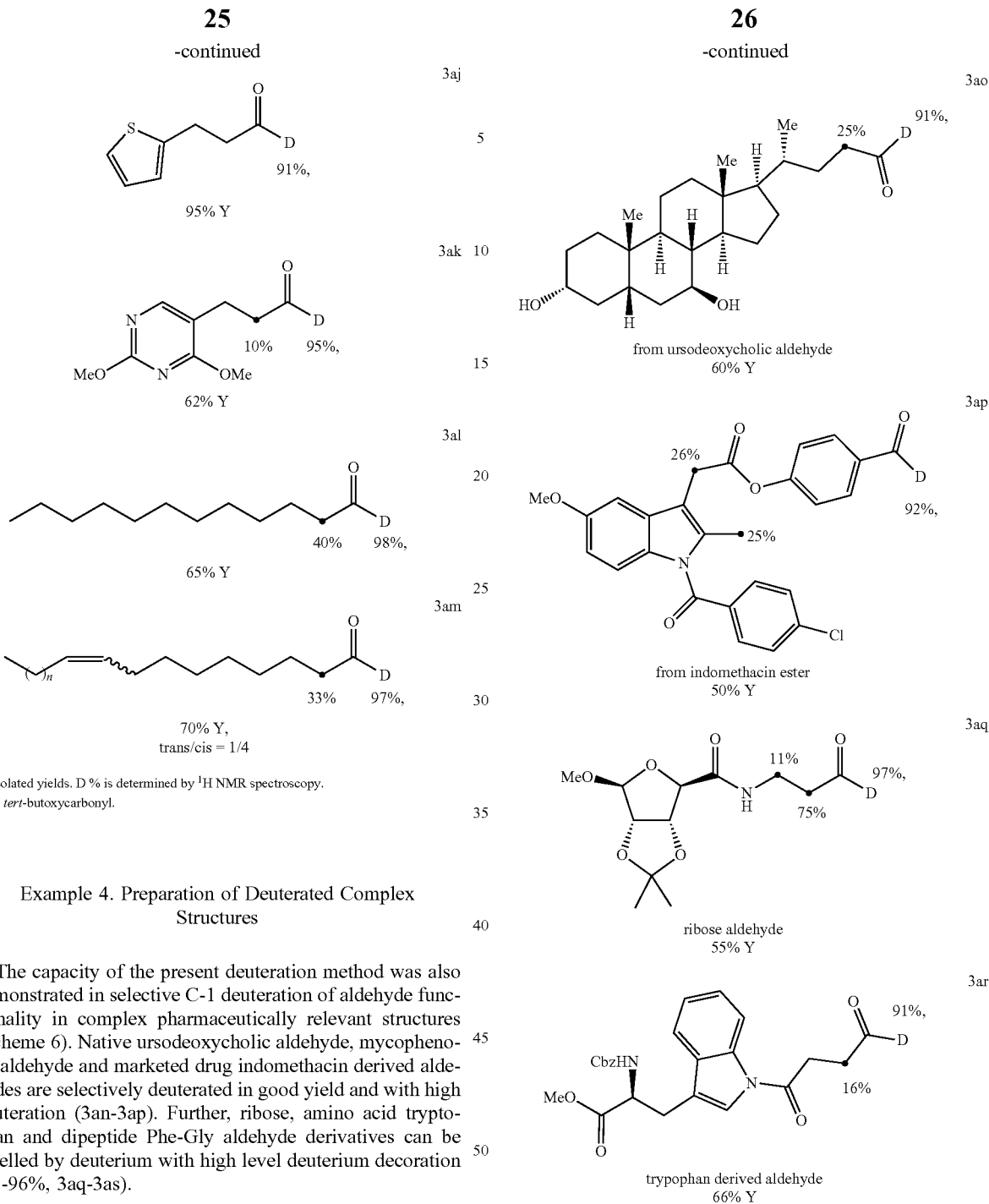

Example 4. Preparation of Deuterated Complex Structures

The capacity of the present deuteration method was also demonstrated in selective C-1 deuteration of aldehyde functionality in complex pharmaceutically relevant structures (Scheme 6). Native ursodeoxycholic aldehyde, mycophenolic aldehyde and marketed drug indomethacin derived aldehydes are selectively deuterated in good yield and with high deuteration (3an-3ap). Further, ribose, amino acid tryptophan and dipeptide Phe-Gly aldehyde derivatives can be labelled by deuterium with high level deuterium decoration (91-96%, 3aq-3as).

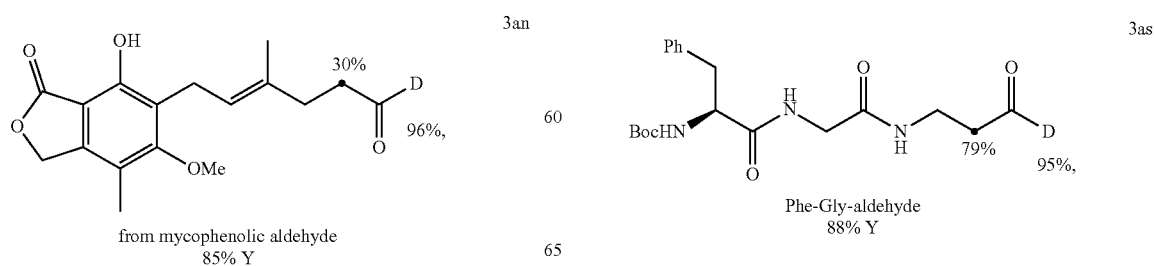

Example 5. Preparation of Aldehyde Substrates

General procedure for the synthesis of compound (1v, 1y, 1ab)

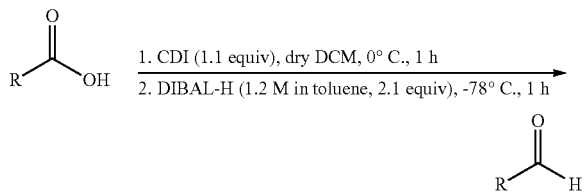

General procedure: To a dried 10 mL Schlenk tube was added acid (1 mmol, 1.0 equiv) and capped with rubber stopper. The tube is purged with $N_2$ and protected by $N_2$ in balloon. 5 mL anhydrous DCM was added under $N_2$. The solution was cooled to 0° C. (ice bath) and 178 mg (1.1 mmol, 1.1 equiv) 1,1'-carbonyldiimidazole (CDI) were added. After stirring for 60 min, the colorless reaction solution was cooled to −78° C. (dry ice/acetone bath) for 15 min. Subsequently, 1.75 mL (2.1 mmol, 2.1 equiv) of DIBAL-H solution (1.2 M in toluene) were added dropwise with a syringe throughout 10 min. The reaction mixture was stirred at −78° C. for 1 h. The reaction mixture was quenched by the addition of 2 mL of EtOAc followed by 5 mL of tartaric acid solution (25% in $H_2O$) under vigorous stirring. The mixture was warmed up to RT and stirred vigorously for 15 min. The mixture was extracted with EtOAc (3×10 mL) and the combined organic extracts were washed with 1 M HCl (1×10 mL), saturated $NaHCO_3$ (1×10 mL) and brine (1×10 mL), dried over $Na_2SO_4$, filtered and concentrated under reduced pressure. The crude product purified by flash chromatography on silica gel.

3-(benzo[d][1,3]dioxol-5-yl)propanal (1v)

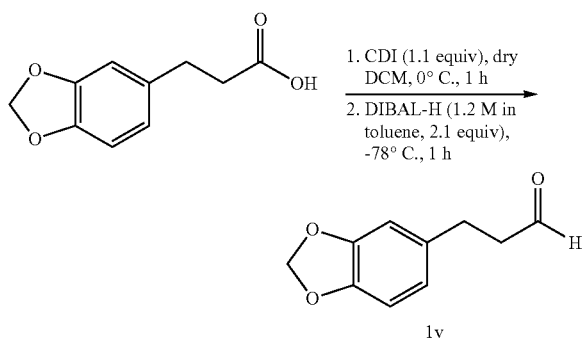

This substrate was synthesized following the general procedure. The crude product was purified by flash chromatography on silica gel (acetone/hexane=1/9) to afford product (139 mg, 78% yield) as colorless oil. $^1$H NMR (400 MHz, $CDCl_3$) δ 9.79 (1H, t, J=1.2 Hz), 6.72 (1H, d, J=7.8 Hz), 6.67 (d, J=1.5 Hz, 1H), 6.63 (dd, J=7.9, 1.4 Hz, 1H), 5.91 (s, 2H), 2.87 (2H, t, J=7.4 Hz), 2.72 (t, J=7.3 Hz, 2H); $^{13}$C NMR (100 MHz, $CDCl_3$) δ 201.32, 147.88, 146.04, 134.15, 121.15, 108.83, 108.36, 101.10, 45.55, 28.01.

2,3-dihydro-1H-indene-2-carbaldehyde (1y)

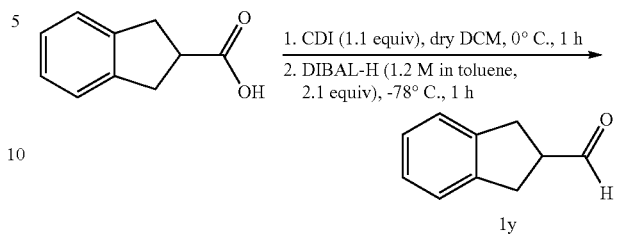

This substrate was synthesized following the general procedure. The crude product was purified by flash chromatography on silica gel ($Et_2O$/hexane=1/19) to afford product (112 mg, 77% yield) as colorless oil. $^1$H NMR (400 MHz, $CDCl_3$) δ 9.78 (d, J=1.3 Hz, 1H), 7.25 (dd, J=5.3, 3.5 Hz, 2H), 7.18 (dd, J=5.4, 3.3 Hz, 2H), 3.35-3.25 (m, 3H), 3.23-3.16 (m, 2H). $^{13}$C NMR (100 MHz, $CDCl_3$) δ 202.84, 141.17, 126.86, 124.68, 50.70, 32.99.

tert-butyl (3-oxopropyl)carbamate (1ab)

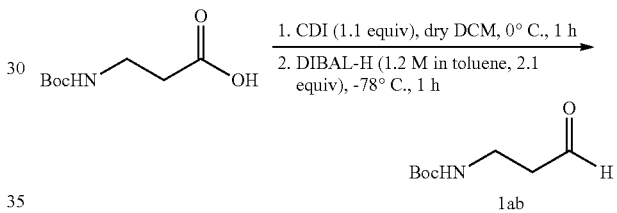

This substrate was synthesized following the general procedure. The crude product was purified by flash chromatography on silica gel (EtOAc/hexane=1/3) to afford product (151 mg, 87% yield) as colorless oil. $^1$H NMR (400 MHz, $CDCl_3$) δ 9.70 (s, 1H), 5.05 (br, 1H), 3.32 (q, J=6.0 Hz, 2H), 2.60 (t, J=5.9 Hz, 2H), 1.32 (s, 9H). $^{13}$C NMR (100 MHz, $CDCl_3$) δ 201.43, 155.83, 79.25, 44.22, 34.02, 28.29.

4-oxo-4-phenylbutanal (1ac)

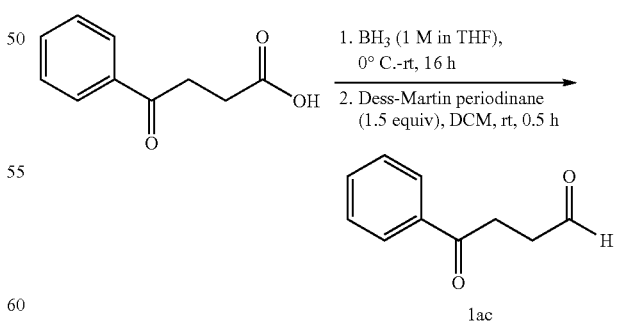

At 0° C., to the solution of 4-oxo-4-phenylbutanoic acid (356 mg, 2 mmol, 1.0 equiv) in anhydrous THF 5 mL was added $BH_3$ (1M in THF, 6 mL, 6 mmol, 3.0 equiv) dropwise for 10 min. The reaction was warmed up to room temperature and stirred for 16 h. After the completion of reaction, the solvent was removed under vacuum. To the crude mixture was added DCM (5 mL) followed by adding Dess-Martin periodinane (1.3 g, 3 mmol, 1.5 equiv), the reaction was stirred at room temperature for 0.5 h indicated by TLC. 5 mL of Saturated sodium thiosulfate solution was added to flask to quench reaction and followed by 5 mL saturated NaHCO$_3$ solution. The mixture was stirred for 15 min until it turns to be clear. The reaction was extracted with DCM (3×10 mL) and the combined organic extracts were washed with brine (1×10 mL), dried over Na$_2$SO$_4$, filtered and concentrated under reduced pressure. The crude product was purified by flash chromatography on silica gel (EtOAc/hexane=1/2) to afford product 194 mg (60% yield for two steps) as colorless oil. $^1$H NMR (400 MHz, CDCl$_3$) δ 9.91 (s, 1H), 7.99 (d, J=7.4 Hz, 2H), 7.58 (t, J=7.4 Hz, 1H), 7.47 (t, J=7.7 Hz, 2H), 3.33 (t, J=6.3 Hz, 2H), 2.94 (t, J=6.3 Hz, 2H). $^{13}$C NMR (100 MHz, CDCl$_3$) δ 200.75, 197.94, 136.56, 133.47, 128.79, 128.21, 37.76, 31.16.

benzyl 4-oxobutanoate (1ad)

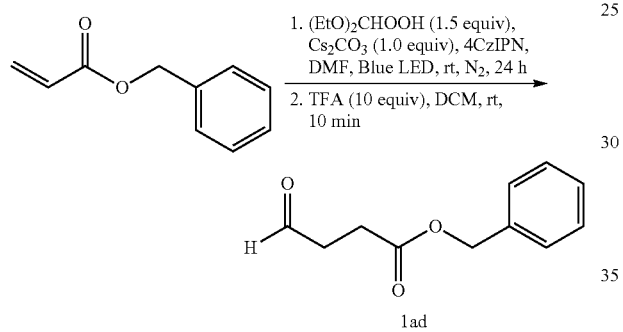

1ad

To an oven-dried 10 mL-Schlenk tube equipped with a stir bar, was added benzyl acrylate (162 mg, 1.0 mmol, 1.0 equiv), 2,2-diethoxyacetic acid (222 mg, 1.5 mmol, 1.5 equiv), photocatalyst 4CzIPN (40 mg, 5 mol %), Cs$_2$CO$_3$ (325 mg, 1 mmol, 1.0 equiv), DMF (5 mL, 0.2M). The mixture was degassed by freeze-pump-thaw method, then sealed with parafilm. The solution was then stirred at room temperature under the irradiation of a blue LED strip for 24 h. After completion of the reaction, the mixture was diluted by adding 10 mL of EtOAc and 30 mL of water. The reaction was extracted with EtOA (3×10 mL) and the combined organic extracts were washed with brine (1×10 mL), dried over Na$_2$SO$_4$, filtered and concentrated under reduced pressure. DCM (5 mL) was added to crude residue followed by 0.75 mL of TFA (10 equiv). The reaction mixture was stirred at room temperature for 10 min. Saturated NaHCO$_3$ (10 mL) solution was added slowly to quench the reaction. The reaction mixture was extracted with DCM (3×10 mL) and the combined organic extracts were washed with brine (1×10 mL), dried over Na$_2$SO$_4$, filtered and concentrated under reduced pressure. The crude product was purified by flash chromatography on silica gel (acetone/hexane=1/4) to afford product 163 mg (85% yield for two steps) as colorless oil. $^1$H NMR (400 MHz, CDCl$_3$) δ 9.79 (s, 1H), 7.34 (s, 5H), 5.13 (s, 2H), 2.79 (t, J=6.1 Hz, 2H), 2.67 (t, J=6.5 Hz, 2H). $^{13}$C NMR (100 MHz, CDCl$_3$) δ 199.95, 172.11, 135.77, 128.60, 128.60, 128.32, 128.23, 66.63, 38.50, 26.61.

General Procedure for the Synthesis of Substrates (1Ae, 1Aj, 1Ak)

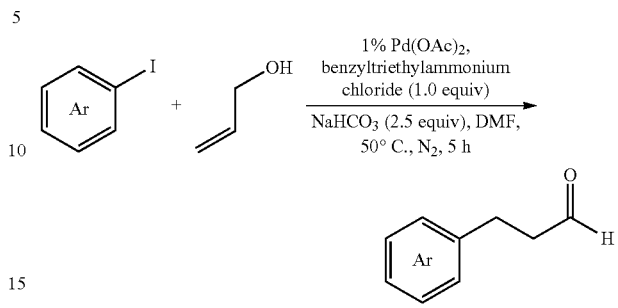

To a 25 mL Schlenk tube equipped with a stir bar was added with substituted iodobenzene (2.0 mmol, 1.0 equiv), Pd(OAc)$_2$ (4.5 mg, 0.02 mmol, 1 mol %), benzyltriethylammonium chloride (454 mg, 2 mmol, 1.0 equiv), NaHCO$_3$ (420 mg, 5 mmol, 2.5 equiv), allyl alcohol (174 mg, 1.5 equiv) and DMF (6.0 mL). The mixture was degassed by freeze-pump-thaw method, then sealed with parafilm. The reaction mixture was stirred at 50° C. for 5 h. Upon cooling to room temperature, the reaction mixture was filtrated through a pad of celite, washed with 50 mL of ethyl acetate and washed with brine (2×10.0 mL). The organic layer was separated, dried over anhydrous Na$_2$SO$_4$ and concentrated under reduced pressure. The residue was purified by flash chromatography on silica gel to provide the corresponding products.

4-(3-oxopropyl)benzonitrile (1ae)

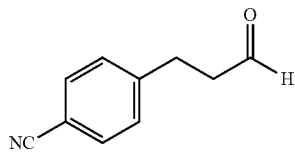 [SMILES: N#Cc1ccc(CCC=O)cc1]

This substrate was synthesized following the general procedure. The crude product was purified by flash chromatography on silica gel (EtOAc/hexane=1/3) to afford product (277 mg, 87% yield) as colorless oil. $^1$H NMR (400 MHz, CDCl$_3$) δ 9.76 (s, 1H), 7.52 (d, J=7.5 Hz, 2H), 7.27 (d, J=7.5 Hz, 2H), 2.96 (t, J=7.0 Hz, 2H), 2.78 (t, J=7.0 Hz, 2H). $^{13}$C NMR (100 MHz, CDCl$_3$) δ 200.36, 146.16, 132.34, 129.23, 118.87, 110.16, 44.47, 28.02.

3-(thiophen-2-yl)propanal (1aj)

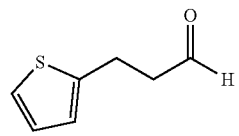

This substrate was synthesized following the general procedure. The crude product was purified by flash chromatography on silica gel (EtOAc/hexane=1/9) to afford product (255 mg, 91% yield) as orange oil. $^1$H NMR (400 MHz, CDCl$_3$) δ 9.81 (s, 1H), 7.13 (d, J=4.9 Hz, 1H), 6.92 (s, 1H), 6.82 (s, 1H), 3.18 (t, J=7.3 Hz, 2H), 2.83 (t, J=7.2 Hz, 2H).

3-(2,4-dimethoxypyrimidin-5-yl)propanal (1ak)

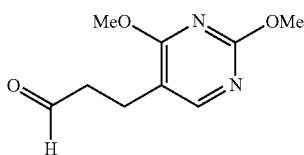 [SMILES: COc1ncc(CCC=O)c(OC)n1]

This substrate was synthesized following the general procedure. The crude product purified by flash chromatography on silica gel (EtOAc/hexane=1/1) to afford product (353 mg, 90% yield) as pale yellow oil. $^1$H NMR (400 MHz, CDCl$_3$) δ 9.77 (s, 1H), 8.01 (s, 1H), 3.96 (s, 3H), 3.93 (s, 3H), 2.76 (t, J=6.4 Hz, 2H), 2.68 (t, J=6.4 Hz, 2H). $^{13}$C NMR (100 MHz, CDCl$_3$) δ 201.19, 169.35, 164.46, 157.33, 113.51, 54.77, 54.75, 53.99, 53.97, 42.98, 19.59.

4-formylphenyl 2-(1-(4-chlorobenzoyl)-5-methoxy-2-methyl-1H-indol-3-yl)acetate (1ap)

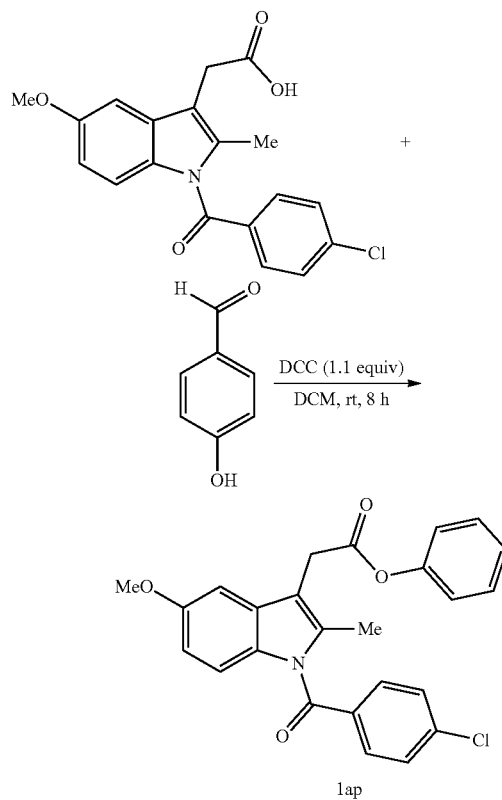

At 0° C., to the solution of indomethacin (357 mg, 1 mmol, 1.0 equiv) in 5 mL of DCM was added 4-hydroxybenzaldehyde (122 mg, 1 mmol, 1.0 equiv) and N,N-dicyclohexylcarbodiimide (206 mg, 1 mmol, 1.0 equiv). The reaction mixture was warmed up to room temperature and stirred for 8 h. After the completion of the reaction, the mixture was filtrated through a pad of celite, washed with 20 mL of DCM. The filtra was concentrated and purified by flash chromatography on silica gel (EtOAc/hexane=1/3) to afford product (322 mg, 70% yield) as white solid. $^1$H NMR (400 MHz, CDCl$_3$) δ 9.98 (s, 1H), 7.90 (d, J=8.5 Hz, 2H), 7.68 (d, J=8.3 Hz, 2H), 7.48 (d, J=8.3 Hz, 2H), 7.25 (d, J=8.4 Hz, 2H), 7.04 (d, J=2.5 Hz, 1H), 6.88 (d, J=9.0 Hz, 1H), 6.70 (dd, J=9.0, 2.5 Hz, 1H), 3.94 (s, 2H), 3.84 (s, 3H), 2.47 (s, 3H). $^{13}$C NMR (100 MHz, CDCl$_3$) δ 190.65, 168.74, 168.43, 156.30, 155.46, 139.61, 136.56, 134.16, 133.85, 131.36, 131.34, 131.00, 130.50, 129.33, 122.36, 115.22, 111.91, 111.59, 101.35, 55.90, 30.74, 13.56.

3 (3aR,4R,6S,6aS)-6-methoxy-2,2-dimethyl-N-(3-oxopropyl-3-d)tetrahydrofuro[3,4-d][1,3]dioxole-4-carboxamide (1aq)

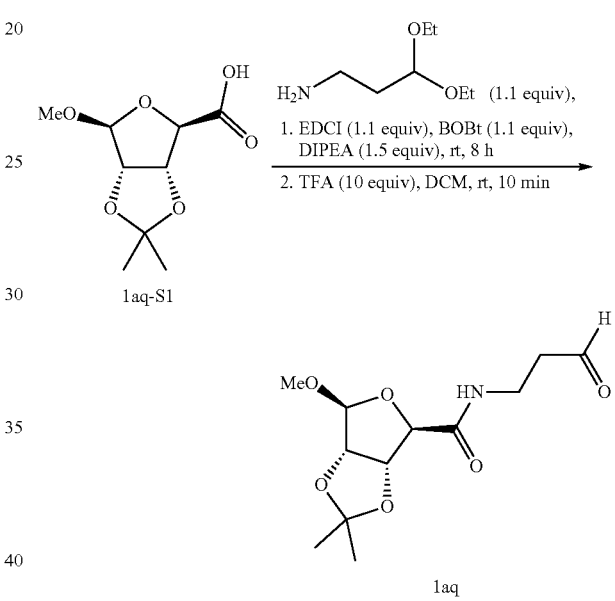

At 0° C., to a solution of (3aR,4R,6S,6aS)-6-methoxy-2,2-dimethyl-N-(3-oxopropyl-3-d)tetrahydrofuro[3,4-d][1,3]dioxole-4-carboxamide (1aq-S1, prepared from reported procedure, 218 mg, 1 mmol, 1.0 equiv) in 10 mL DCM was added EDCl (170 mg, 1.1 mmol, 1.1 equiv), HOBt (149 mg, 1.1 mmol, 1.1 equiv), DIPEA (193 mg, 1.5 mmol, 1.5 equiv) and 3,3-diethoxypropan-1-amine (162 mg, 1.1 mmol). The reaction mixture was warmed up to room temperature and stirred for 8 hours. After the completion of the reaction, the mixture was diluted with 20 mL of DCM. The solution was washed by 1M HCl (aq) (10 mL), saturated NaHCO$_3$ (10 mL) and brine (10 mL). The organic layer was dried over anhydrous Na$_2$SO$_4$ and concentrated under reduced pressure. The residue was purified by flash chromatography (EtOAc/hexane=1/1) on silica gel to provide the corresponding products 249 mg (91% yield for two steps) as colorless oil. $^1$H NMR (400 MHz, CDCl$_3$) δ 9.76 (s, 1H), 6.98 (br, 1H), 5.01 (d, J=10.3 Hz, 2H), 4.52-4.47 (m, 2H), 3.52 (dd, J=11.6, 5.7 Hz, 2H), 3.41 (s, 3H), 2.81 (s, 1H), 2.69 (t, J=5.5 Hz, 2H), 1.43 (s, 3H), 1.27 (s, 3H). $^{13}$C NMR (100 MHz, CDCl$_3$) δ 201.02, 170.35, 112.78, 111.50, 111.46, 86.49, 84.46, 82.61, 82.60, 56.54, 55.52, 43.72, 32.50, 26.50, 24.98.

methyl N-((benzyloxy)carbonyl)-1-(4-oxobutanoyl)-L-tryptophanate (1ar)

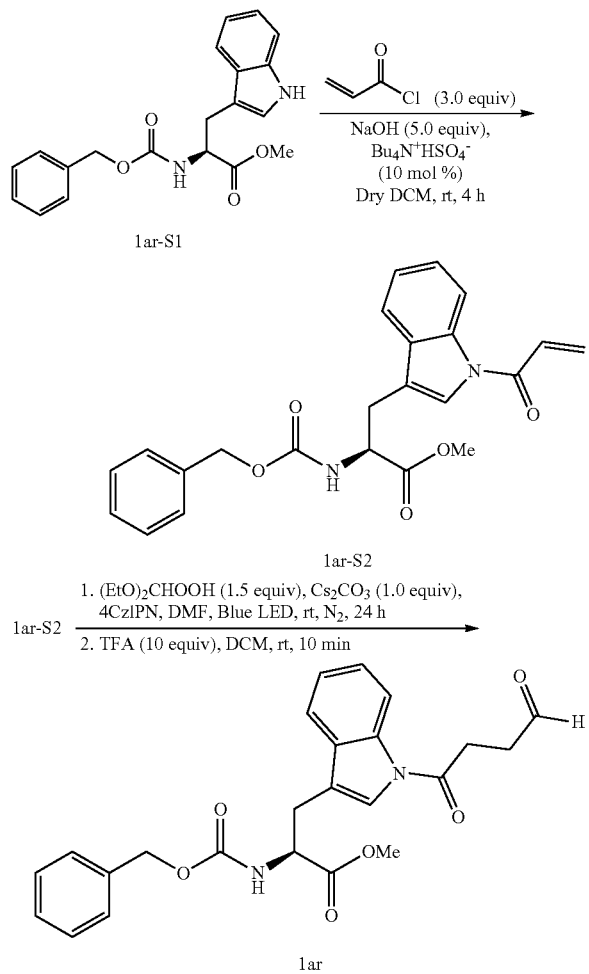

To a solution of Boc-L-Trp-OMe (1ar-S1, prepared according to reported procedure, 2.4 mmol, 1.0 equiv) in dry 10 mL of DCM was added tetrabutylammonium hydrogen sulfate (81 mg, 0.24 mmol, 10 mol %), powdered NaOH (480 mg, 12.0 mmol, 5.0 equiv). After stirring of reaction mixture for 15 min at room temperature, acryloyl chloride (648 mg, 7.2 mmol, 3.0 equiv) was added to flask. The reaction mixture was stirred at room temperature for 4 h. After the completion of the reaction, the mixture was diluted with 20 mL DCM. The solution was washed by water (10 mL), saturated brine (10 mL). The organic layer was dried over anhydrous $Na_2SO_4$ and concentrated under reduced pressure. The residue was purified by flash chromatography (EtOAc/hexane=2/3) on silica gel to provide the corresponding products 1ar-S2 (780 mg, 80% yield) as white solid. $^1$H NMR (400 MHz, $CDCl_3$) δ 8.48 (d, J=8.2 Hz, 1H), 7.48 (d, J=7.5 Hz, 1H), 7.39-7.26 (m, 8H), 6.86 (dd, J=16.7, 10.4 Hz, 1H), 6.64 (d, J=16.7 Hz, 1H), 6.00 (d, J=10.3 Hz, 1H), 5.44 (s, 1H), 5.12 (dd, J=32.0, 12.1 Hz, 2H), 4.77 (d, J=6.3 Hz, 1H), 3.69 (s, 3H), 3.26 (dt, J=14.4, 9.7 Hz, 2H). $^{13}$C NMR (100 MHz, $CDCl_3$) δ 172.05, 163.69, 155.82, 136.27, 136.09, 132.19, 130.69, 128.67, 128.67, 128.39, 128.22, 127.97, 125.62, 124.05, 122.88, 118.84, 117.20, 117.08, 67.18, 53.93, 53.89, 52.93, 52.70, 52.65, 28.14.

To an oven-dried 10 mL-Schlenk tube equipped with a stir bar, was added 1ar-S2 (406 mg, 1 mmol, 1.0 equiv), 2,2-diethoxyacetic acid (222 mg, 1.5 mmol, 1.5 equiv), photocatalyst 4CzIPN (40 mg, 5 mol %), $Cs_2CO_3$ (325 mg, 1 mmol, 1.0 equiv) and DMF (5 mL). The mixture was degassed by freeze-pump-thaw method, then sealed with parafilm. The solution was then stirred at room temperature under the irradiation of a blue LED strip for 24 h. After completion of the reaction, the mixture was diluted by adding 10 ml EA and 30 mL of water. The reaction was extracted with EtOAc (3×10 mL) and the combined organic extracts were washed with brine (1×10 mL), dried over $Na_2SO_4$, filtered and concentrated under reduced pressure. 5 mL of DCM was added to flask followed by 0.75 mL of TFA (10 equiv). The reaction mixture was stirred at room temperature for 10 min. 10 mL saturated $NaHCO_3$ solution was added slowing to quench the reaction. The reaction was extracted with DCM (3×10 mL) and the combined organic extracts were washed with brine (1×10 mL), dried over $Na_2SO_4$, filtered and concentrated under reduced pressure. The crude product purified by flash chromatography on silica gel (EtOAc/hexane/DCM=1/2/2) to afford product 349 mg (80% yield for two steps) as pale yellow oil. $^1$H NMR (400 MHz, $CDCl_3$) δ $^1$H NMR (400 MHz, $CDCl_3$) δ 9.86 (s, 1H), 8.35 (d, J=8.0 Hz, 1H), 7.45 (d, J=7.5 Hz, 1H), 7.33-7.21 (m, 8H), 5.48 (d, J=7.0 Hz, 1H), 5.09 (dd, J=30.5, 12.2 Hz, 2H), 4.75 (d, J=6.3 Hz, 1H), 3.68 (s, 3H), 3.29-3.15 (m, 2H), 3.10 (t, J=5.6 Hz, 2H), 2.93 (t, J=5.7 Hz, 2H). $^{13}$C NMR (100 MHz, $CDCl_3$) δ 199.97, 172.04, 169.42, 155.82, 136.29, 135.87, 130.38, 128.61, 128.30, 128.17, 125.65, 123.82, 122.67, 118.82, 117.36, 116.70, 67.11, 53.87, 52.68, 52.63, 37.85, 28.24, 28.08.

tert-butyl (S)-(1-oxo-1-((2-oxo-2-((3-oxopropyl)amino)ethyl)amino)-3-phenylpropan-2-yl)carbamate (1as)

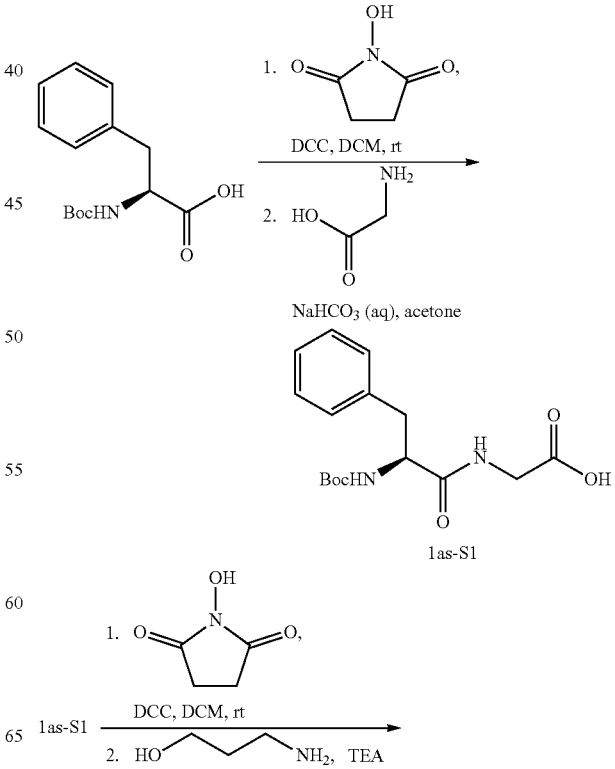

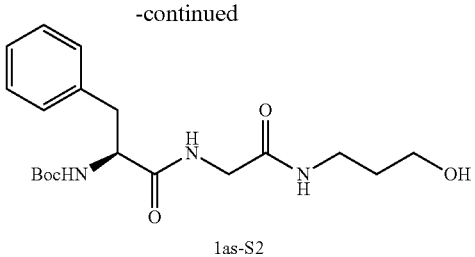

1as-S2

To a solution of Boc-L-phenylalanine (796 mg, 3 mmol, 1.0 equiv) in 10 mL DCM was added N-hydroxysuccinimide (380 mg, 3.3 mmol, 1.1 equiv) and DCC (680 mg, 3.3 mmol, 1.1 equiv). The reaction mixture was stirred at RT for 8 h, after which the reaction mixture was filtrated through a pad of celite and washed by DCM (2×10 mL). The filtra was concentrated under vacuum. To the residue in flask was added acetone (10 mL), glycine (248 mg, 3.3 mmol, 1.1 equiv) and 5 mL saturated NaHCO$_3$. After the reaction mixture was stirred at room temperature for 5 h, 20 mL of water was added to flask. The reaction mixture was extracted by EtOAc (3×10 mL). To the aqueous solution was slowly added 2M HCl to pH=3-4. The acidified solution was extracted by EtOAc (3×10 mL). The combined organic layer was dried over Na$_2$SO$_4$, filtrated and concentrated under vacuum to afford crude 1as-S1 (900 mg). To a solution of 1as-S1 in 10 mL DCM was added N-hydroxysuccinimide (380 mg, 3.3 mmol) and DCC (680 mg, 3.3 mmol). The reaction mixture was stirred at rt for 8 h, after which the reaction mixture was filtrated through a pad of celite and washed by DCM (2×10 mL). To the filtra solution was added 3-aminopropan-1-ol (225 mg, 3 mmol) and TEA (61 mg, 0.6 mmol), the reaction mixture was stirred at room temperature for 5 h. After the reaction was completed, the reaction is concentrated and by flash chromatography on silica gel (EtOAc/MeOH=9/1) to afford white foam solid (728 mg, 63% yield for 4 steps). $^1$H NMR (400 MHz, CD$_3$OD) δ 7.77 (s, 1H), 7.36-7.21 (m, 5H), 6.82 (d, J=6.3 Hz, 1H), 4.27 (d, J=6.6 Hz, 1H), 3.91 (d, J=16.8 Hz, 1H), 3.70 (d, J=16.8 Hz, 1H), 3.61 (t, J=6.1 Hz, 2H), 3.35-3.29 (m, 2H), 3.17-3.12 (m, 1H), 2.92 (dd, J=13.3, 9.0 Hz, 1H), 1.75 (quint, J=6.4 Hz, 2H), 1.41 (s, 9H). $^{13}$C NMR (100 MHz, CD$_3$OD) δ 174.74, 174.69, 171.46, 171.38, 157.79, 138.18, 130.14, 129.32, 127.64, 80.76, 60.19, 57.84, 57.75, 43.46, 43.43, 38.48, 38.45, 37.44, 37.31, 32.92, 28.65.

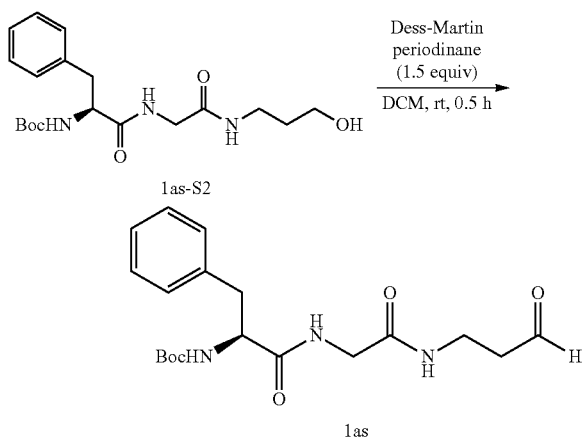

To a solution of 1as-S2 (200 mg, 0.52 mmol, 1.0 equiv) in 3 mL of DCM was added Dess-Martin periodinane (331 mg, 0.78 mmol, 1.5 equiv), the reaction was stirred at room temperature for 0.5 h indicated by TLC. Saturated sodium thiosulfate solution (5 mL) was added to flask to quench reaction and followed by 5 mL of saturated NaHCO$_3$ solution. The mixture was stirred for 15 min until it turns to be clear. The reaction was extracted with DCM (3×10 mL) and the combined organic extracts were washed with brine (1×10 mL), dried over Na$_2$SO$_4$, filtered and concentrated under reduced pressure. The crude product was purified by flash chromatography on silica gel (EtOAc/MeOH=9/1) to afford product (147 mg, 75% yield) as white foam solid. $^1$H NMR (400 MHz, CDCl$_3$) δ 9.67 (s, 1H), 7.38 (t, J=5.6 Hz), 7.27-7.13 (m, 5H), 5.51 (d, J=6.0 Hz, 1H), 4.34 (d, J=6.7 Hz, 1H), 3.88 (dd, J=16.7, 5.7 Hz, 1H), 3.75 (dd, J=16.7, 5.7 Hz, 1H), 3.50-3.41 (m, 2H), 3.09 (dd, J=13.7, 5.8 Hz, 1H), 2.91 (dd, J=13.1, 8.2 Hz, 1H), 2.62 (t, J=6.1 Hz, 2H), 1.32 (s, 9H). $^{13}$C NMR (100 MHz, CDCl$_3$) δ 201.19, 172.41, 169.28, 155.82, 136.61, 129.21, 128.54, 80.21, 56.09, 43.42, 43.00, 38.13, 33.08, 28.23.

Example 6. Reused D$_2$O in Deuteration Reaction of 4-methylbenzaldehyde and Gram Scale Synthesis The recovered D$_2$O containing solvent can be used in a second and third reaction run without causing a significant decrease in yield and D-incorporation level (Scheme 7).

Scheme 7

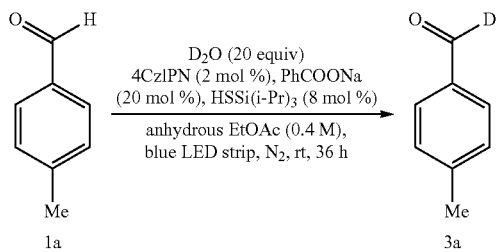

D$_2$O cycle 1: Y/D: 70/97;
cycle 2: Y/D: 71/94;
cycle 3: Y/D: 70/91

Procedure for deuteration in first batch

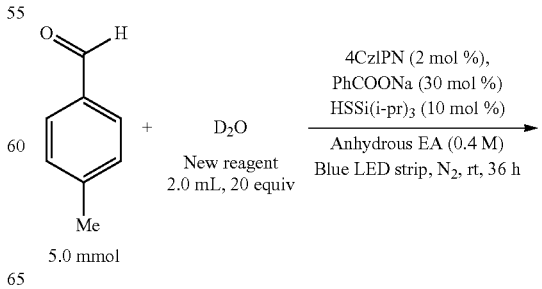

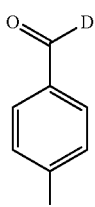

70% yield,
97% D

To an oven-dried 25 mL-Schlenk tube equipped with a stir bar, was added 4-methylbenzaldehyde (600 mg, 5.0 mmol, 1.0 equiv), photocatalyst 4CzIPN (80 mg, 2 mol %), PhCOONa (216 mg, 1.5 mmol 30 mol %) and the tube was evacuated and backfilled with $N_2$ (one time). 12.5 mL anhydrous EtOAc, thiol catalyst triisopropylsilanethiol (2d, 0.5 mL 1M, 10 mol %) in EtOAc solution, and $D_2O$ (2.0 mL, 20 equiv) were added by syringe under $N_2$. The mixture was degassed by freeze-pump-thaw method, then sealed with parafilm. The solution was then stirred at room temperature under the irradiation of a blue LED strip for 36 h. After completion of the reaction, the mixture was dumped to 50 mL separatory funnel. Bottom $D_2O$ layer was separated for the usage in next batch. Top organic layer was dried over $Na_2SO_4$, filtered and concentrated under reduced pressure. The residue was purified by flash chromatography (acetone/hexane=1/97) on silica gel to provide the corresponding products 423 mg (70% yield, 97% D) as pale yellow liquid.

Procedure for deuteration in second batch using $D_2O$ from first batch

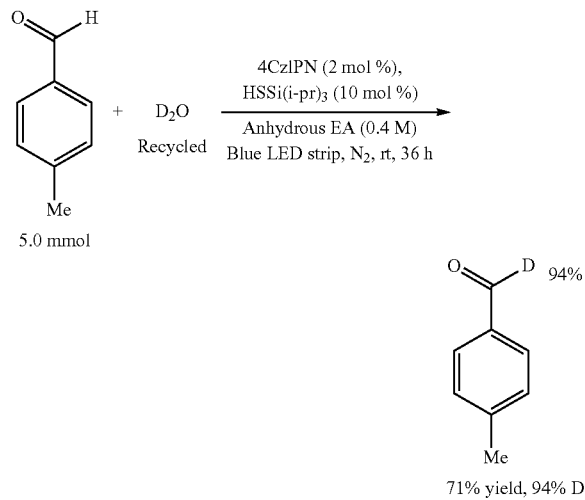

71% yield, 94% D

To an oven-dried 25 mL-Schlenk tube equipped with a stir bar, was added 4-methylbenzaldehyde (600 mg, 5.0 mmol, 1.0 equiv) and photocatalyst 4CzIPN (80 mg, 2 mol %), the tube was evacuated and backfilled with $N_2$ (one time). 12.5 mL of anhydrous EtOAc, thiol catalyst triisopropylsilanethiol (2d, 0.5 mL 1M, 10 mol %) in EtOAc solution, and $D_2O$ (from 1$^{st}$ batch together with 100 mg, 1.0 equiv to compensate the loss of $D_2O$) were added by syringe under $N_2$. The mixture was degassed by freeze-pump-thaw method, then sealed with parafilm. The solution was then stirred at room temperature under the irradiation of a blue LED strip for 36 h. After completion of the reaction, the mixture was dumped to 50 mL separatory funnel. Bottom $D_2O$ layer was separated for the usage in next batch. Top organic layer was dried over $Na_2SO_4$, filtered and concentrated under reduced pressure. The residue was purified by flash chromatography (acetone/hexane=1/97) on silica gel to provide the corresponding products 430 mg (71% yield, 94% D) as pale yellow liquid.

Procedure for deuteration of third batch using $D_2O$ from second batch

To an oven-dried 25 mL-Schlenk tube equipped with a stir bar, was added 4-methylbenzaldehyde (600 mg, 5.0 mmol, 1.0 equiv) and photocatalyst 4CzIPN (80 mg, 2 mol %), the tube was evacuated and backfilled with $N_2$ (one time). 12.5 mL of anhydrous EtOAc, thiol catalyst triisopropylsilanethiol (2d, 0.5 mL, 1M, 10 mol %) in EA solution, and $D_2O$ (from 2$^{nd}$ batch together with 100 mg, 1.0 equiv to compensate the loss of $D_2O$) were added by syringe under $N_2$. The mixture was degassed by freeze-pump-thaw method, then sealed with parafilm. The solution was then stirred at room temperature under the irradiation of a blue LED strip for 36 h. After completion of the reaction, the mixture was dumped to 50 mL separatory funnel. Bottom $D_2O$ layer was separated for the usage in next batch. Top organic layer was dried over $Na_2SO_4$, filtered and concentrated under reduced pressure. The residue was purified by flash chromatography (acetone/hexane=1/97) on silica gel to provide the corresponding products 423 mg (70% yield, 91% D) as pale yellow liquid.

The method may be used in a gram-scale synthesis of C-1 deuterated aldehydes. As shown using p-tolualdehyde 1a as an example, the gram-scale counterpart 3a is formed in a similar yield and with a comparable level of D-incorporation even with reduced amounts of reagents and catalysts used (only 20 equiv of $D_2O$, 1.5 mol % 4CzIPN, 20 mol % $PhCO_2Na$ and 8 mol % triisopropylsilanethiol) (Scheme 8).

Scheme 8

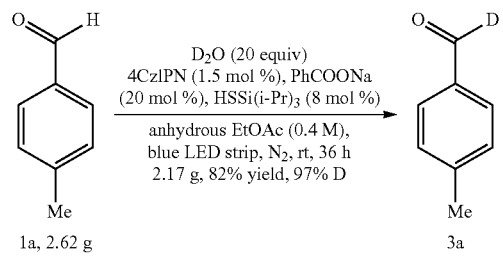

1a, 2.62 g

3a

Gram Scale Synthesis of 4-methylbenzaldehyde-formyl-d1

To an oven-dried 100 mL-Schlenk tube equipped with a stir bar, was added 4-methylbenzaldehyde (2.64 g, 22.0 mmol, 1.0 equiv), photocatalyst 4CzIPN (264 mg, 1.5 mol %), PhCOONa (216 mg, 1.5 mmol 30 mol %) and the tube was evacuated and backfilled with $N_2$ (one time). 55 mL of anhydrous EA, thiol catalyst triisopropylsilanethiol (2d, 1.76 mL 1M, 8 mol %) in EA solution, and $D_2O$ (8.8 mL, 20 equiv) were added by syringe under $N_2$. The mixture was degassed by freeze-pump-thaw method, then sealed with parafilm. The solution was then stirred at room temperature under the irradiation of a blue LED strip for 36 h. After completion of the reaction, the mixture was dumped to 125 mL separatory funnel. Top organic layer was dried over $Na_2SO_4$, filtered and concentrated under reduced pressure. The residue was purified by flash chromatography (acetone/hexane=1/97) on silica gel to provide the corresponding products 2.17 g (82% yield, 97% D) as pale yellow liquid.

Together, these studies demonstrate that the cost for the synthesis of deuterated aldehyde products can be further reduced (Table 3).

TABLE 3

Cost calculation for the synthesis of 1 gram 4-methylbenzaldehyde-formyl-d1

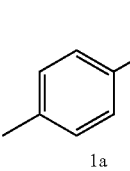

| Item | Vendor | Price | MW | Mmol | Amount | Cost ($) |
|---|---|---|---|---|---|---|
| p-Tolualdehyde, 98% (GC) | Aksci | $180 for 1 kg | 120.15 | 22.00 | 2.64 g | 0.48 |
| 4CzIPN | Self-made | $4.18 for 1 g | 799.00 | 0.83 | 0.66 g | 2.76 |
| PhCOONa 99%) | Fisher Scientific | $28.19 for 1 kg | 144.10 | 4.4 | 0.63 g | 0.18 |
| Triisopropylsilanethiol (97%) | Sigma-aldrich | $170 for 5 g | 190.42 | 1.76 | 0.335 g | 11.39 |
| Deuterium Oxide | Sigma-aldrich | $609 for 1 kg | 20.03 | 457.60 | 9.17 g | 5.58 |
| Anhydrous EA | Sigma-aldrich | $62 for 2 L | — | — | 55 mL | 1.7 |
| 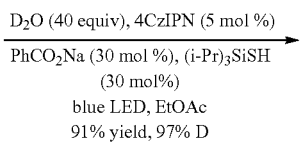 | Sigma-Aldrich | $570/g | 121.15 | | | 22.09 |
| 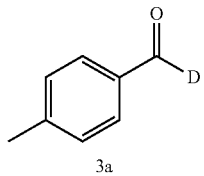 | Present method | $10.18/g | 121.15 | | | 22.09 for 2.17 g product |

Example 7 General Procedure and Characterization Data for Compounds 3

Preparation of hydrogen isotope exchanged thiol catalyst 2b in EtOAc solution

To an oven-dried 3 mL borosilicate glass vial equipped with a stir bar, was added 2d in (1 mmol, 190 mg, 1.0 equiv), 1 mL of anhydrous EtOAc and D$_2$O (10 mmol, 200 μL, 10 equiv). The mixture was stirred at room temperature for 1 h. After the stirring was stopped, the top EA layer was used in reaction as the stock solution (1M).

General Procedure for the Synthesis of Deuterated Aldehyde

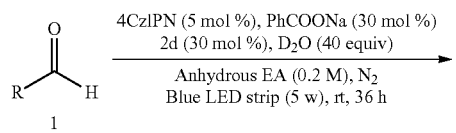

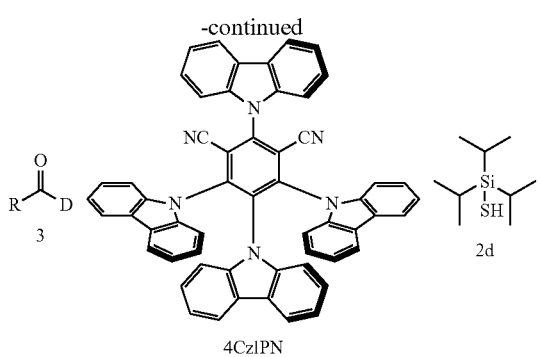

General Procedure A: To an oven-dried 10 mL-Schlenk tube equipped with a stir bar, was added aldehyde (0.2 mmol, 1.0 equiv), photocatalyst 4CzIPN (8 mg, 5 mol %), PhCOONa (8.6 mg, 30 mol %) and the tube was evacuated and backfilled with N$_2$ (one time). Anhydrous EtOAc (1 mL), thiol catalyst triisopropylsilanethiol (2d, 60 μL, 30 mol %) in EtOAc solution, and D$_2$O (160 μL, 40 equiv) were added by syringe under N$_2$. The mixture was degassed by freeze-pump-thaw method, then sealed with parafilm. The solution was then stirred at room temperature under the irradiation of a blue LED strip for 36 h. After completion of the reaction, the mixture was concentrated and purified by flash chromatography on silica gel.

General Procedure B: To an oven-dried 10 mL-Schlenk tube equipped with a stir bar, was added aldehyde (0.2 mmol, 1.0 equiv), photocatalyst 4CzIPN (8.0 mg, 5 mol %), PhCOONa (8.7 mg, 30 mol %), 1 mL of anhydrous EtOAc and $D_2O$ (40 µL, 10 equiv). The tube was stirred at room temperature for 10 min to exchange active protium with deuterium. The solvent was removed under reduced pressure and the tube was evacuated and backfilled with $N_2$ (one time). Anhydrous EA (1 mL), thiol catalyst triisopropylsilanethiol (2d, 60 µL, 30 mol %) in EtOAc solution, and $D_2O$ (160 µL, 40 equiv) were added by syringe under $N_2$. The mixture was degassed by freeze-pump-thaw method, then sealed with parafilm. The solution was then stirred at room temperature under the irradiation of a blue LED strip for 36 h. After completion of the reaction, the mixture was concentrated and purified by flash chromatography on silica gel.

4-Methylbenzaldehyde-formyl-d1 (3a)

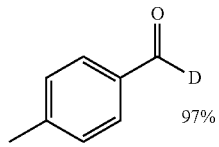

The reaction was carried out according to the general procedure A. 4-Methylbenzaldehyde (48.0 mg, 0.4 mmol, 1.0 equiv), 4CzIPN (16.0 mg, 0.02 mmol, 5 mol %), PhCOONa (17.4 mg, 0.06 mmol, 30 mol %), 2d (120 µL, 1M in EtOAc), $D_2O$ (320 µL, 40 equiv) and anhydrous EtOAc (2 mL) were used. The reaction mixture was irritated by Blue LED strip for 36 h. The residue was purified by flash column chromatography ($Et_2O$/hexane=1/19) to afford product (44 mg, 91% yield, 97% D ratio by $^1H$ NMR) as colorless oil. $^1H$ NMR (400 MHz, $CDCl_3$) δ 9.93 (s, 0.03H), 7.75 (d, J=8.1 Hz, 2H), 7.30 (d, J=7.8 Hz, 2H), 2.41 (s, 3H). $^{13}C$ NMR (100 MHz, $CDCl_3$) δ 191.74 (t, J=26.4 Hz), 145.63, 134.22 (t, J=3.5 Hz), 129.92, 129.79, 21.91.

1-Naphthaldehyde-formyl-d1 (3b)

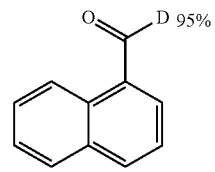 [SMILES: [2H]C(=O)c1cccc2ccccc12]

The reaction was carried out according to the general procedure A. 1-Naphthaldehyde (62.4 mg, 0.4 mmol, 1.0 equiv), 4CzIPN (8.0 mg, 0.01 mmol, 2.5 mol %), PhCOONa (17.3 mg, 0.12 mmol, 30 mol %), 2d (120 µL, 1M in EtOAc), $D_2O$ (320 µL, 40 equiv) and anhydrous EtOAc (8 mL) were used. The reaction mixture was irritated by Blue LED strip for 36 h. The residue was purified by flash column chromatography ($Et_2O$/hexane=1/19) to afford product (32 mg, 51% yield, 95% D ratio by $^1H$ NMR) as colorless oil. $^1H$ NMR (400 MHz, $CDCl_3$) δ 10.40 (s, 0.05H), 9.26 (d, J=8.4 Hz, 1H), 8.09 (d, J=8.2 Hz, 1H), 7.98 (d, J=7.0 Hz, 1H), 7.92 (d, J=8.2 Hz, 1H), 7.69 (t, J=7.7 Hz, 1H), 7.63-7.57 (m, 2H). $^{13}C$ NMR (100 MHz, $CDCl_3$) δ 193.32 (t, J=26.6 Hz), 136.69, 135.41, 133.85, 131.463 (t, J=3.4 Hz), 130.68, 129.13, 128.60, 127.12, 125.01.

[1,1'-Biphenyl]-4-carbaldehyde-formyl-d1 (3c)

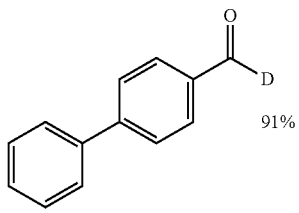 [SMILES: [2H]C(=O)c1ccc(-c2ccccc2)cc1]

The reaction was carried out according to the general procedure A. [1,1'-Biphenyl]-4-carbaldehyde (36.4 mg, 0.2 mmol, 1.0 equiv), 4CzIPN (8.0 mg, 0.01 mmol, 5 mol %), PhCOONa (8.6 mg, 0.06 mmol, 30 mol %), 2d (60 µL, 1M in EtOAc), $D_2O$ (160 µL, 40 equiv) and anhydrous DCE/anhydrous EtOAc (0.8 mL/0.2 mL) were used. The reaction mixture was irritated by Blue LED strip for 36 h. The residue was purified by flash column chromatography (acetone/hexane=1/9) to afford product (33 mg, 92% yield, 91% D ratio by $^1H$ NMR) as white solid. $^1H$ NMR (400 MHz, $CDCl_3$) δ 10.06 (s, 0.09H), 7.96 (d, J=8.1 Hz, 2H), 7.76 (d, J=8.0 Hz, 2H), 7.66-7.63 (m, 2H), 7.51-7.47 (m, 2H), 7.44-7.40 (m, 1H). $^{13}C$ NMR (100 MHz, $CDCl_3$) δ 191.17 (t, J=26.5 Hz), 147.29, 139.81, 135.22 (t, J=3.5 Hz), 130.36, 129.12, 128.58, 127.78, 127.47.

4-Methoxybenzaldehyde-formyl-d1 (3d)

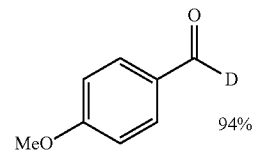 [SMILES: [2H]C(=O)c1ccc(OC)cc1]

The reaction was carried out according to the general procedure A. 4-Methoxybenzaldehyde (54.8 mg, 0.4 mmol), 4CzIPN (16.0 mg, 0.02 mmol, 5 mol %), PhCOONa (17.4 mg, 0.12 mmol, 30 mol %), 2d (120 µL, 1M in EtOAc, 30 mol %), $D_2O$ (160 µL, 20 equiv) and anhydrous DCE/anhydrous EtOAc (0.8 mL/0.2 mL) were used. The reaction mixture was irritated by Blue LED strip for 36 h. The residue was purified by flash column chromatography (acetone/hexane=1/9) to afford product (33 mg, 92% yield, 91% D ratio by 1H NMR) as colorless oil. $^1H$ NMR (400 MHz, $CDCl_3$) δ 9.85 (s, 0.06H), 7.80 (d, J=8.8 Hz, 2H), 6.97 (d, J=8.8 Hz, 2H), 3.85 (s, 3H). $^{13}C$ NMR (100 MHz, $CDCl_3$) δ 190.48 (t, J=26.2 Hz), 190.22, 164.65, 131.98, 129.91 (t, J=3.5 Hz), 114.35.

2-Methoxybenzaldehyde-formyl-d1 (3e)

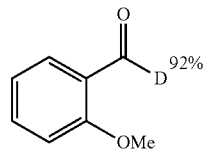 [SMILES: [2H]C(=O)c1ccccc1OC]

The reaction was carried out according to the general procedure A. 2-Methoxybenzaldehyde (54.8 mg, 0.4 mmol, 1.0 equiv), 4CzIPN (8.0 mg, 0.01 mmol, 2.5 mol %), PhCOONa (17.4 mg, 0.12 mmol, 30 mol %), 2d (120 μL, 1M in EtOAc, 30 mol %), D$_2$O (320 μL, 40 equiv) and anhydrous EtOAc (2 mL) were used. The reaction mixture was irritated by Blue LED strip for 36 h. The residue was purified by flash column chromatography (Et$_2$O/hexane=1/9) to afford product (54 mg, 99% yield, 92% D ratio by 1H NMR) as colorless oil. $^1$H NMR (400 MHz, CDCl$_3$) δ 10.44 (s, 0.08H), 7.80 (dd, J=7.7, 1.8 Hz, 1H), 7.54-7.50 (m, 1H), 6.98 (dd, J=15.9, 8.1 Hz, 2H), 3.89 (s, 3H). $^{13}$C NMR (100 MHz, CDCl$_3$) δ 189.49 (t, J=26.2 Hz), 161.91, 136.02, 128.51, 124.78 (t, J=3.3 Hz), 120.68, 111.69, 55.68.

2,4,6-Trimethoxybenzaldehyde-formyl-d1 (3f)

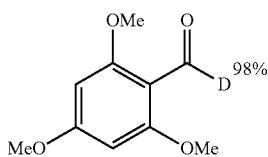

The reaction was carried out according to the general procedure A. 2,4,6-Trimethoxybenzaldehyde (39.2 mg, 0.2 mmol, 1.0 equiv), 4CzIPN (8.0 mg, 0.01 mmol, 5 mol %), PhCOONa (8.6 mg, 0.06 mmol, 30 mol %), 2d (60 μL, 1M in EtOAc, 30 mol %), D$_2$O (160 μL, 40 equiv) and anhydrous EtOAc (1.0 mL) were used. The reaction mixture was irritated by Blue LED strip for 36 h. The residue was purified by flash column chromatography (EtOAc/hexane=2/1-3/1) to afford product (36 mg, 99% yield, 98% D ratio by $^1$H NMR) as white solid. $^1$H NMR (400 MHz, CDCl$_3$) δ 10.31 (s, 0.02H), 6.04 (s, 2H), 3.84 (s, s, 9H). $^{13}$C NMR (100 MHz, CDCl$_3$) δ 187.42 (t, J=26.2 Hz), 166.31, 164.18, 108.71 (t, J=3.4 Hz). 90.29 (t, J=2.4 Hz), 56.03 (q, J=4.8 Hz), 55.56 (q, J=4.8 Hz).

4-Chlorobenzaldehyde-formyl-d1 (3g)

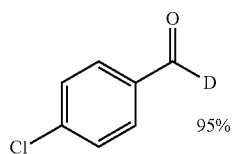

The reaction was carried out according to the general procedure A. 4-Chlorobenzaldehyde (56.0 mg, 0.4 mmol, 1.0 equiv), 4CzIPN (8.0 mg, 0.01 mmol, 2.5 mol %), NaOAc (9.8 mg, 0.12 mmol, 30 mol %) instead of PhCOONa, 2d (120 μL, 1M in EtOAc, 30 mol %), D$_2$O (320 μL, 40 equiv) and anhydrous EtOAc (2.0 mL) were used. The reaction mixture was irritated by Blue LED strip for 36 h. The residue was purified by flash column chromatography (Et$_2$O/hexane=1/19) to afford product (32 mg, 57% yield, 95% D ratio by $^1$H NMR) as white solid. $^1$H NMR (400 MHz, CDCl$_3$) δ 9.96 (s, 0.05H), 7.81 (d, J=8.0 Hz, 2H), 7.49 (d, J=8.0 Hz, 2H). $^{13}$C NMR (100 MHz, CDCl$_3$) δ 190.59 (t, J=26.7 Hz), 141.01, 134.72 (t, J=3.6 Hz), 130.96, 129.55.

4-Bromobenzaldehyde-formyl-d1 (3h)

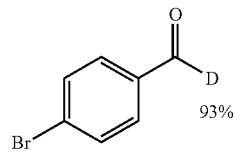

The reaction was carried out according to the general procedure A. 4-Bromobenzaldehyde (74.0 mg, 0.4 mmol, 1.0 equiv), 4CzIPN (8.0 mg, 0.01 mmol, 2.5 mol %), PhCOONa (8.6 mg, 0.06 mmol, 30 mol %), 2d (120 μL, 1M in EtOAc), D$_2$O (320 μL, 40 equiv) and anhydrous EtOAc (2.0 mL) were used. The reaction mixture was irritated by Blue LED strip for 36 h. The residue was purified by flash column chromatography (Et$_2$O/hexane=1/19) to afford product (35 mg, 47% yield, 93% D ratio by $^1$H NMR) as white solid. $^1$H NMR (400 MHz, CDCl$_3$) δ 9.98 (s, 0.05H), 7.75 (d, J=8.8 Hz, 2H), 7.68 (d, J=8.8 Hz, 2H). $^{13}$C NMR (100 MHz, CDCl$_3$) δ 190.88 (t, J=26.7 Hz), 135.13 (t, J=3.6 Hz), 132.58, 131.10, 129.93.

4-Iodobenzaldehyde-formyl-d1 (3i)

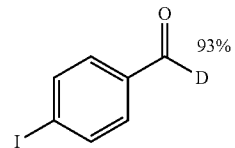

The reaction was carried out according to the general procedure A. 4-Iodobenzaldehyde (46.4 mg, 0.2 mmol, 1.0 equiv), 4CzIPN (8.0 mg, 0.01 mmol, 5 mol %), PhCOONa (8.6 mg, 0.06 mmol, 30 mol %), 2d (60 μL, 1M in EtOAc, 30 mol %), D$_2$O (160 μL, 40 equiv) and anhydrous EtOAc (1.0 mL) were used. The reaction mixture was irritated by Blue LED strip for 36 h. The residue was purified by flash column chromatography (Et$_2$O/hexane=1/19) to afford product (23 mg, 50% yield, 93% D ratio by $^1$H NMR) as white solid. $^1$H NMR (500 MHz, CDCl$_3$) δ 9.95 (s, 0.07H), 7.91 (d, J=8.5 Hz, 2H), 7.59 (d, J=8.5 Hz, 2H). $^{13}$C NMR (125 MHz, CDCl$_3$) δ 191.42 (t, J=26.3 Hz), 138.66, 135.72 (t, J=3.7 Hz), 131.02, 103.01.

4-Hydroxybenzaldehyde-formyl-d1 (3j)

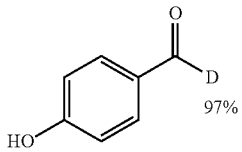

The reaction was carried out according to the general procedure A. 4-Hydroxybenzaldehyde (48.8 mg, 0.4 mmol, 1.0 equiv), 4CzIPN (16.0 mg, 0.02 mmol, 5 mol %), PhCOONa (17.4 mg, 0.12 mmol, 30 mol %), 2d (120 μL, 1M in EtOAc, 30 mol %), D$_2$O (400 μL, 50 equiv) and anhydrous EtOAc (2.0 mL) were used. The reaction mixture was irritated by Blue LED strip for 36 h. The residue was purified by flash column chromatography (DCM/EtOAc/hexane=1/2/7) to afford product (48 mg, 99% yield, 97% D ratio by $^1$H NMR) as white solid. $^1$H NMR (400 MHz, CDCl$_3$) δ 9.86 (s, 0.03H), 7.82 (d, J=8.0 Hz, 2H), 6.97 (d, J=8.0 Hz, 2H), 6.21 (s, 1H). $^{13}$C NMR (125 MHz, DMSO) δ 190.90 (t, J=26.5 Hz), 163.56, 132.27, 128.55 (t, J=3.0 Hz), 116.00.

4-Hydroxy-3-methoxybenzaldehyde-formyl-d1(3k)

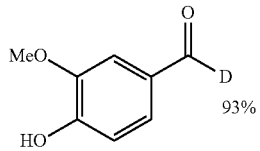 [SMILES: [2H]C(=O)c1ccc(O)c(OC)c1]

93%

The reaction was carried out according to the general procedure B. To an oven-dried 10 mL-Schlenk tube equipped with a stir bar, was added 4-hydroxy-3-methoxybenzaldehyde (30.4 mg, 0.2 mmol, 1.0 equiv), 4CzIPN (8.0 mg, 0.01 mmol, 5 mol %), NaOAc (4.9 mg, 0.06 mmol, 30 mol %), anhydrous Na$_2$CO$_3$ (21.2 mg, 0.2 mmol, 1.0 equiv), 1 mL anhydrous EtOAc and D$_2$O (40 ul, 10 equiv). The tube was stirred at room temperature for 10 min to exchange active protium with deuterium. The solvent was removed under reduced pressure and the tube was evacuated and backfilled with N$_2$ (one time). 2d (60 μL, 1M in EA, 30 mol %), D$_2$O (160 μL, 40 equiv) and anhydrous EtOAc (1.0 mL) were added to tube under N$_2$ by syringe. The mixture was degassed by freeze-pump-thaw method, then sealed with parafilm. The reaction mixture was irritated by Blue LED strip for 36 h. The residue was purified by flash column chromatography (DCM/EtOAc/hexane=1/1/3) to afford product (30 mg, 99% yield, 97% D ratio by $^1$H NMR) as white solid. $^1$H NMR (400 MHz, CDCl$_3$) δ 9.81 (s, 0.03H), 7.43-7.40 (m, 2H), 7.03 (d, J=8.4 Hz, 1H), 6.43 (s, 1H), 3.94 (s, 3H). $^{13}$C NMR (100 MHz, CDCl$_3$) δ 190.77 (t, J=26.5 Hz), 151.88 (s), 147.31 (s), 129.85 (t, J=3.5 Hz), 127.63, 114.54, 108.94, 56.21.

4-Formylphenyl acetate-formyl-d1 (3l)

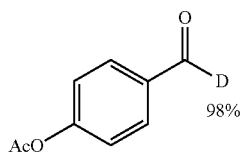 [SMILES: [2H]C(=O)c1ccc(OC(C)=O)cc1]

98%

The reaction was carried out according to the general procedure A. 4-Formylphenyl acetate (32.8 mg, 0.2 mmol, 1.0 equiv), 4CzIPN (8.0 mg, 0.01 mmol, 5 mol %), PhCOONa (8.6 mg, 0.06 mmol, 30 mol %), 2d (60 μL, 1M in EtOAc), D$_2$O (160 μL, 40 equiv) and anhydrous EtOAc (1.0 mL) were used. The reaction mixture was irritated by Blue LED strip for 36 h. The residue was purified by flash column chromatography (acetone/hexane=1/5) to afford product (16 mg, 50% yield, 98% D ratio by $^1$H NMR) as colorless oil. $^1$H NMR (400 MHz, CDCl$_3$) δ 9.98 (s, 0.02H), 7.91 (d, J=8.4 Hz, 2H), 7.27 (d, J=8.2 Hz, 2H), 2.33 (s, 3H). $^{13}$C NMR (100 MHz, CDCl$_3$) δ 190.90 (t, J=26.5 Hz), 168.96, 155.60, 134.14 (t, J=3.5 Hz), 131.40, 122.56, 21.17.

4-(Allyloxy)benzaldehyde-formyl-d1 (3m)

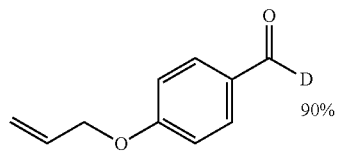

90%

The reaction was carried out according to the general procedure A. To an oven-dried 10 mL-Schlenk tube equipped with a stir bar, was added 4CzIPN (8.0 mg, 0.01 mmol, 5 mol %), dry CsOAc (11.5 mg, 0.06 mmol, 30 ml %), Cs$_2$CO$_3$ (13.0 mg, 0.04 mmol, 20 mol %). The tube was evacuated and backfilled with N$_2$ (one time). 4-(Allyloxy)benzaldehyde (32.4 mg, 0.2 mmol, 1.0 equiv), 1 mL anhydrous EtOAc, thiol catalyst triisopropylsilanethiol (2d, 60 μL, 30 mol %) in EtOAc solution, and D$_2$O (160 μL, 40 equiv) were added by syringe under N$_2$. The mixture was degassed by freeze-pump-thaw method, then sealed with parafilm. The solution was then stirred at room temperature under the irradiation of two 34 W Kessil Blue LEDs instead of Blue LED strip. Electronic fan was used to cool the tube. After 1 h, another potion of 4CzIPN (8.0 mg, 0.01 mmol 5 mol %) was added to reaction. The solution was then stirred at room temperature under the irradiation of two 34 W Kessil Blue LEDs for another 5 h. Electronic fan was used to cool the tub. After completion of reaction, the mixture was concentrated and purified by flash column chromatography (acetone/hexane=1/5) to afford product (25 mg, 74% yield, 90% D ratio by $^1$H NMR) as colorless oil. $^1$H NMR (400 MHz, CDCl$_3$) δ 9.88 (s, 0.10H), 7.83 (d, J=8.8 Hz, 2H), 7.01 (d, J=8.8 Hz, 2H), 6.10-6.00 (m, 1H), 5.38 (ddd, J=13.9, 11.8, 1.4 Hz, 2H), 4.62 (dt, J=5.3, 1.4 Hz, 2H). $^{13}$C NMR (100 MHz, CDCl$_3$) δ 190.61 (t, J=26.2 Hz), 163.74, 132.41, 132.09, 130.10 (t, J=3.5 Hz), 118.49, 115.14, 69.15.

N-(4-Formylphenyl)acetamide-formyl-d1 (3n)

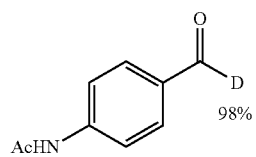 [SMILES: [2H]C(=O)c1ccc(NC(C)=O)cc1]

98%

The reaction was carried out according to the general procedure A. N-(4-Formylphenyl)acetamide (65.2 mg, 0.4 mmol, 1.0 equiv), 4CzIPN (8.0 mg, 0.01 mmol, 2.5 mol %), PhCOONa (17.4 mg, 0.12 mmol, 30 mol %), 2d (120 μL, 1M in EtOAc, 30 mol %), D$_2$O (400 μL, 50 equiv) and anhydrous EtOAc (2.0 mL) were used. The reaction mixture was irritated by Blue LED strip for 36 h. The residue was purified by flash column chromatography (EtOAc/hexane=2/1-3/1) to afford product (48 mg, 85% yield, 97% D ratio by $^1$H NMR) as light yellow solid. $^1$H NMR (400 MHz, CDCl$_3$) δ 9.92 (s, 0.02H), 7.85 (d, J=8.4 Hz, 2H), 7.74 (br, 1H), 7.70 (d, J=8.4 Hz, 2H), 2.23 (s, 3H). $^{13}$C NMR (100

MHz, CDCl$_3$) δ 190.91 (t, J=26.4 Hz), 168.87, 143.69, 132.30 (t, J=3.2 Hz), 131.30, 119.36, 24.96.

4-Morpholinobenzaldehyde-formyl-d1 (3o)

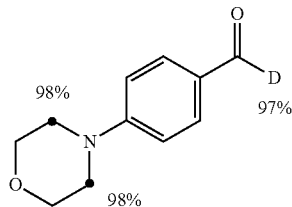

The reaction was carried out according to the general procedure A. 4-Morpholinobenzaldehyde (38.2 mg, 0.2 mmol, 1.0 equiv), 4CzIPN (8.0 mg, 0.01 mmol, 5 mol %), PhCOONa (8.7 mg, 0.06 mmol, 30 mol %), Na$_2$CO$_3$ (6.4 mg, 0.06 mmol, 30 mol %), 2d (60 μL, 1M in EtOAc, 30 mol %), D$_2$O (320 μL, 80 equiv) and anhydrous EtOAc (1.0 mL) were used. The reaction mixture was irritated by Blue LED strip for 36 h. The residue was purified by flash column chromatography (EtOAc/hexane=1/1) to afford product (32 mg, 83% yield, 97% D ratio by $^1$H NMR) as brown solid. $^1$H NMR (500 MHz, CDCl$_3$) δ 9.79 (s, 0.03H), 7.76 (d, J=9.0 Hz, 2H), 6.90 (d, J=9.0 Hz, 2H), 3.84 (s, 4H), 3.32-3.30 (m, 0.1H, 98% D ratio). $^{13}$C NMR (125 MHz, CDCl$_3$) δ 190.46 (t, J=26.0 Hz), 155.38, 132.00, 127.71 (t, J=3.3 Hz), 113.53, 66.44, 46.90, 46.74, 46.57, 46.41, 46.23 (quint, J=20.9 Hz).

1H-indole-3-carbaldehyde-formyl-d1 (3p)

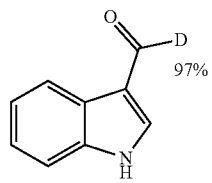 [SMILES: [2H]C(=O)c1c[nH]c2ccccc12]

The reaction was carried out according to the general procedure A. 1H-indole-3-carbaldehyde (58.4 mg, 0.4 mmol, 1.0 equiv), 4CzIPN (8.0 mg, 0.01 mmol, 2.5 mol %), PhCOONa (17.4 mg, 0.12 mmol, 30 mol %), 2d (120 μL, 1M in EtOAc, 30 mol %), D$_2$O (400 μL, 50 equiv) and anhydrous EtOAc (2.0 mL) were used. The reaction mixture was irritated by Blue LED strip for 36 h. The residue was purified by flash column chromatography (EtOAc/hexane/DCM=1/1/1) to afford product (50 mg, 87% yield, 97% D ratio by $^1$H NMR) as light brown solid. $^1$H NMR (400 MHz, DMSO) δ 12.13 (s, 1H), 9.93 (s, 0.03H), 8.28 (d, J=2.0 Hz, 1H), 8.10 (s, 1H), 7.52-7.50 (m, 1H), 7.27-7.20 (m, 2H). $^{13}$C NMR (100 MHz, DMSO) δ 184.70 (t, J=26.0 Hz), 138.39, 137.03, 124.12, 123.43, 122.09, 120.82, 118.06 (t, J=3.3 Hz), 112.39.

1H-indole-6-carbaldehyde-formyl-d1 (3q)

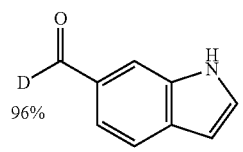 [SMILES: [2H]C(=O)c1ccc2cc[nH]c2c1]

The reaction was carried out according to the general procedure A. 1H-indole-3-carbaldehyde (58.4 mg, 0.4 mmol, 1.0 equiv), 4CzIPN (8.0 mg, 0.01 mmol, 2.5 mol %), PhCOONa (17.4 mg, 0.12 mmol, 30 mol %), 2d (120 μL, 1M in EtOAc, 30 mol %), D$_2$O (400 μL, 50 equiv) and anhydrous EtOAc (2.0 mL) were used. The reaction mixture was irritated by Blue LED strip for 36 h. The residue was purified by flash column chromatography (EtOAc/hexane/DCM=1/1/1) to afford product (54 mg, 93% yield, 96% D ratio by $^1$H NMR) as light brown solid. $^1$H NMR (400 MHz, DMSO) δ 11.69 (s, 1H), 10.01 (s, 0.04H), 8.01 (s, 1H), 7.71-7.67 (m, 2H), 7.55 (d, J=8.2 Hz, 1H), 6.58 (s, 1H). $^{13}$C NMR (100 MHz, DMSO) δ 192.44 (t, J=27.2 Hz), 135.27, 132.56, 130.37, 130.11 (t, J=2.4 Hz), 120.43, 118.82, 115.51, 102.04.

Benzo[b]thiophene-3-carbaldehyde-formyl-d1 (3r)

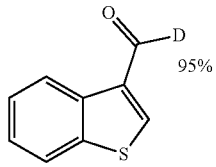 [SMILES: [2H]C(=O)c1csc2ccccc12]

The reaction was carried out according to the general procedure A. Benzo[b]thiophene-3-carbaldehyde (64.8 mg, 0.4 mmol, 1.0 equiv), 4CzIPN (8.0 mg, 0.01 mmol, 2.5 mol %), PhCOONa (17.4 mg, 0.12 mmol, 30 mol %), 2d (120 μL, 1M in EtOAc, 30 mol %), D$_2$O (320 μL, 40 equiv) and anhydrous EtOAc (2.0 mL) were used. The reaction mixture was irritated by Blue LED strip for 36 h. The residue was purified by flash column chromatography (Et$_2$O/hexane=1/9) to afford product (41 mg, 63% yield, 95% D ratio by $^1$H NMR) as light brown solid. $^1$H NMR (400 MHz, CDCl$_3$) δ 10.13 (s, 0.05H), 8.68 (d, J=8.1 Hz, 1H), 8.29 (s, 1H), 7.87 (d, J=7.9 Hz, 1H), 7.48 (m, 2H). $^{13}$C NMR (100 MHz, CDCl$_3$) δ 185.18 (t, J=26.7 Hz), 143.26, 140.53, 136.47 (t, J=3.7 Hz), 135.24, 126.24, 126.18, 124.90, 122.51, 77.48, 76.84.

1-(tert-Butyl) 2-(4-formylphenyl) (S)-pyrrolidine-1,2-dicarboxylate-formyl-d1 (3s)

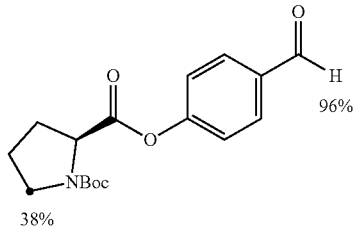

The reaction was carried out according to the general procedure A. 1-(tert-Butyl) 2-(4-formylphenyl) (S)-pyrrolidine-1,2-dicarboxylate (prepared according to reported procedure,[9] 64.0 mg, 0.2 mmol, 1.0 equiv), 4CzIPN (8.0 mg, 0.01 mmol, 5 mol %), PhCOONa (8.7 mg, 0.06 mmol, 30 mol %), 2d (60 μL, 1M in EtOAc, 30 mol %), D$_2$O (160 μL, 40 equiv) and anhydrous EtOAc/anhydrous DCE (0.4 mL/0.6 mL) were used. The reaction mixture was irritated by Blue LED strip for 36 h. The residue was purified by flash column chromatography (EtOAc/hexane/DCM=1/5/1) to afford product (42 mg, 66% yield, 96% D ratio by ¹H NMR) as colorless oil. ¹H NMR (400 MHz, CDCl₃) δ 9.79 (s, s, rotamer, 0.04H), 7.9-7.89 (d, d, J=8.4 Hz, rotamer, 2H), 7.29 (t, J=8.5 Hz, 2H), 4.50 (dd, dd, J=8.4, 4.0 Hz, 1H), 3.66-3.43 (m, 1.25H), 2.45-2.31 (m, 1H), 2.28-2.13 (m, 1H), 2.08-1.91 (m, 2H), 1.47 and 1.46 (s, s, rotamer, 9H). ¹³C NMR (100 MHz, CDCl₃) δ 191.07-190.32 (m, split by D, rotamer), 171.20, 171.12, 155.67, 155.37, 154.63, 153.75, 134.17-134.03 (m, rotamer), 131.40, 131.29, 122.41, 122.30, 80.53, 80.34, 59.34, 59.24, 46.78-46.10 (m, split by D), 31.15, 30.10, 24.61, 23.77.

3-Phenylpropanal-formyl-d1 (3t)

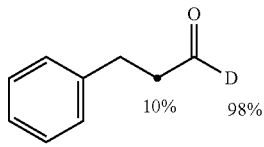

The reaction was carried out according to the general procedure A. 3-Phenylpropanal (53.6 mg, 0.4 mmol, 1.0 equiv), 4CzIPN (8.0 mg, 0.01 mmol, 2.5 mol %), PhCOONa (17.4 mg, 0.12 mmol, 30 mol %), 2d (120 μL, 1M in EtOAc, 30 mol %), D₂O (320 μL, 40 equiv) and anhydrous EtOAc (1.0 mL) were used. The reaction mixture was irritated by Blue LED strip for 36 h. The residue was purified by flash column chromatography (acetone/hexane=1/9) to afford product (53 mg, 99% yield, 98% D ratio by ¹H NMR) as colorless oil. ¹H NMR (400 MHz, CDCl₃) δ 9.82 (s, 0.02H), 7.31 (t, J=7.0 Hz, 2H), 7.22 (t, J=7.4 Hz, 3H), 2.97 (t, J=7.3 Hz, 2H), 2.78 (t, J=7.4 Hz, 2H). ¹³C NMR (100 MHz, CDCl₃) δ 201.30 (t, J=26.0 Hz), 140.43, 128.67, 128.36, 126.36, 45.15 (t, J=3.7 Hz), 28.16.

3-(2-Chlorophenyl)propanal-formyl-d1 (3u)

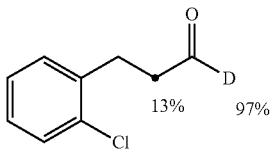

The reaction was carried out according to the general procedure A. 3-(2-Chlorophenyl)propanal (prepared according to reported procedure,[10] 67.2 mg, 0.4 mmol), 4CzIPN (8.0 mg, 0.01 mmol, 2.5 mol %), PhCOONa (17.4 mg, 0.12 mmol, 30 mol %), 2d (120 μL, 1M in EtOAc, 30 mol %), D₂O (320 μL, 40 equiv) and anhydrous EtOAc (1.0 mL) were used. The reaction mixture was irritated by Blue LED strip for 36 h. The residue was purified by flash column chromatography (acetone/hexane=1/9) to afford product (55 mg, 82% yield, 98% D ratio by ¹H NMR) as pale-yellow oil. ¹H NMR (500 MHz, CDCl₃) δ 9.83 (t, J=1.3 Hz, 0.03H), 7.35 (dd, J=7.6, 1.6 Hz, 1H), 7.25-7.23 (m, 1H), 7.21-7.14 (m, 2H), 3.06 (t, J=7.6 Hz, 2H), 2.79 (t, J=7.6 Hz, 1.74H). ¹³C NMR (120 MHz, CDCl₃) δ 201.16 (t, J=26.2 Hz), 138.21, 134.07, 130.73, 129.84, 128.10, 127.21, 43.40 (t, J=3.9 Hz), 26.20.

3-(Benzo[d][1,3]dioxol-5-yl)propanal-formyl-d1 (3v)

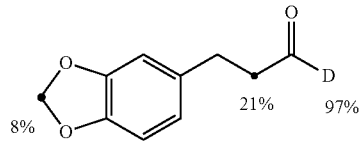

The reaction was carried out according to the general procedure A. 3-(Benzo[d][1,3]dioxol-5-yl)propanal (35.6 mg, 0.2 mmol, 1.0 equiv), 4CzIPN (8.0 mg, 0.01 mmol, 5 mol %), PhCOONa (8.7 mg, 0.06 mmol, 30 mol %), 2d (60 μL, 1M in EtOAc, 30 mol %), D₂O (160 μL, 40 equiv) and anhydrous EtOAc (1.0 mL) were used. The reaction mixture was irritated by Blue LED strip for 36 h. The residue was purified by flash column chromatography (acetone/hexane=1/9) to afford product (30 mg, 85% yield, 97% D ratio by ¹H NMR) as pale-yellow oil. ¹H NMR (400 MHz, CDCl₃) δ 9.79 (t, J=1.2 Hz, 0.03H), 6.72 (d, J=7.9 Hz, 1H), 6.67 (d, J=1.5 Hz, 1H), 6.63 (dd, J=7.9, 1.4 Hz, 1H), 5.91 and 5.89 (s, s, 1.84H, 21% D ratio), 2.87 (t, J=7.4 Hz, 2H), 2.72 (t, J=7.3 Hz, 1.58H). ¹³C NMR (100 MHz, CDCl₃) δ 201.35 (t, J=26.3 Hz), 147.84, 146.08, 134.21, 121.16, 108.86, 108.41, 100.99, 45.46 (t, J=3.7 Hz), 27.96.

3-((tert-Butyldimethylsilyl)oxy)propanal-formyl-d1 (3w)

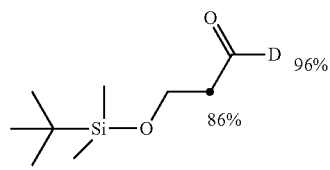

The reaction was carried out according to the general procedure A. 3-((tert-Butyldimethylsilyl)oxy)propanal (prepared according to reported procedure,[11] 37.6 mg, 0.2 mmol, 1.0 equiv), 4CzIPN (8.0 mg, 0.01 mmol, 5 mol %), PhCOONa (8.7 mg, 0.06 mmol, 30 mol %), 2d (60 μL, 1M in EtOAc, 30 mol %), D₂O (160 μL, 40 equiv) and anhydrous EtOAc (1.0 mL) were used. The reaction mixture was irritated by Blue LED strip for 36 h. The residue was purified by flash column chromatography (acetone/hexane=1/9) to afford product (33 mg, 87% yield, 96% D ratio by ¹H NMR) as colorless oil. ¹H NMR (400 MHz, CDCl₃) δ 9.80 (s, 0.04H), 3.97 (s, 2H), 2.61-2.53 (m, 0.28H, 86% D ratio), 0.87 (s, 9H), 0.06 (s, 6H). ¹³C NMR (100 MHz, CDCl₃) δ 202.00 (t, J=26.9 Hz), 57.48, 46.68-45.63 (m), 25.95, 18.36, −5.31.

3-(4-(tert-Butyl)phenyl)-2-methylpropanal-formyl-d1 (3x)

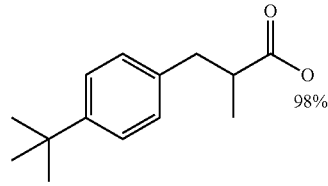 [SMILES: CC(Cc1ccc(C(C)(C)C)cc1)C(=O)O]

The reaction was carried out according to the general procedure A. 3-(4-(tert-Butyl)phenyl)-2-methylpropanal (40.8 mg, 0.2 mmol, 1.0 equiv), 4CzIPN (8.0 mg, 0.01 mmol, 5 mol %), PhCOONa (8.7 mg, 0.06 mmol, 30 mol %), 2d (60 µL, 1M in EtOAc, 30 mol %), D$_2$O (160 µL, 40 equiv) and anhydrous EtOAc (1.0 mL) were used. The reaction mixture was irritated by Blue LED strip for 36 h. The residue was purified by flash column chromatography (Et$_2$O/hexane=1/9) to afford product (25 mg, 60% yield, 98% D ratio by $^1$H NMR) as colorless oil. $^1$H NMR (400 MHz, CDCl$_3$) δ 9.73 (d, J=1.5 Hz, 0.02H), 7.32 (d, J=8.3 Hz, 2H), 7.11 (d, J=8.2 Hz, 2H), 3.06 (dd, J=13.5, 5.8 Hz, 1H), 2.71-2.55 (m, 2H), 1.31 (s, 9H), 1.10 (d, J=6.9 Hz, 3H). $^{13}$C NMR (100 MHz, CDCl$_3$) δ 204.42 (t, J=26.9 Hz), 149.39, 135.83, 128.80, 125.54, 48.00 (t, J=3.5 Hz), 36.30, 34.54, 31.51, 13.43.

2,3-Dihydro-1H-indene-2-carbaldehyde-formyl-d1 (3y)

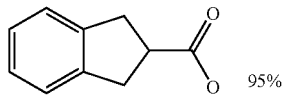 [SMILES: O=C(O)C1Cc2ccccc2C1]

The reaction was carried out according to the general procedure A. 2,3-Dihydro-1H-indene-2-carbaldehyde (29.2 mg, 0.2 mmol, 1.0 equiv), 4CzIPN (8.0 mg, 0.01 mmol, 5 mol %), PhCOONa (8.7 mg, 0.06 mmol, 30 mol %), 2d (60 µL, 1M in EtOAc, 30 mol %), D$_2$O (160 µL, 40 equiv) and anhydrous EtOAc (1.0 mL) were used. The reaction mixture was irritated by Blue LED strip for 36 h. The residue was purified by flash column chromatography (Et$_2$O/hexane=1/9) to afford product (27 mg, 91% yield, 95% D ratio by $^1$H NMR) as colorless oil. $^1$H NMR (400 MHz, CDCl$_3$) δ 9.78 (s, 0.05H), 7.26-7.23 (m, 2H), 7.18-7.16 (m, 2H), 3.32-3.25 (m, 3H), 3.32-3.16 (m, 2H). $^{13}$C NMR (100 MHz, CDCl$_3$) δ 202.66 (t, J=26.2 Hz), 141.22, 126.93, 124.75, 50.62-50.48 (t, J=3.5 Hz), 33.04.

tert-Butyl 4-formylpiperidine-1-carboxylate-formyl-d1 (3z)

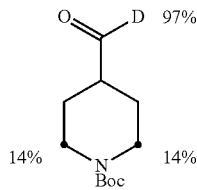

The reaction was carried out according to the general procedure A. tert-Butyl 4-formylpiperidine-1-carboxylate (29.2 mg, 0.2 mmol, 1.0 equiv), 4CzIPN (8.0 mg, 0.01 mmol, 5 mol %), PhCOONa (8.7 mg, 0.06 mmol, 30 mol %), 2d (60 µL, 1M in EtOAc, 30 mol %), D$_2$O (160 µL, 40 equiv) and anhydrous EtOAc (1.0 mL) were used. The reaction mixture was irritated by Blue LED strip for 36 h. The residue was purified by flash column chromatography (Et$_2$O/hexane=1/9) to afford product (27 mg, 91% yield, 95% D ratio by $^1$H NMR) as colorless oil. $^1$H NMR (400 MHz, CDCl$_3$) δ 9.62 (s, 0.03H), 3.93 (br, 2H), 2.89 (t, J=10.9 Hz, 1.73H), 2.40-2.35 (m, 1H), 1.89-1.84 (m, 2H), 1.55-1.48 (m, 2H), 1.41 (s, 9H). $^{13}$C NMR (100 MHz, CDCl$_3$) δ 202.94 (t, J=20.9 Hz), 154.85, 79.75, 47.87-47.75 (m), 42.80 (br), 28.39, 25.11.

Bicyclo[2.2.1]hept-5-ene-2-carboxaldehyde-formyl-d1 (3aa)

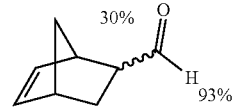

The reaction was carried out according to the general procedure A. Bicyclo[2.2.1]hept-5-ene-2-carboxaldehyde (36.6 mg, 0.3 mmol, 1.0 equiv), 4CzIPN (8.0 mg, 0.01 mmol, 3.7 mol %), PhCOONa (13.0 mg, 0.09 mmol, 30 mol %), Cs$_2$CO$_3$ (19.0 mg, 0.06 mmol, 20 mol %), 2d (60 µL, 1M in EtOAc, 20 mol %), D$_2$O (240 µL, 40 equiv) and anhydrous EtOAc (2.0 mL) were used. The reaction mixture was irritated by Blue LED strip for 36 h. The residue was purified by flash column chromatography (Et$_2$O/hexane=1/9) to afford product (19 mg, 52% yield, 93% D ratio by $^1$H NMR) as colorless oil. $^1$H NMR (400 MHz, CDCl$_3$) δ 9.42 (d, J=2.8 Hz, 1H), 6.21 (dd, J=5.5, 3.0 Hz, 1H), 5.99 (dd, J=5.7, 2.8 Hz, 1H), 3.24 (s, 1H), 2.98 (s, 1H), 2.90 (dt, J=9.0, 3.8 Hz, 0.69H), 1.92-1.87 (m, 1H), 1.50-1.40 (m, 2H), 1.31 (dd, J=8.3, 1.4 Hz, 1H). $^{13}$C NMR (100 MHz, CDCl$_3$) δ 204.95 (t, J=25.9 Hz), 138.28, 131.94, 52.22 (t, J=3.5 Hz), 49.80, 45.18, 42.90, 27.73.

tert-Butyl (3-oxopropyl)carbamate-formyl-d1 (3ab)

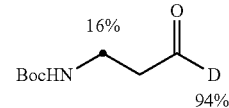

The reaction was carried out according to the general procedure A. tert-Butyl (3-oxopropyl)carbamate (34.6 mg, 0.2 mmol, 1.0 equiv), 4CzIPN (8.0 mg, 0.01 mmol, 5 mol %), PhCOONa (8.7 mg, 0.06 mmol, 30 mol %), 2d (40 µL, 1M in EtOAc, 20 mol %), D$_2$O (160 µL, 40 equiv) and anhydrous EtOAc (2.0 mL) were used. The reaction mixture was irritated by Blue LED strip for 36 h. The residue was purified by flash column chromatography (acetone/hexane=1/3) to afford product (28 mg, 81% yield, 94% D ratio by $^1$H NMR) as colorless oil. $^1$H NMR (400 MHz, CDCl$_3$) δ 9.80 (s, 0.06H), 4.89 (s, 1H), 3.46-3.36 (t, J=5.6 Hz, 1.67H), 2.69 (t, J=5.3 Hz, 2H), 1.42 (s, 9H). $^{13}$C NMR (100 MHz, CDCl$_3$) δ 201.24 (t, J=26.0 Hz), 155.94, 79.61, 44.25 (t, J=3.6 Hz), 34.13, 28.51.

4-Oxo-4-phenylbutanal-formyl-d1 (3ac)

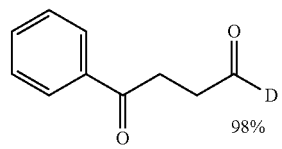 [SMILES: [2H]C(=O)CCC(=O)c1ccccc1]

The reaction was carried out according to the general procedure A. 4-Oxo-4-phenylbutanal (32.4 mg, 0.2 mmol, 1.0 equiv), 4CzIPN (8.0 mg, 0.01 mmol, 5 mol %), PhCOONa (8.7 mg, 0.06 mmol, 30 mol %), 2d (60 μL, 1M in EtOAc, 30 mol %), D$_2$O (160 μL, 40 equiv) and anhydrous EtOAc (1.0 mL) were used. The reaction mixture was irritated by Blue LED strip for 36 h. The residue was purified by flash column chromatography (acetone/hexane=1/3) to afford product (27 mg, 84% yield, 98% D ratio by $^1$H NMR) as colorless oil. $^1$H NMR (400 MHz, CDCl$_3$) δ 9.89 (s, 0.02H), 7.98 (d, J=8.1 Hz, 2H), 7.57 (t, J=6.8 Hz, 1H), 7.46 (t, J=7.2 Hz, 2H), 3.32 (t, J=6.2 Hz, 2H), 2.92 (t, J=6.2 Hz, 2H). $^{13}$C NMR (100 MHz, CDCl$_3$) δ 200.44 (t, J=26.6 Hz), 197.91, 136.51, 133.41, 128.74, 128.15, 37.50 (t, J=3.8 Hz), 31.08.

Benzyl 4-oxobutanoate-formyl-d1 (3ad)

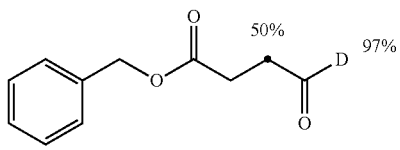

The reaction was carried out according to the general procedure A. Benzyl 4-oxobutanoate (38.4 mg, 0.2 mmol, 1.0 equiv), 4CzIPN (8.0 mg, 0.01 mmol, 5 mol %), PhCOONa (8.7 mg, 0.06 mmol, 30 mol %), 2d (60 μL, 1M in EtOAc, 30 mol %), D$_2$O (160 μL, 40 equiv) and anhydrous EtOAc (1.0 mL) were used. The reaction mixture was irritated by Blue LED strip for 36 h. The residue was purified by flash column chromatography (acetone/hexane=1/3) to afford product (35 mg, 84% yield, 97% D ratio by $^1$H NMR) as colorless oil. $^1$H NMR (400 MHz, CDCl$_3$) δ 9.81 (s, 0.03H), 7.40-7.26 (m, 5H), 5.13 (s, 2H), 2.81 (t, J=6.4 Hz, 0.95H), 2.68 (t, J=6.4 Hz, 2H). $^{13}$C NMR (100 MHz, CDCl$_3$) δ 199.71 (t, J=26.7 Hz), 172.21, 135.82, 128.69, 128.79, 128.42, 128.33 66.76, 38.43 (t, J=3.8 Hz), 26.67.

4-(3-Oxopropyl)benzonitrile-formyl-d1 (3ae)

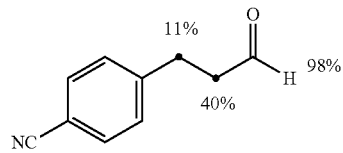

The reaction was carried out according to the general procedure A. 4-(3-Oxopropyl)benzonitrile (38.4 mg, 0.2 mmol), 4CzIPN (8.0 mg, 0.01 mmol, 5 mol %), PhCOONa (8.7 mg, 0.06 mmol, 30 mol %), 2d (60 μL, 1M in EtOAc, 30 mol %), D$_2$O (160 μL, 40 equiv) and anhydrous EtOAc (1.0 mL) were used. The reaction mixture was irritated by Blue LED strip for 36 h. The residue was purified by flash column chromatography (acetone/hexane=1/3) to afford product (35 mg, 84% yield, 97% D ratio by $^1$H NMR) as pale yellow oil. $^1$H NMR (400 MHz, CDCl$_3$) δ 9.81 (s, 0.02H), 7.58 (d, J=8.0 Hz, 2H), 7.30 (d, J=7.9 Hz, 2H), 3.01 (t, J=6.8 Hz, 1.77H), 2.82 (t, J=7.1 Hz, 1.19H). $^{13}$C NMR (100 MHz, CDCl$_3$) δ 200.06 (t, J=26.7 Hz), 146.20, 132.51, 129.32, 118.97, 110.41, 44.47 (t, J=3.7 Hz), 28.06 (t, J=6.1 Hz).

3-Cyano-N-(3-oxopropyl)benzamide-formyl-d1 (3af)

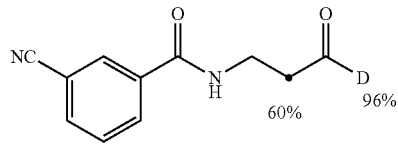

The reaction was carried out according to the general procedure B. 3-Cyano-N-(3-oxopropyl)benzamide (40.4 mg, 0.2 mmol), 4CzIPN (8.0 mg, 0.01 mmol, 5 mol %), PhCOONa (8.7 mg, 0.06 mmol, 30 mol %), 2d (60 μL, 1M in EtOAc, 30 mol %), D$_2$O (160 μL, 40 equiv) and anhydrous EtOAc (1.0 mL) were used. The reaction mixture was irritated by Blue LED strip for 36 h. The residue was purified by preparative TLC plate (EtOAc/hexane=3/1) to afford product (32 mg, 80% yield, 96% D ratio by $^1$H NMR) as pale yellow oil. $^1$H NMR (400 MHz, CDCl$_3$) δ 9.86 (s, 0.04H), 8.05 (s, 1H), 7.96 (d, J=7.7 Hz, 1H), 7.77 (d, J=7.7 Hz, 1H), 7.56 (t, J=7.8 Hz, 1H), 6.85 (br, 1H), 3.74 (d, J=5.4 Hz, 2H), 2.90-2.86 (m, 0.79H). $^{13}$C NMR (100 MHz, CDCl$_3$) δ 201.90-201.24 (m), 165.39, 135.56, 134.88, 131.26, 130.96, 129.70, 118.09, 113.11, 42.39-42.86 (m), 33.74 (t, J=5.0 Hz).

3-(Pyridin-4-yl)propanal-formyl-d1 (3ag)

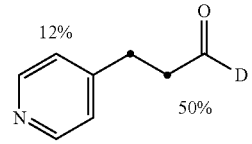

The reaction was carried out according to the general procedure A. 3-(Pyridin-4-yl)propanal (27.0 mg, 0.2 mmol, 1.0 equiv), 4CzIPN (8.0 mg, 0.01 mmol, 5 mol %), PhCOONa (8.7 mg, 0.06 mmol, 30 mol %), 2d (60 μL, 1M in EtOAc, 30 mol %), D$_2$O (160 μL, 40 equiv) and anhydrous DCE (1.0 mL) were used. The reaction mixture was irritated by Blue LED strip for 36 h. The residue was purified by preparative TLC plate (EtOAc/hexane=3/1) to afford product (21 mg, 78% yield, 97% D ratio by $^1$H NMR) as pale yellow oil. $^1$H NMR (400 MHz, CDCl$_3$) δ 9.82 (t, J=1.2 Hz, 1H), 8.52 (d, J=5.7 Hz, 2H), 7.14 (d, J=5.8 Hz, 2H), 2.95 (t, J=7.2 Hz, 1.76H), 2.82 (t, J=7.2 Hz, 1.05H). $^{13}$C NMR (100 MHz, CDCl$_3$) δ 200.35-199.73 (m), 149.77, 123.94, 43.84 (t, J=3.7 Hz), 27.26 (t, J=6.1 Hz).

3-(1H-indol-3-yl)propanal-formyl-d1 (3ah)

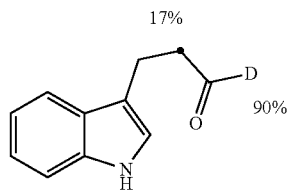

The reaction was carried out according to the general procedure B. 3-(1H-indol-3-yl)propanal-formyl (prepared according to reported procedure,[12] 34.6 mg, 0.2 mmol, 1.0 equiv), 4CzIPN (8.0 mg, 0.01 mmol, 5 mol %), PhCOONa (8.7 mg, 0.06 mmol, 30 mol %), 2d (60 μL, 1M in EtOAc, 30 mol %), D$_2$O (160 μL, 40 equiv) and anhydrous EtOAc (1.0 mL) were used. The reaction mixture was irritated by Blue LED strip for 36 h. The residue was purified by flash column chromatography (EtOAc/hexane/DCM=3/1/1) to afford product (21 mg, 60% yield, 90% D ratio by $^1$H NMR) as pale yellow oil. $^1$H NMR (400 MHz, CDCl$_3$) δ 9.85 (s, 0.1H), 8.00 (br, 1H), 7.60 (d, J=7.8 Hz, 1H), 7.36 (d, J=8.1 Hz, 1H), 7.22 (t, J=7.1 Hz, 1H), 7.17-7.12 (m, 1H), 6.98 (s, 1H), 3.13 (t, J=7.2 Hz, 2H), 2.85 (t, J=7.3 Hz, 1.67H). $^{13}$C NMR (100 MHz, CDCl$_3$) δ 202.45 (t, J=26.4 Hz), 136.45, 127.19, 122.31, 121.62, 119.54, 118.71, 111.34, 43.94 (t, J=3.7 Hz), 17.94.

3-(5-Methylfuran-2-yl)butanal-formyl-d1 (3ai)

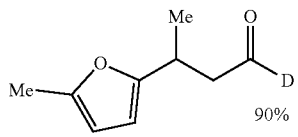 [SMILES: [2H]C(=O)CC(C)c1ccc(C)o1]

The reaction was carried out according to the general procedure A. 3-(5-Methylfuran-2-yl)butanal (30.4 mg, 0.2 mmol, 1.0 equiv), 4CzIPN (16.0 mg, 0.02 mmol, 10 mol %), NaOAc (4.9 mg, 0.06 mmol, 30 mol %) instead of PhCOONa, Na$_2$CO$_3$ (6.4 mg, 0.06 mmol, 30 mol %), 2d (60 μL, 1M in EtOAc, 30 mol %), D$_2$O (160 μL, 40 equiv) and anhydrous EtOAc (1.0 mL) were used. The reaction mixture was irritated by two 34 W Kessil Blue LEDs instead of LED strips for 6 h. The residue was purified by flash column chromatography (acetone/hexane=1/19) to afford product (15 mg, 50% yield, 90% D ratio by $^1$H NMR) as colorless oil. $^1$H NMR (400 MHz, CDCl$_3$) δ 9.76 (s, 0.1H), 5.86 (d, J=10.6 Hz, 2H), 3.37 (dd, J=13.7, 6.9 Hz, 1H), 2.77 (dd, J=16.7, 6.6 Hz, 1H), 2.55 (dd, J=16.7, 7.2 Hz, 1H), 2.24 (s, 3H), 1.29 (d, J=6.9 Hz, 3H). $^{13}$C NMR (100 MHz, CDCl$_3$) δ 201.55 (t, J=26.3 Hz), 156.56, 150.94, 105.95, 104.95, 49.25 (t, J=3.6 Hz), 28.08, 19.23, 13.63.

3-(Thiophen-2-yl)propanal-formyl-d1 (3aj)

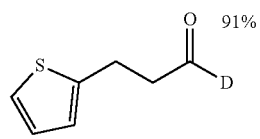

The reaction was carried out according to the general procedure A. 3-(Thiophen-2-yl)propanal (28.0 mg, 0.2 mmol, 1.0 equiv), 4CzIPN (8.0 mg, 0.01 mmol, 5 mol %), 2d (60 μL, 1M in EtOAc, 30 mol %), D$_2$O (160 μL, 40 equiv) and anhydrous EtOAc (1.0 mL) were used. The reaction mixture was irritated by blue LED strip for 36 h. The residue was purified by flash column chromatography (Et$_2$O/hexane=1/9-1/5) to afford product (27 mg, 95% yield, 91% D ratio by $^1$H NMR) as colorless oil. $^1$H NMR (400 MHz, CDCl$_3$) δ 9.83 (s, 0.09H), 7.13 (d, J=4.5 Hz, 1H), 6.91-6.91 (m, 1H), 6.82 (s, 1H), 3.18 (t, J=7.2 Hz, 2H), 2.84 (t, J=7.3 Hz, 2H). $^{13}$C NMR (100 MHz, CDCl$_3$) δ 200.73 (t, J=26.3 Hz), 143.05, 127.06, 124.88, 123.74, 45.31 (t, J=3.7 Hz), 22.50.

3-(2,4-Dimethoxypyrimidin-5-yl)propanal-formyl-d1 (3ak)

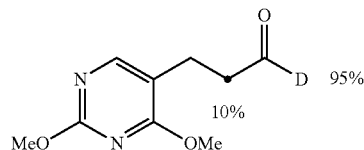

The reaction was carried out according to the general procedure A. 3-(2,4-Dimethoxypyrimidin-5-yl)propanal (39.2 mg, 0.2 mmol, 1.0 equiv), 4CzIPN (8.0 mg, 0.01 mmol, 5 mol %), 2d (60 μL, 1M in EtOAc, 30 mol %), D$_2$O (160 μL, 40 equiv) and anhydrous EtOAc (1.0 mL) were used. The reaction mixture was irritated by blue LED strip for 36 h. The residue was purified by flash column chromatography (EtOAc/hexane/DCM=5/3/2) to afford product (24 mg, 62% yield, 95% D ratio by $^1$H NMR) as pale yellow oil. $^1$H NMR (400 MHz, CDCl$_3$) δ 9.79 (t, J=1.2 Hz, 0.05H), 8.03 (s, 1H), 3.97 (d, J=1.2 Hz, 3H), 3.95 (d, J=1.3 Hz, 3H), 2.81-2.75 (m, 2H), 2.73-2.64 (m, 1.8H). $^{13}$C NMR (100 MHz, CDCl$_3$) δ 200.95 (t, J=26.4 Hz), 169.39, 164.51, 157.36, 113.56, 54.81 (q, J=3.6 Hz), 54.02 (q, J=3.5 Hz), 42.85 (t, J=3.7 Hz), 19.60.

Dodecanal-formyl-d1 (3al)

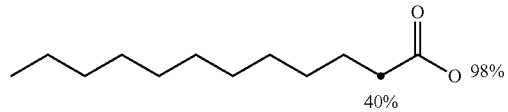

The reaction was carried out according to the general procedure A. Dodecanal (36.8 mg, 0.2 mmol, 1.0 equiv), 4CzIPN (8.0 mg, 0.01 mmol, 5 mol %), 2d (60 μL, 1M in EtOAc, 30 mol %), D$_2$O (160 μL, 40 equiv) and anhydrous EtOAc (1.0 mL) were used. The reaction mixture was irritated by blue LED strip for 36 h. The residue was purified by flash column chromatography (Et$_2$O/hexane/=1/19) to afford product (24 mg, 66% yield, 98% D ratio by $^1$H NMR) as colorless oil. $^1$H NMR (400 MHz, CDCl$_3$) δ 9.79 (t, J=1.2 Hz, 0.05H), 2.30 (t, J=7.4 Hz, 1.29H), 1.57-1.47 (m, 2H), 1.15 (s, 16H), 0.77 (t, J=6.8 Hz, 3H). $^{13}$C NMR (100 MHz, CDCl$_3$) δ 202.78 (t, J=26.4 Hz), 43.90 (t, J=3.5 Hz), 32.05, 29.74, 29.73, 29.58, 29.51, 29.47, 29.32, 22.83, 22.21, 14.26.

Olealdehyde-formyl-d1 (3am)

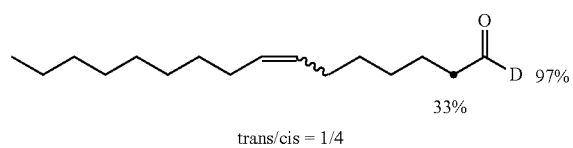

The reaction was carried out according to the general procedure A. Olealdehyde (53.2 mg, 0.2 mmol, 1.0 equiv), 4CzIPN (8.0 mg, 0.01 mmol, 5 mol %), 2d (60 µL, 1M in EtOAc, 30 mol %), D$_2$O (160 µL, 40 equiv) and anhydrous EtOAc (1.0 mL) were used. The reaction mixture was irritated by blue LED strip for 36 h. The residue was purified by flash column chromatography (Et$_2$O/hexane/=1/19) to afford product (35 mg, 65% yield, 97% D ratio by $^1$H NMR, trans/cis=1/4 by $^1$H NMR) as colorless oil. $^1$H NMR (400 MHz, CDCl$_3$) δ 9.76 (t, J=1.7 Hz, 0.03H), 5.43-5.35 (m, 1.37H, cis), 5.35-5.29 (m, 0.33H, trans), 2.41 (t, J=7.4 Hz, 1.34H), 2.01-1.93 (m, 4H), 1.67-1.57 (m, 2H), 1.28 (dd, J=17.4, 2.6 Hz, 20H), 0.88 (t, J=6.9 Hz, 3H). $^{13}$C NMR (100 MHz, CDCl$_3$) δ 202.75 (t, J=25.9 Hz), 130.66 (cis), 130.30 (cis), 130.18 (trans), 129.83 (trans), 43.88 (t, J=3.5 Hz), 32.75, 32.68, 32.05, 29.80, 29.68, 29.64, 29.47, 29.36, 29.33, 29.29, 29.05, 22.83, 22.20, 14.26.

(E)-6-(4-hydroxy-6-methoxy-7-methyl-3-oxo-1,3-dihydroisobenzofuran-5-yl)-4-methylhex-4-enal-formyl-d1 (3an)

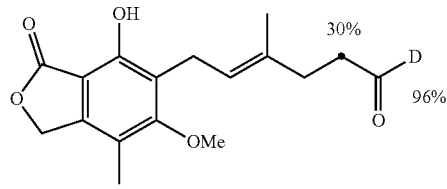

The reaction was carried out according to the general procedure B. (E)-6-(4-Hydroxy-6-methoxy-7-methyl-3-oxo-1,3-dihydroisobenzofuran-5-yl)-4-methylhex-4-enal (prepared according to reported procedure,$^9$ 30.4 mg, 0.1 mmol, 1.0 equiv), 4CzIPN (4.0 mg, 0.005 mmol, 5 mol %), 2d (30 µL, 1M in EtOAc, 30 mol %), D$_2$O (80 µL, 40 equiv) and anhydrous EtOAc (1.0 mL) were used. The reaction mixture was irritated by blue LED strip for 36 h. The residue was purified by flash column chromatography (EtOAc/hexane=3/7) to afford product (26 mg, 85% yield, 96% D ratio by $^1$H NMR) as white solid. $^1$H NMR (400 MHz, CDCl$_3$) δ 9.72 (s, 0.04H), 5.24 (t, J=7.0 Hz, 1H), 5.19 (s, 2H), 3.75 (s, 3H), 3.38 (d, J=6.9 Hz, 2H), 2.59-2.44 (m, 1.4H), 2.35-2.30 (m, 2H), 2.14 (s, 3H), 1.80 (s, 3H). $^{13}$C NMR (100 MHz, CDCl$_3$) δ 202.57-202.02 (m), 173.03, 163.78, 153.74, 144.19, 133.97, 123.05, 122.10, 116.86, 106.52, 70.18, 61.13, 42.21-41.43 (m), 31.83 (t, J=5.6 Hz), 22.72, 16.41, 11.70.

(R)-4-((3R,5S,7S,8R,9S,10S,13R,14S,17R)-3,7-dihydroxy-10,13-dimethylhexadecahydro-1H-cyclopenta[a]phenanthren-17-yl)pentanal-formyl-d1 (3ao)

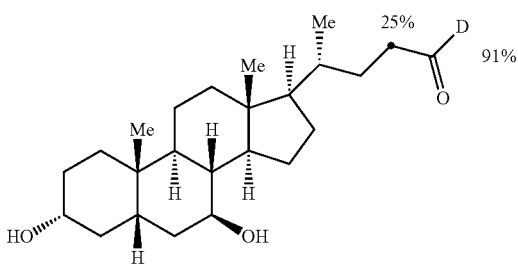

The reaction was carried out according to the general procedure B. (R)-4-((3R,5S,7S,8R,9S,10S,13R,14S,17R)-3,7-dihydroxy-10,13-dimethylhexadecahydro-1H-cyclopenta[a]phena-nthren-17-yl)pentanal (prepared according to reported procedure,$^9$ 37.7 mg, 0.1 mmol, 1.0 equiv), 4CzIPN (4.0 mg, 0.005 mmol, 5 mol %), 2d (30 µL, 1M in EtOAc, 30 mol %), D$_2$O (80 µL, 40 equiv) and anhydrous DCE (1.0 mL) were used. The reaction mixture was irritated by blue LED strip for 36 h. The residue was purified by flash column chromatography (EtOAc/hexane=1/1-3/1) to afford product (23 mg, 60% yield, 91% D ratio by $^1$H NMR) as white solid. $^1$H NMR (400 MHz, CDCl$_3$) δ 9.79 (s, 0.09H), 3.66-3.52 (m, 2H), 2.49-2.41 (m, 0.75H), 2.38-2.30 (m,0.75H), 2.01-1.98 (m, 1H), 1.92-1.75 (m, 7H), 1.68-1.57 (m, 4H), 1.53-1.40 (m, 6H), 1.36-1.22 (m, 6H), 1.17-1.01 (m, 3H), 0.94-0.89 (m, 6H), 0.67 (s, 3H). $^{13}$C NMR (100 MHz, CDCl$_3$) δ 203.00 (t, J=25.9 Hz), 71.58, 71.50, 55.85, 55.08, 43.91, 42.57, 40.90 (t, J=2.8 Hz), 40.26, 39.31, 37.43, 37.02, 35.38, 35.06, 34.22, 30.47, 28.81, 28.09, 27.03, 23.52, 21.31, 18.63, 12.28.

4-Formylphenyl 2-(1-(4-chlorobenzoyl)-5-methoxy-2-methyl-1H-indol-3-yl)acetate-formyl-d1 (3ap)

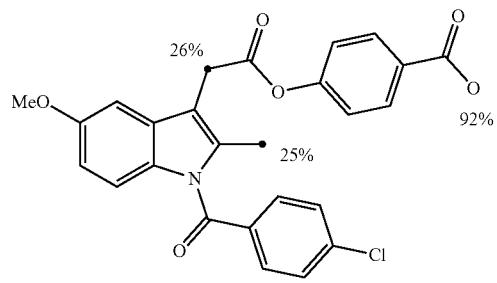

The reaction was carried out according to the general procedure A. (R)-4-((3R,5S,7S,8R,9S,10S,13R,14S,17R)-3,7-dihydroxy-10,13-dimethylhexadecahydro-1H-cyclopenta[a]phena-nthren-17-yl)pentanal (46.1 mg, 0.1 mmol, 1.0 equiv), 4CzIPN (4.0 mg, 0.005 mmol, 5 mol %), 2d (30 µL, 1M in EtOAc, 30 mol %), D$_2$O (80 µL, 40 equiv) and anhydrous DCE/anhydrous EtOAc (0.8 ml/0.2 mL) were used. The reaction mixture was irritated by blue LED strip for 36 h. The residue was purified by flash column chromatography (EtOAc/hexane/DCM=1/3/1) to afford product (23 mg, 50% yield, 92% D ratio by $^1$H NMR) as white solid. $^1$H NMR (400 MHz, CDCl$_3$) δ 9.98 (s, 0.08H), 7.90 (d, J=8.5 Hz, 2H), 7.68 (d, J=8.4 Hz, 2H), 7.48 (d, J=8.3 Hz, 2H), 7.25 (d, J=8.1 Hz, 2H), 7.04 (s, 1H), 6.88 (d, J=9.0 Hz, 1H), 6.70 (dd, J=9.0, 2.1 Hz, 1H), 3.94 (s, 1.49H), 3.84 (s, 3H), 2.47 (s, 2.25H). $^{13}$C NMR (100 MHz, CDCl$_3$) δ 190.65 (t, J=26.4 Hz), 168.74, 168.43, 156.30, 155.46, 139.61, 136.56, 134.16 (t, J=3.4 Hz), 133.85, 131.36, 131.34, 131.00, 130.50, 129.33, 122.36, 115.22, 111.91, 111.59, 101.35, 55.90, 30.74, 13.56.

(3aR,4R,6S,6aS)-6-methoxy-2,2-dimethyl-N-(3-oxopropyl)tetrahydrofuro[3,4-d][1,3]dioxole-4-carboxamide-formyl-d1 (3aq)

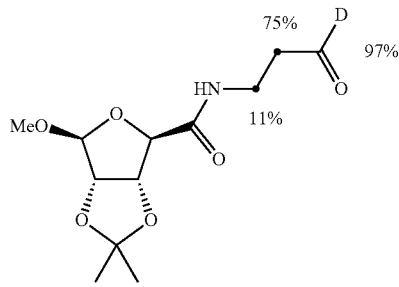

The reaction was carried out according to the general procedure B. (3aR,4R,6S,6aS)-6-methoxy-2,2-dimethyl-N-(3-oxopropyl)tetrahydrofuro[3,4-d][1,3]dioxole-4-carboxamide (54.6 mg, 0.2 mmol, 1.0 equiv), 4CzIPN (8.0 mg, 0.01 mmol, 5 mol %), 2d (60 μL, 1M in EtOAc, 30 mol %), D$_2$O (160 μL, 40 equiv) and anhydrous EtOAc (1 mL) were used. The reaction mixture was irritated by blue LED strip for 36 h. The residue was purified by flash column chromatography (EtOAc/MeOH=19/1-9/1) to afford product (30 mg, 55% yield, 97% D ratio by $^1$H NMR) as pale yellow oil. $^1$H NMR (400 MHz, CDCl$_3$) δ 9.80 (s, 0.03H), 6.98 (br, 1H), 5.06 (dd, J=6.0, 1.3 Hz, 1H), 5.04 (s, 1H), 4.57 (s, 1H), 4.51 (d, J=6.0 Hz, 1H), 3.55 (t, J=5.5 Hz, 1.77H), 3.44 (s, 3H), 2.75-2.68 (m, 0.49H), 1.47 (s, 3H), 1.31 (s, 3H). $^{13}$C NMR (100 MHz, CDCl$_3$) δ 201.18-200.58 (m), 170.37, 112.88, 111.66, 86.63, 84.58, 82.75, 56.65, 43.71-43.10 (m), 32.52-32.42 (m), 26.60, 25.07.

Methyl N-((benzyloxy)carbonyl)-1-(4-oxobutanoyl-4-d)-L-tryptophanate-formyl-d1 (3ar)

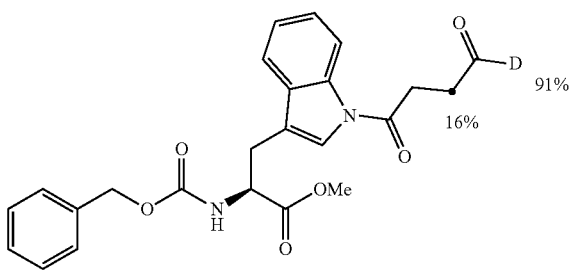

The reaction was carried out according to the general procedure B. Methyl N$^α$-((benzyloxy)carbonyl)-1-(4-oxobutanoyl-4-d)-L-tryptophanate (43.7 mg, 0.1 mmol, 1.0 equiv), 4CzIPN (4.0 mg, 0.005 mmol, 5 mol %), 2d (30 μL, 1M in EtOAc, 30 mol %), D$_2$O (80 μL, 40 equiv) and anhydrous EtOAc/anhydrous DCE (0.5 mL/0.5 mL) were used. The reaction mixture was irritated by blue LED strip for 36 h. The residue was purified by preparative TLC plate (EtOAc/hexane/DCM=1/2/2) to afford product (29 mg, 66% yield, 91% D ratio by $^1$H NMR) as pale yellow oil. $^1$H NMR (400 MHz, CDCl$_3$) 9.90 (s, 0.09H), 8.37 (d, J=8.2 Hz, 1H), 7.47 (d, J=7.8 Hz, 1H), 7.36-7.23 (m, 7H), 5.41 (d, J=8.0 Hz, 1H), 5.12 (dd, J=30.3, 12.2 Hz, 2H), 4.77 (dd, J=7.6, 6.0 Hz, 1H), 3.70 (s, 3H), 3.36-3.09 (m, 4H), 2.97 (t, J=6.3 Hz, 1.68H). $^{13}$C NMR (100 MHz, CDCl$_3$) δ 199.64 (t, J=26.8 Hz), 172.05, 169.44, 155.82, 136.32, 135.94, 130.44, 128.68, 128.37, 128.25, 125.73, 123.89, 122.67, 118.87, 117.41, 116.77, 67.19, 53.91, 52.72 (q, J=3.7 Hz), 37.93, 37.74 (t, J=3.3 Hz), 28.29, 28.19.

tert-Butyl (S)-(1-oxo-1-((2-oxo-2-((3-oxopropyl)amino)ethyl)amino)-3-phenylpropan-2-yl)carbamate-formyl-d1 (3as)

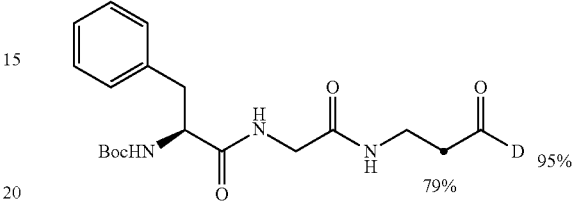

The reaction was carried out according to the general procedure B. tert-Butyl (S)-(1-oxo-1-((2-oxo-2-((3-oxopropyl)amino)ethyl)amino)-3-phenylpropan-2-yl)carbamate (75.4 mg, 0.2 mmol, 1.0 equiv), 4CzIPN (8.0 mg, 0.01 mmol, 5 mol %), 2d (60 μL, 1M in EtOAc, 30 mol %), D$_2$O (160 μL, 40 equiv) and anhydrous EtOAc anhydrous DCE (0.5 mL/0.5 mL) were used. The reaction mixture was irritated by blue LED strip for 36 h. The residue was purified by flash column chromatography (EtOAc/MeOH=9/1) to afford product (66 mg, 88% yield, 95% D ratio by $^1$H NMR) as colorless oil. $^1$H NMR (400 MHz, CDCl$_3$) 9.75 (s, 0.09H), 7.32-7.18 (m, 5H), 6.85 (s, 2H), 5.17 (s, 1H), 4.31 (dd, J=14.1, 7.1 Hz, 1H), 3.90 (dd, J=16.7, 6.0 Hz, 1H), 3.78 (dd, J=16.7, 5.5 Hz, 1H), 3.51-3.48 (m, 2H), 3.12 (dd, J=13.9, 6.3 Hz, 1H), 2.98 (dd, J=13.6, 7.7 Hz, 1H), 2.68 (t, J=6.2 Hz, 0.42H), 1.38 (s, 9H). $^{13}$C NMR (100 MHz, CDCl$_3$) δ 200.95 (t, J=26.2 Hz), 172.14, 169.03, 155.94, 136.51, 129.31, 128.86, 127.21, 80.71, 56.41, 43.21, 38.13, 33.09, 28.38.

In summary, a visible light mediated, organocatalyzed hydrogen-deuterium exchange (HDE) process was developed for directly converting readily accessible aldehydes to their 1-deutero counterparts using D$_2$O as the deuterium pool. Distinct from the established transition metal catalyzed ionic HDE processes, this organophotoredox catalytic radical strategy is successfully realized. Notably, this approach not only enables direct HDE of aromatic aldehydes without deuteration on aromatic ring, but also for aliphatic aldehydes and selective late-stage deuterium incorporation into complex structures with uniformly high level (>90%) of deuterium incorporation. This new, cost-effective approach may enable facile access to a wide range of deuterated structures, which are highly valuable in the fields of biological, medicinal and organic chemistry.

It is understood that the foregoing detailed description and accompanying examples are merely illustrative and are not to be taken as limitations upon the scope of the invention, which is defined solely by the appended claims and their equivalents.

Various changes and modifications to the disclosed embodiments will be apparent to those skilled in the art.

Such changes and modifications, including without limitation those relating to the chemical structures, substituents, derivatives, intermediates, syntheses, compositions, formulations, or methods of use of the invention, may be made without departing from the spirit and scope thereof.

For reasons of completeness, various aspects of the invention are set out in the following numbered clauses:

Clause 1. A method for preparing a deuterated aldehyde of formula

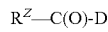
$R^Z$—C(O)-D wherein $R^Z$ is alkyl, alkenyl, cycloalkyl, cycloalkenyl, aryl, heteroaryl, or heterocyclyl;

wherein the alkyl, alkenyl, cycloalkyl, cycloalkenyl, aryl, heteroaryl, and heterocyclyl are each optionally substituted with one or more $R^a$, and $R^Z$ is optionally deuterated;

$R^a$ at each occurrence is independently halogen, —CN, —OH, nitro, —O-benzyl, —NH(t-butoxycarbonyl), —NH(benzyloxycarbonyl), or —X—$R^X$, wherein X is bond, O, NH, C(O), OC(O), or C(O)NH; and $R^X$ is alkyl, alkenyl, alkynyl, alkoxy, cycloalkyl, aryl, heteroaryl, or heterocyclyl, wherein the $R^X$ is optionally substituted, the method comprising:

(i) mixing an aldehyde of formula

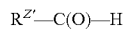
$R^{Z'}$—C(O)—H with a photocatalyst and a hydrogen atom transfer agent in a $H_2O$ free solvent comprising $D_2O$ and an organic solvent under an inert gas to form a mixture;

wherein $R^{Z'}$ is alkyl, alkenyl, cycloalkyl, cycloalkenyl, aryl, heteroaryl, or heterocyclyl; wherein the alkyl, alkenyl, cycloalkyl, cycloalkenyl, aryl, heteroaryl, and heterocyclyl are each optionally substituted with one or more $R^b$;

$R^b$ at each occurrence is independently halogen, —CN, —OH, nitro, —O-benzyl, —NH(t-butoxycarbonyl), —NH(benzyloxycarbonyl), or —Y—$R^Y$, wherein Y is bond, O, NH, C(O), OC(O), or C(O)NH; and $R^Y$ is alkyl, alkenyl, alkynyl, alkoxy, cycloalkyl, aryl, heteroaryl, or heterocyclyl, wherein the $R^Y$ is optionally substituted, and (ii) exposing the mixture of (i) to light, thereby producing the deuterated aldehyde.

Clause 2. The method of clause 1, wherein $R^Z$ is an optionally substituted aryl or an optionally substituted heteroaryl.

Clause 3. The method of clause 1, wherein $R^Z$ is a phenyl, a naphthyl, a pyridinyl, an indolyl, or a benzo[b]thiophene, each of which is optionally substituted.

Clause 4. The method of clause 1, wherein $R^Z$ is an optionally substituted $C_{2-20}$ alkyl.

Clause 5. The method of clause 1, wherein $R^Z$ and $R^{Z'}$ are the same.

Clause 6. The method of clause 1, wherein the photocatalyst is

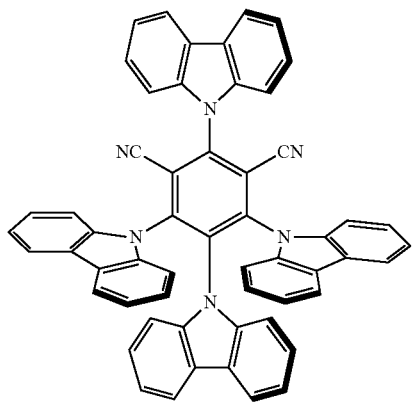

or a salt thereof.

Clause 7. The method of clause 1, wherein the hydrogen atom transfer agent is a $R^A$—SH, $R^B$—C(O)OM, or a combination thereof, wherein $R^A$ is —$C_{1-4}$alkylene-C(O)O$C_{1-4}$akyl or —Si($C_{1-4}$alkyl)$_3$;

$R^B$ is an aryl optionally substituted with 1, 2, 3, or 4 substituents independently selected from the group consisting of halogen, —CN, —OH, nitro, and $C_{1-4}$alkyl; and M is a counterion other than $H^+$.

Clause 8. The method of clause 7, wherein the hydrogen atom transfer agent is

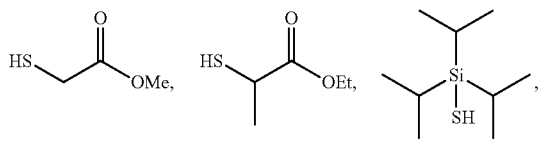

PhC(O)ONa, or a combination thereof.

Clause 9. The method of clause 7, wherein the hydrogen atom transfer agent is a combination of

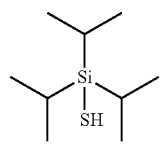

and PhC(O)ONa.

Clause 10. The method of clause 1, wherein the organic solvent is ethyl acetate (EtOAc).

Clause 11. The method of clause 1, wherein the inert gas comprises nitrogen ($N_2$).

Clause 12. The method of any one of clauses 1-11, wherein the deuterated aldehyde is selected from the group consisting of:

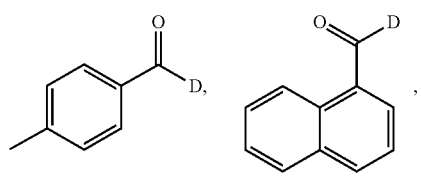

-continued
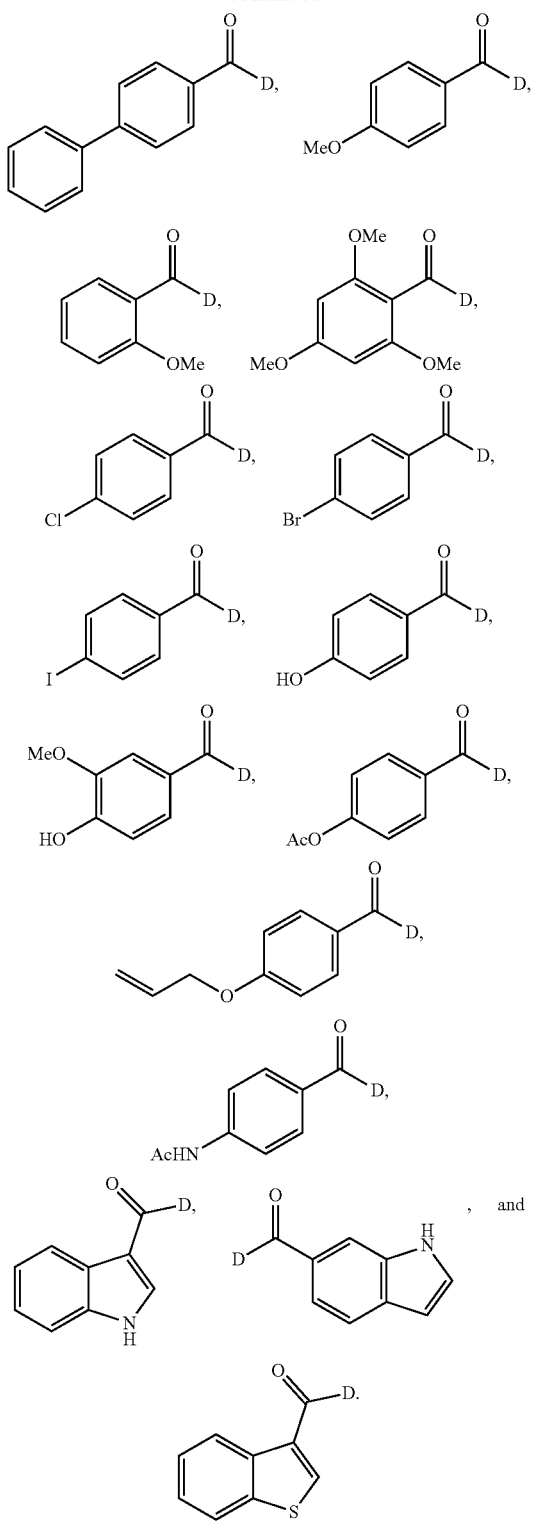
Clause 13. The method of any one of clauses 1-11, wherein the deuterated aldehyde is
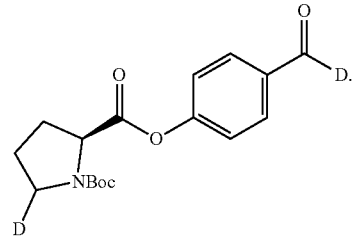
Clause 14. The method of any one of clauses 1-11, wherein the aldehyde of formula
$$R^{Z'}-C(O)-H$$
is selected from the group consisting of:
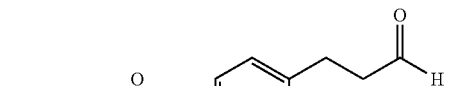
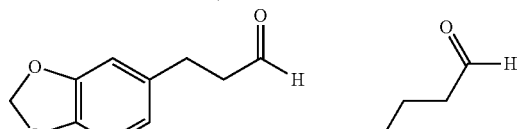
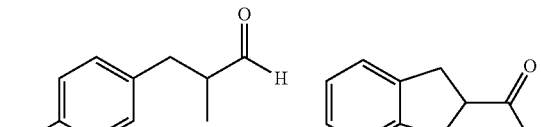
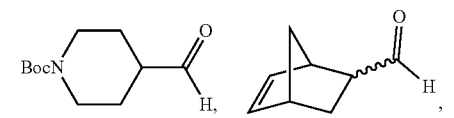
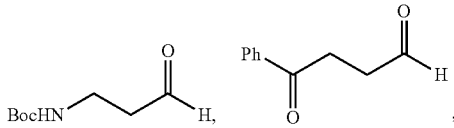
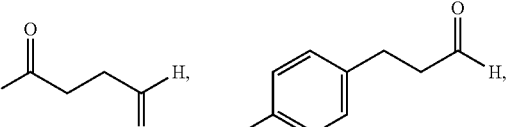
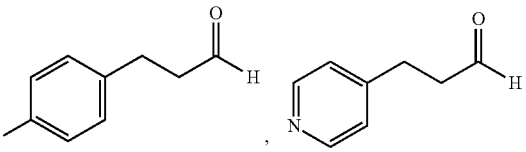

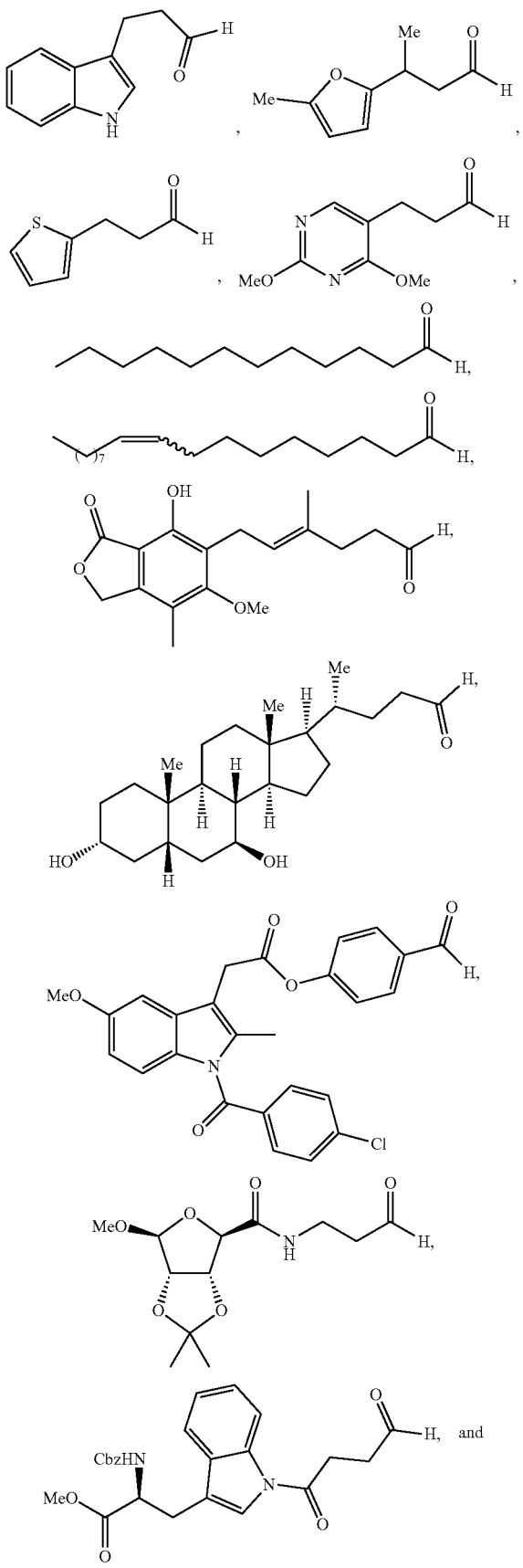

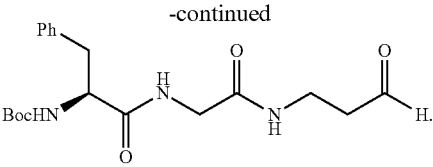

Clause 15. The method of any one of clauses 1-14, wherein the level of deuterium incorporation of the —C(O)-D moiety is at least 90%.

Clause 16. The method of clause 15, wherein in the level of deuterium incorporation of the —C(O)-D moiety is at least 95%.

Clause 17. The method of any one of clauses 1-16, further comprising isolating the deuterated aldehyde.

Clause 18. A deuterated aldehyde produced by the method of clause 1.

REFERENCES

1) Adcock, H. V., E. Chatzopoulou, P. W. Davies, Angew. Chem. Int. Ed. 2015, 54, 15525-15529.
2) Atzrodt, J., V. Derdau, W. J. Kerr, M. Reid, Angew. Chem. Int. Ed. 2018, 57, 1758-1754
3) Atzrodt, J., V. Derdau, W. J. Kerr, M. Reid, Angew. Chem. Int. Ed. 2018, 57, 3022-3047.
4) Bergin, E., Nat. Catal. 2018, 1, 898-898.
5) Bugaut, X., F. Glorius, Chem. Soc. Rev. 2012, 41, 3511-3522.
6) Capretz Agy, A.; Rodrigues, M. T., Jr.; Zeoly, L. A.; Simoni, D. A.; Coelho, F. J. Org. Chem. 2019, 84, 5564.
7) Colbon, P.; Ruan, J.; Purdie, M.; Mulholland, K.; Xiao, J. Org. Lett. 2011, 13, 5456.
8) Enders, D., O. Niemeier, A. Henseler, Chem. Rev. 2007, 107, 5606-5655.
9) Erkkila, A., I Majander, P. M. Pihko, Chem. Rev. 2007, 107, 5416-5470.
10) Ezzili, C.; Mileni, M.; McGlinchey, N.; Long, J. Z.; Kinsey, S. G.; Hochstatter, D. G.; Stevens, R. C.; Lichtman, A. H.; Cravatt, B. F.; Bilsky, E. J.; Boger, D. L. J. Med. Chem. 2011, 54, 2805.
11) Flanigan, D. M., F. Romanov-Michailidis, N. A. White, T. Rovis, Chem. Rev. 2015, 115, 9307-9387.
12) Frost, C. G.; Hartley, B. C. Org. Lett. 2007, 9, 4259.
13) Gant, T. G., J. Med. Chem. 2014, 57, 3595-3611.
14) Hale, L. V. A., N. K. Szymczak, J. Am. Chem. Soc. 2016, 138, 13489-13492.
15) Hilpert, L. J.; Sieger, S. V.; Haydl, A. M.; Breit, B. Angew. Chem. Int. Ed. 2019, 58, 3378.
16) Huang, H.; Yu, C.; Zhang, Y.; Zhang, Y.; Mariano, P. S.; Wang, W. J. Am. Chem. Soc. 2017, 139, 9799.
17) Ibrahim, M. Y. S., S. E. Denmark, Angew. Chem. Int. Ed. 2018, 57, 10362-10367.
18) Isbrandt, E. S., J. K. Vandavasi, W. Zhang, M. P. Jamshidi, S. G. Newman. Synlett 2017, 28, 2851-2854.
19) Ji, P.; Zhang, Y.; Wei, Y.; Huang, H.; Hu, W.; Mariano, P. A.; Wang, W. Org. Lett. 2019, 21, 3086.
20) Kerr, W. J., M. Reid, T. Tuttle, Angew. Chem. Int. Ed. 2017, 56, 7808-7812.
21) Kitajima, M.; Murakami, Y.; Takahashi, N.; Wu, Y.; Kogure, N.; Zhang, R. P.; Takayama, H. Org. Lett. 2014, 16, 5000.
22) Koniarczyk, J., D. Hesk, A. Overgard, I. W. Davies, A. McNally, J. Am. Chem. Soc. 2018, 140, 1990-1993.
23) Li, X., S. Wu, S. Chen, Z. Lai, H.-B. Luo, C.-Q. Sheng, Org. Lett. 2018, 20, 1712-1715.

24) Liang, X., S. Duttwyler, Asian J. Org. Chem. 2017, 6, 1063-1071.
25) Loh, Y. Y., K. Nagao, A. J. Hoover, D. Hesk, N. R. Rivera, S. L. Colletti, I. W. Davies, D. W. C. MacMillan, Science 2017, 358, 1182-1187.
26) Mukherjee, S., J. W. Yang, S. Hoffmann, B. List, Chem. Rev. 2007, 107, 5471-5569.
27) Mukherjee, S., T. Patra, F. Glorius, ACS Catal. 2018, 8, 5842-5846.
28) Mullard, A., Nat. Rev. Drug Discovery 2016, 15, 219-221.
29) Muthukrishnan, S.; Sankaranarayanan, J.; Klima, R. F.; Pace, T. C.; Bohne, C.; Gudmundsdottir, A. D. Org. Lett. 2009, 11, 2345.
30) Olsen, E. P. K., T. Singh, P. Harris, P. G. Andersson, R. Madsen J. Am. Chem. Soc. 2015, 137, 834-842.
31) Phillips, E. M., A. Chan, K. A. Scheidt, Aldrichimica Acta 2009, 42, 55-64.
32) Pirali, T., M. Serafini, S. Cargnin, A. A. Genazzani, J. Med. Chem. 2019, 62, 5276-5297.
33) Puleo, T. R., A. J. Strong, J. S. Bandar, J. Am. Chem. Soc. 2019, 141, 1467-1472.
34) Sattler, A., ACS Catal. 2018, 8, 2296-2312.
35) Schmidt, C., Nat. Biotechnol. 2017, 35, 493-494.
36) Shang, Y.; Jie, X.; Jonnada, K.; Zafar, S. N.; Su, W. Lab. Delo. 2017, 8, 2273.
37) Simmons, E. M., J. F. Hartwig, Angew. Chem. Int. Ed. 2012, 51, 3066-3072.
38) Spletstoser, J. T., J. M. White, A. R. Tunoori, G. I. Georg, J. Am. Chem. Soc. 2007, 129, 3408-3419.
39) Spletstoser, J. T., J. M. White, G. I. Georg, Tetrahedron Lett. 2004, 45, 2787-2789.
40) Taddei, M., A. Mann, in Hydroformylation for Organic Synthesis Vol. 342, Springer: Berlin, 2013, pp 1-229.
41) Valero, M., R. Weck, S. Ggssregen, J. Atzrodt, V. Derdau, Angew. Chem. Int. Ed. 2018, 57, 8159-8163.
42) Wang, X., M.-H. Zhu, D. P. Schuman, D. Zhong, W.-Y. Wang, L.-Y. Wu, W. Liu, B. M. Stoltz, W.-B. Liu, J. Am. Chem. Soc. 2018, 140, 10970-10974.
43) Xiao, J.; Wong, Z. Z.; Lu, Y. P.; Loh, T. P. Adv. Synth. Catal. 2010, 352, 1107.
44) Yang, J. in Deuterium: Discovery and Applications in Organic Chemistry, Elsevier, Amsterdam, 2016, pp. 1-130.
45) Yu, R. P., D. Hesk, N. Rivera, I. Pelczer, P. J. Chink, Nature 2016, 529, 195-199.
46) Zhang, M., X. Yuan, C. Zhu, J. Xie, Angew. Chem. Int. Ed. 2019, 58, 312-316.
47) Zhang, Y., P. Ji, W. Hu, Y. Wei, H. Huang, W. Wang, Chem.-Eur. J. 2019, 25, 8225-8228.
48) Zhou, R., J. Li, H. W. Cheo, R. Chua, G. Zhan, Z. Hou, J. Wu, Chem. Sci. 2019, 10, 7340-7344.

What is claimed is:

1. A method for preparing a deuterated aldehyde of formula:

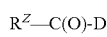
$R^Z$—C(O)-D wherein:
$R^Z$ is alkyl, alkenyl, cycloalkyl, cycloalkenyl, aryl, heteroaryl, or heterocyclyl; wherein the alkyl, alkenyl, cycloalkyl, cycloalkenyl, aryl, heteroaryl, and heterocyclyl are each optionally substituted with one or more $R^a$, and $R^Z$ is optionally deuterated;
$R^a$ at each occurrence is independently halogen, —CN, —OH, nitro, —O-benzyl, —NH(t-butoxycarbonyl), —NH(benzyloxycarbonyl), or —X—$R^X$, wherein X is bond, O, NH, C(O), OC(O), or C(O)NH; and $R^X$ is alkyl, alkenyl, alkynyl, alkoxy, cycloalkyl, aryl, heteroaryl, or heterocyclyl, wherein the $R^X$ is optionally substituted, the method comprising:
(i) mixing an aldehyde of formula:

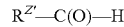
$R^{Z'}$—C(O)—H with a photocatalyst and a hydrogen atom transfer agent in a $H_2O$ free solvent comprising $D_2O$ and an organic solvent under an inert gas to form a mixture; wherein the photocatalyst is:

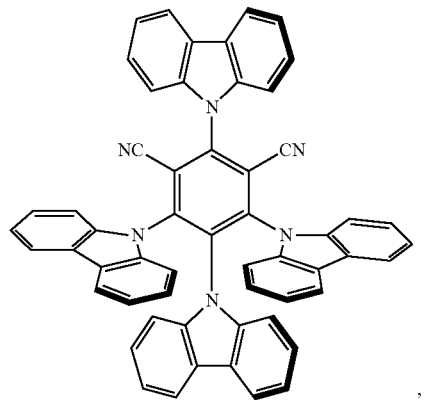

or a salt thereof;
wherein $R^{Z'}$ is alkyl, alkenyl, cycloalkyl, cycloalkenyl, aryl, heteroaryl, or heterocyclyl; wherein the alkyl, alkenyl, cycloalkyl, cycloalkenyl, aryl, heteroaryl, and heterocyclyl are each optionally substituted with one or more $R^b$;
$R^b$ at each occurrence is independently halogen, —CN, —OH, nitro, —O-benzyl, —NH(t-butoxycarbonyl), —NH(benzyloxycarbonyl), or —Y—$R^Y$, wherein Y is bond, O, NH, C(O), OC(O), or C(O)NH; and $R^Y$ is alkyl, alkenyl, alkynyl, alkoxy, cycloalkyl, aryl, heteroaryl, or heterocyclyl, wherein the $R^Y$ is optionally substituted, and
(ii) exposing the mixture of (i) to light, thereby producing the deuterated aldehyde.

2. The method of claim 1, wherein $R^Z$ is an optionally substituted aryl or an optionally substituted heteroaryl.

3. The method of claim 1, wherein $R^Z$ is a phenyl, a naphthyl, a pyridinyl, an indolyl, or a benzo[b]thiophene, each of which is optionally substituted.

4. The method of claim 1, wherein $R^Z$ is an optionally substituted $C_{2-20}$ alkyl.

5. The method of claim 1, wherein $R^Z$ and $R^{Z'}$ are the same.

6. The method of claim 1, wherein the hydrogen atom transfer agent is a $R^A$—SH, $R^B$—C(O)OM, or a combination thereof, wherein
$R^A$ is —$C_{1-4}$alkylene-C(O)O$C_{1-4}$akyl or —Si($C_{1-4}$alkyl)$_3$;
$R^B$ is an aryl optionally substituted with 1, 2, 3, or 4 substituents independently selected from the group consisting of halogen, —CN, —OH, nitro, and $C_{1-4}$alkyl; and
M is a counterion other than $H^+$.

7. The method of claim 6, wherein the hydrogen atom transfer agent is

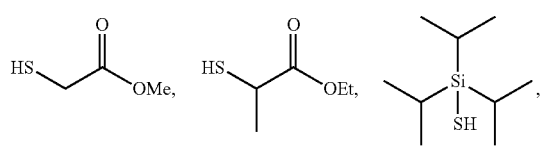

PhC(O)ONa, or a combination thereof.

8. The method of claim 6, wherein the hydrogen atom transfer agent is a combination of

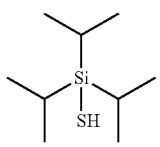

and PhC(O)ONa.

9. The method of claim 1, wherein the inert gas comprises nitrogen ($N_2$).

10. The method of claim 1, wherein the deuterated aldehyde is selected from the group consisting of:

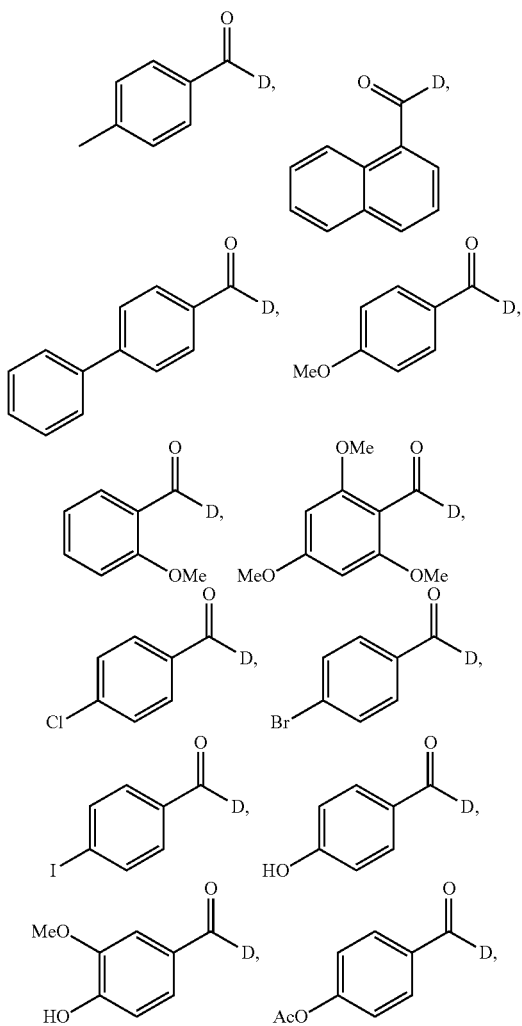

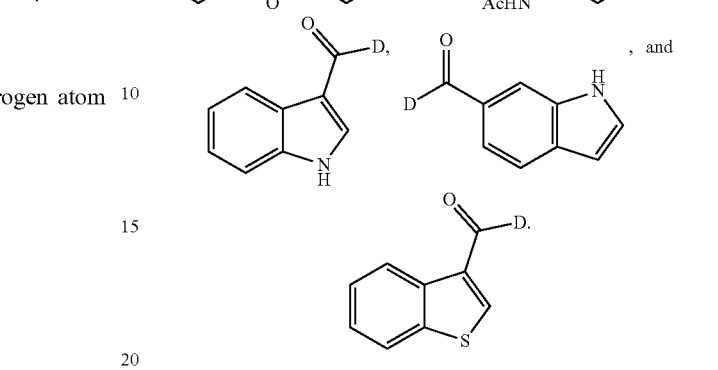

11. The method of claim 1, wherein the deuterated aldehyde is

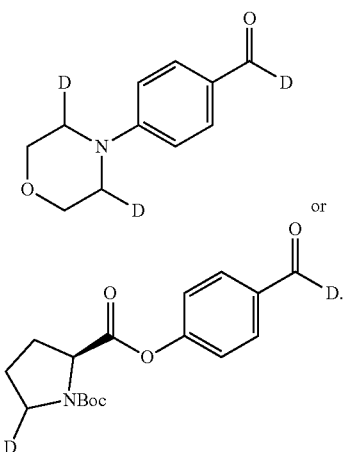

12. The method of claim 1, wherein the aldehyde of formula $R^{Z'}$—C(O)—H is selected from the group consisting of:

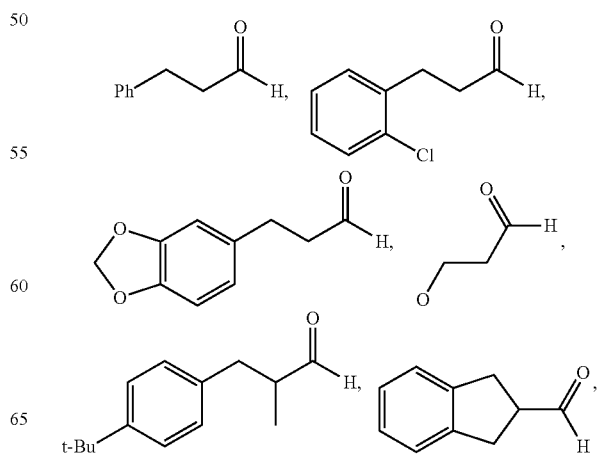

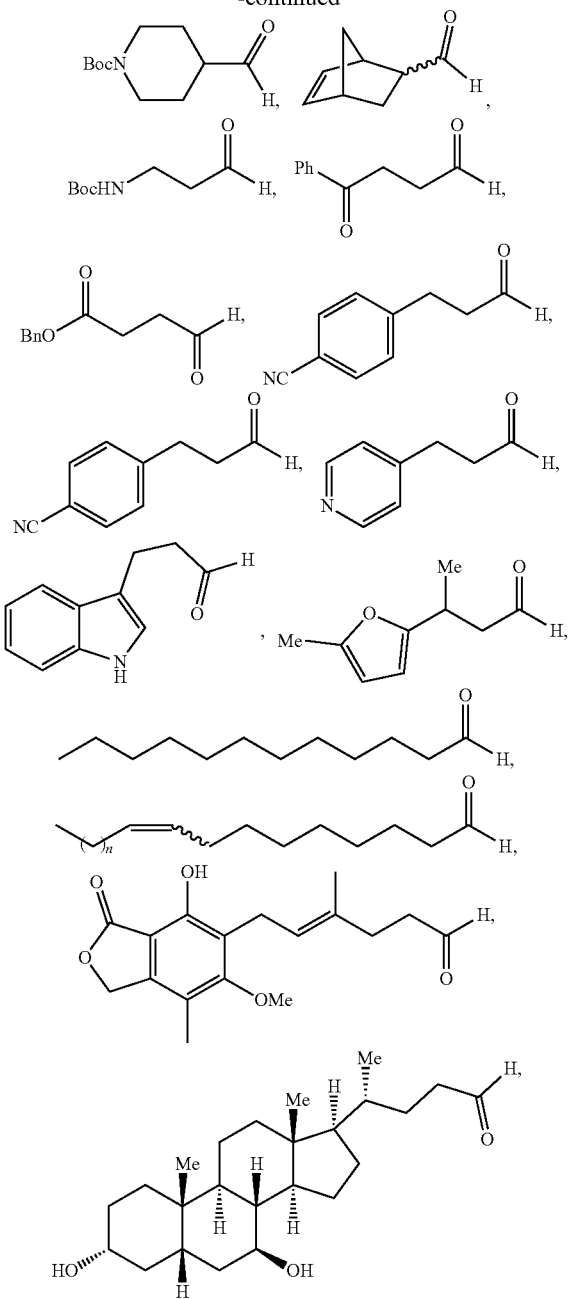
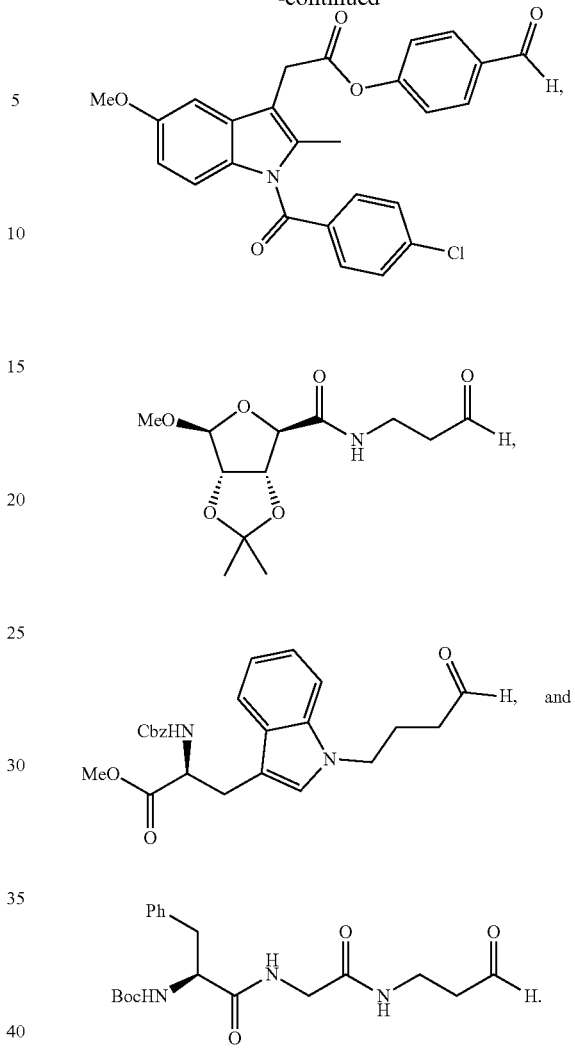
13. The method of claim 1, wherein the level of deuterium incorporation of the —C(O)-D moiety is at least 90%.
14. The method of claim 13, wherein in the level of deuterium incorporation of the —C(O)-D moiety is at least 95%.
15. The method of claim 1, further comprising isolating the deuterated aldehyde.
* * * * *